(12) United States Patent
Sahni et al.

(10) Patent No.: US 11,182,707 B2
(45) Date of Patent: Nov. 23, 2021

(54) METHOD AND SYSTEM FOR PROVIDING A MULTI-DIMENSIONAL HUMAN RESOURCE ALLOCATION ADVISER

(71) Applicant: Rimini Street, Inc., Las Vegas, NV (US)

(72) Inventors: Praveen Sahni, Union City, CA (US); Brian Slepko, Danville, CA (US); Philip Cullen, Mill Valley, CA (US); Jason Hardiman, San Francisco, CA (US)

(73) Assignee: Rimini Street, Inc., Las Vegas, NV (US)

( * ) Notice: Subject to any disclaimer, the term of this patent is extended or adjusted under 35 U.S.C. 154(b) by 229 days.

(21) Appl. No.: 16/195,668

(22) Filed: Nov. 19, 2018

(65) Prior Publication Data
US 2020/0160252 A1 May 21, 2020

(51) Int. Cl.
*G06Q 10/06* (2012.01)

(52) U.S. Cl.
CPC ............. *G06Q 10/063112* (2013.01); *G06Q 10/06398* (2013.01)

(58) Field of Classification Search
CPC ............. G06Q 10/063112; G06Q 10/06398
See application file for complete search history.

(56) References Cited

U.S. PATENT DOCUMENTS

| | | | |
|---|---|---|---|
| 6,704,410 B1 | 3/2004 | McFarlane et al. | |
| 9,792,554 B2 | 10/2017 | Finch et al. | |
| 10,045,218 B1 | 8/2018 | Stapleton et al. | |
| 2002/0029161 A1 | 3/2002 | Brodersen et al. | |
| 2002/0198766 A1* | 12/2002 | Magrino ........ | G06Q 10/063112 705/7.14 |
| 2005/0149382 A1 | 7/2005 | Fenner et al. | |
| 2008/0103868 A1* | 5/2008 | Santos ................... | G06Q 10/06 705/7.14 |

(Continued)

OTHER PUBLICATIONS

"Artificial Neural Network System Applied to Human Resource Management", Rocabert et al., Barcelona School of Industrial Engineering, Automatic Control Department, Sep. 2017. (Year: 2017).*

(Continued)

*Primary Examiner* — Pan G Choy
(74) *Attorney, Agent, or Firm* — Hawley Troxell Ennis & Hawley LLP; Philip McKay; Rivkah Young

(57) ABSTRACT

A multi-dimensional human resource allocation adviser integrates with one or more employee skill set data sources and processes and aggregates both initial/static and dynamic skill set data from those sources. Machine learning algorithms are then used to normalize and rank the aggregated employee skills with respect to the skill set and requirements associated with a given task, project, or case. The set of employees determined to have employee skill sets that most closely match the skill set and other requirements associated with the given project, task, or case are then filtered based on rules and constraints determined by the requirements of the business and/or the client. The best employee match, or matches, remaining after the rules and constraints filtering are then recommended for assignment/allocation to the given task, project, or case.

35 Claims, 34 Drawing Sheets

(56) References Cited

U.S. PATENT DOCUMENTS

| | | |
|---|---|---|
| 2008/0167930 A1* | 7/2008 | Cao .................. G06Q 10/06 |
| | | 705/7.14 |
| 2012/0020473 A1 | 1/2012 | Mart et al. |
| 2013/0346067 A1 | 12/2013 | Bhatt |
| 2014/0025418 A1 | 1/2014 | Huang et al. |
| 2014/0096249 A1 | 4/2014 | Dupont et al. |
| 2014/0279629 A1* | 9/2014 | McConnell ........ G06Q 10/0639 |
| | | 705/320 |
| 2015/0051957 A1 | 2/2015 | Griebeler et al. |
| 2015/0248630 A1* | 9/2015 | Ramanan .............. G06Q 30/02 |
| | | 705/7.25 |
| 2015/0254566 A1 | 9/2015 | Chandramouli et al. |
| 2015/0310487 A1 | 10/2015 | Xu et al. |
| 2016/0132901 A1 | 5/2016 | Davar et al. |
| 2017/0068922 A1* | 3/2017 | Singh ............. G06Q 10/063112 |
| 2017/0068976 A1 | 3/2017 | Wawrzynowicz |
| 2017/0316438 A1 | 11/2017 | Konig et al. |
| 2018/0012186 A1 | 1/2018 | Baker et al. |
| 2018/0144305 A1 | 5/2018 | Kenthapadi |
| 2019/0188065 A1 | 6/2019 | Anghel et al. |
| 2019/0227822 A1 | 7/2019 | Azmoon |
| 2019/0238396 A1 | 8/2019 | Tedaldi et al. |

OTHER PUBLICATIONS

"Formal Model for Assigning Human Resources to Teams in Software Project", Margarita Andre, Maria G. Baldoquin, and Silvia T. Acuna, Information and Software Technology 53 (2011) 259-275. (Year: 2011).*

"Multidimensional Skills, Sorting, and Human Capital Accumulation", Jeremy Lise and Fabien Postel-Vinay, University of Monnesota, 2016. (Year: 2016).*

\* cited by examiner

Define Rules-Constraints    Review Model Insight    Test Model    Setup    Help

400

Initial Employee/Engineer Skill Profile

| | 401 | 403 | 405 | 407 | 409 | 411 | 413 |
|---|---|---|---|---|---|---|---|
| Email ID ▼ | Product Lin ▼ | Product ▼ | Release | Years Experience ▼ | Last Use ▼ | Ratin ▼ |
| vrobert@riministreet.com | PeopleSoft | Enterprise Learning Management | Catalog Management | 1 | 2006 | 4 |
| alexiab@riministreet.com | PeopleSoft | Enterprise Learning Management | Catalog Management | 1 | 1960 | 1 |
| ksanjay@riministreet.com | PeopleSoft | Enterprise Learning Management | Enterprise Componen | 2 | 2006 | 3 |
| marryd@riministreet.com | PeopleSoft | Enterprise Learning Management | Enterprise Componen | 1 | 2006 | 4 |
| jamesp@riministreet.com | PeopleSoft | Enterprise Learning Management | Enterprise Componen | 1 | 1960 | 1 |
| clarknp@riministreet.com | PeopleSoft | Enterprise Learning Management | Enterprise Learning C | 2 | 2006 | 3 |

FIG. 4A

Engineer Profile 420
Data

| | | | | | | | | | | | | | |
|---|---|---|---|---|---|---|---|---|---|---|---|---|---|
| RAMP | Applications | Business Insight | Integrations | Rules and Constraints | Setup | RAMP Support | | | | | | | Welcome P |

Search Engineers

Department: PSE-SAP ▼  Email: [ ]  Name: [ ]  FTE/Non-FTE: FTE ▼  Timezone: Please Selec ▼  Status: Active ▼  [Search]

| Department | Email | First Name | Last Name | Status | Assign Case Work | Hours(if Hours<8) | FTE/Non-FTE | Timezone | Max Case Threshold | Can Assign P1 | Can Assign P2 | Availability | Action |
|---|---|---|---|---|---|---|---|---|---|---|---|---|---|
| 421A | 421B | 421C | | 421D | 421E | 421F | 421G | 421H | 421I | 421J | 421K | 421L | 421M |
| PSE-SAP | wrobert@riministreet.com | Robert | Viss | Active | Yes | N/A | FTE | EDT | | | | PTO Info | View Edit |
| PSE-SAP | alexiab@riministreet.com | Alexia | Betty | Active | Yes | N/A | FTE | IST | | | | PTO Info | View Edit |
| PSE-SAP | ksanjay@riministreet.com | Sanjay | Kumar | Active | Yes | N/A | FTE | CDT | | | | PTO Info | View Edit |
| PSE-SAP | marryd@riministreet.com | Michelle | DSouza | Active | Yes | N/A | FTE | CEST | | | | PTO Info | View Edit |
| PSE-SAP | jamesp@riministreet.com | James | Pelley | Active | Yes | N/A | FTE | BST | | | | PTO Info | View Edit |

FIG. 4B

| Define Rules-Constraints | Review Model Insight | Test Model | Setup | Help |
|---|---|---|---|---|

430

| | 434 | 436 |
|---|---|---|
| ⊟PeopleSoft 431 | 399 | 12.41 |
| ⊟Josh Graham 432 | 5 | 2.90 |
|   CRM | 1 | 4.95 |
|   FSCM | 4 | 2.39 |
| ⊟John Hutsell 433 | 152 | 11.44 |
|   HCM/HRMS | 125 | 11.38 |
|   PeopleTools – HCM | 25 | 11.92 |
|   Portal | 2 | 8.75 |
| ⊟Ken Miller 435 | 46 | 11.26 |
|   CRM | 1 | 10.91 |
|   FSCM | 32 | 11.99 |
|   HCM/HRMS | 1 | 0.22 |
|   PeopleTools – FSCM | 11 | 11.02 |
|   (blank) | 1 | 1.98 |
| ⊟Yuki Fong 437 | 88 | 14.84 |
|   ELM | 2 | 39.51 |
|   HCM/HRMS | 77 | 13.81 |
|   PeopleTools – HCM | 8 | 16.12 |
|   Portal | 1 | 35.09 |
| ⊟Arthur Arandez 439 | 108 | 12.73 |
|   CIS | 1 | 2.12 |
|   CRM | 1 | 3.81 |
|   FSCM | 18 | 11.04 |
|   HCM/HRMS | 18 | 19.50 |
|   PeopleTools – FSCM | 37 | 12.39 |
|   PeopleTools – HCM | 31 | 11.50 |
|   Portal | 1 | 0.16 |
|   RSI DB Health Check SQL | 1 | 0.90 |

FIG. 4C

| Define Rules-Constraints | Review Model Insight | Test Model | Setup | Help |

Employee/Engineer Complexity Attained Data  450

| | | |
|---|---|---|
| ⊟ PeopleSoft  451 | 399 | 12.41 |
| ⊞ Josh Graham | 5 | 2.90 |
| ⊟ Ken Miller 452 | 152 | 11.44 |
| ⊟ HCM/HRMS | 125 | 11.38 |
| ⊟ Absence Management | 1 | 8.04 |
| Medium | | 8.04 |
| ⊟ Benefits ⇐ | 22 | 11.07 |
| High | 1 | 1.88 |
| Low | 7 | 3.46 |
| Medium | 14 | 15.53 |
| ⊟ COBOL ⇐ | 2 | 7.61 |
| High | 1 | 12.01 |
| Medium | 1 | 3.21 |
| ⊟ HCM/HRMS Portal | 1 | 6.87 |
| Low | 1 | 6.87 |
| ⊟ HCM/HRMS Technical | 3 | 31.28 |
| Low | 1 | 26.99 |
| Medium | 2 | 33.43 |
| ⊟ Human Resources | 7 | 12.65 |
| High | 2 | 12.55 |
| Medium | 5 | 12.69 |
| ⊞ NA Payroll | 78 | 10.21 |
| ⊞ Payroll Interface | 1 | 0.15 |
| ⊟ Time & Labor ⇐ | 8 | 19.01 |
| High | 2 | 5.51 |
| Medium | 6 | 23.51 |

FIG. 4E

Case Assignment Model (+)

Rule Category: [    ]  Rule Name: [    ]  Activated: [All]  [Search] 610

| Rule Category 611 | Rule Name 612 | Rule Condition 613 | Rule Action 614 | Activated 615 | Default Value 616 | PL Values 617 | Action 618 |
|---|---|---|---|---|---|---|---|
| Citizenship_Residency | Citizenship_Restriction | Case Requirement, Engineer, Citizenship | Filter Alert if Non-Citizenship | Yes | NA | Update | View Edit Delete |
| Escalated Client | Escalated_Client_Engineer_Assignment | Found Escalated_Client | Assign from Top 3 List | Yes | NA | Update | View Edit Delete |
| Escalated Client | Determine_Escalated_Client | Last 3 surveys<=3 | Mark Client to Escalated_Client | Yes | NA | Update | View Edit Delete |
| Escalated Client Contact | Escalated_Client_Contact_Engineer_Assignment | Found Escalated_Client_Contact | Assign from Top 3 List | Yes | NA | Update | View Edit Delete |
| Escalated Client Contact | Determine_Escalated_Client_Contact | Last 2 surveys<=3 | Mark Contact to Escalated_Client_Contact | Yes | NA | Update | View Edit Delete |
| Language | Filter_On_Language | Case Requirement, Engineer, Language | Filter Engineer List | Yes | NA | Update | View Edit Delete |
| Max Case Limit | Max Case Limit | Number of open case | Filter Alert if open_cases>n3 | Yes | 15 | Update | View Edit Delete |
| OD | OD Restriction | Case Requirement, Engineer, FTE | Filter Alert, Non-FTE | Yes | NA | Update | View Edit Delete |
| PTO | PTO_P2 | P2 Follow the Sun Case, Engineer on PTO | Filter Alert if PTO in next 7 days | Yes | NA | Update | View Edit Delete |
| PTO | PTO_P1 | P1 Case, Engineer on PTO | Filter Alert if PTO in next 7 days | Yes | NA | Update | View Edit Delete |
| RSP Skills New Engineer | Use_RSP_Skills_12Minus | Engineer Joined Support<12 months | Assign RSP Skills Weight=v100 | Yes | 0 | Update | View Edit Delete |
| RSP Skills Not-New Engineer | Use_RSP_Skills_12Plus | Engineer Joined Support>=12 months | Assign RSP Skills Weight=v101 | Yes | 0 | Update | View Edit Delete |
| Threshold | Max_P2 | P2 Cases | Filter Alert if P2 Cases>=n2 | Yes | 2 | Update | View Edit Delete |
| Threshold | Max_P1 | P1 Cases | Filter Alert if P1 Cases>=n1 | Yes | 1 | Update | View Edit Delete |
| TimeZone | TZ_Match_P2 | Follow the Sun Case, Engineer Timezone | Filter Alert if Out of Timezone | Yes | NA | Update | View Edit Delete |
| TimeZone | TZ_Match_P1 | P1 Case, Engineer TimeZone | Filter Alert if Out of Timezone | Yes | NA | Update | View Edit Delete |
| Weight | Release_Skill_Matrix | Engineer, Release, Skill Matrix | Assign Weight Percentage=v8 | Yes | Equal | Update | View Edit Delete |
| Weight | Release_CSR | Engineer, Release, Last 12 Months, Average CSR | Assign Weight Percentage=v7 | Yes | Equal | Update | View Edit Delete |
| Weight | Release_Cases_Closed | Engineer, Release, Last 12 Months, Total Cases Closed | Assign Weight Percentage=v6 | Yes | Equal | Update | View Edit Delete |
| Weight | Release_Ave_Closure_Time | Engineer, Release, Last 12 Months, Average Time to Close | Assign Weight Percentage=v5 | Yes | Equal | Update | View Edit Delete |

[20 ▼] |◄ ◄ | Page [1] of 2 | ► ►| | ⟳ | Displaying 1 to 20 of 24 items

FIG. 6A

| Case Assignment Model ⊕ | | | | | | | |
|---|---|---|---|---|---|---|---|
| Rule Category: | | Rule Name: | | Activated: All ▼ | Search 610 | | |
| Rule Name 611 | Rule Name 612 | Rule Condition 613 | Rule Action 614 | Activated 615 | Default Value 616 | PL Values 617 | Action 618 |
| Citizenship_Residency | Citizenship_Restriction | Case Requirement, Engineer, Citizenship | Filter Alert if Non-Citizenship | Yes | NA | Update | View Edit Delete |
| Escalated Client | Escalated_Client_Engineer_Assignment | Found Escalated_Client | Assign from Top 3 List | Yes | NA | Update | View Edit Delete |
| Escalated Client | Determine_Escalated_Client | Last 3 surveys<=3 | Mark Client to Escalated_Client | Yes | NA | Update | View Edit Delete |
| Escalated Client Contact | Escalated_Client_Contact_Engineer_Assignment | Found Escalated_Client_Contact | Assign from Top 3 List | Yes | NA | Update | View Edit Delete |
| Escalated Client Contact | Determine_Escalated_Client_Contact | Last 2 surveys<=3 | Mark Contact to Escalated_Client_Contact | Yes | NA | Update | View Edit Delete |
| Language | Filter_On_Language | | | | NA | Update | View Edit Delete |
| Max Case Limit | Max Case Limit | | | | 15 | Update | View Edit Delete |
| OD | OD Restriction | | | | NA | Update | View Edit Delete |
| PTO | PTO_P2 | | | | NA | Update | View Edit Delete |
| PTO | PTO_P1 | | | | 0 | Update | View Edit Delete |
| RSP Skills New Engineer | Use_RSP_Skills_12Minus | | | | 0 | Update | View Edit Delete |
| RSP Skills Not-New Engineer | Use_RSP_Skills_12Plus | | | | 2 | Update | View Edit Delete |
| Threshold | Max_P2 | | | | 1 | Update | View Edit Delete |
| Threshold | Max_P1 | | | | NA | Update | View Edit Delete |
| TimeZone | TZ_Match_P2 | | | | NA | Update | View Edit Delete |
| TimeZone | TZ_Match_P1 | | | | Equal | Update | View Edit Delete |
| Weight | Release_Skill_Matrix | | | | Equal | Update | View Edit Delete |
| Weight | Release_CSR | | | | Equal | Update | View Edit Delete |
| Weight | Release_Cases_Closed | Engineer, Release, Last 12 Months, Total Cases Closed | Assign Weight Percentage=v6 | Yes | | | |
| Weight | Release_Ave_Closure_Time | Engineer, Release, Last 12 Months, Average Time to Close | Assign Weight Percentage=v5 | Yes | | | |

PL Values

Add New PL Value ⊕

| Product Line 631 | Values 632 |
|---|---|
| E-Business Suite (EBS) ▼ | 15 ⊗ |
| SAP ▼ | 15 ⊗ |
| PeopleSoft ▼ | 10 ⊗ |
| Oracle Technology ▼ | 15 ⊗ |
| JD Edwards ▼ | 15 ⊗ |
| Siebel ▼ | 15 ⊗ |
| Hyperion ▼ | |

630

Save   Close

20 ▼ | ◄◄ ◄ | Page 1 of 2 | ► ►► | ⟳ | Displaying 1 to 20 of 24 items

FIG. 6B

Edit Case Assignment Model

ML Module*: [Case Assignment] 651
Rule Category*: [Max Case Limit] 652
Rule Name*: [Max Case Limit] 653
Rule Condition*: [Number of open case] 654
Rule Action*: [Filter Alertif open_cases>n3] 655
Default Value: [15] 656
Activated*: [Yes ▼] 657
Attach Rule To: [Load Balancing – Final Recommendations] 658
Solution For: 📎 661
Implementation Note: 📎 663
Change History: 📎 665

[Save] [Save and go back to list] [Cancel]

Skill Finding..

| Product Line & Category 921 | EBS Product Line 923 Cases Owned & Closed | EBS Product Line 925 Cases Lead and Closed | EBS Product Line 927 Cases as Team Member | EBS Product Line 929 Average Resolution Time |
|---|---|---|---|---|
| Feature Name | | | | |
| Calculation | Sum | Sum | Sum | Avg |
| Best Value | Max | Max | Max | Min |
| Vector Feature Weight | 0.20 | 0.20 | 0.20 | 0.20 |
| Category Weights | 0.25 | 0.25 | 0.25 | 0.25 |
| Engineer Name 1 | 26 | 1 | 1 | 13 | 292 |
| Engineer Name 2 | 39 | 3 | 1 | 8 | 237 |
| Engineer Name 3 | 50 | 3 | 3 | 18 | 460 |
| Engineer Name 4 | 69 | 2 | 2 | 16 | 509 |
| "Best Engineer" | 69 | 3 | 3 | 18 | 237 |

Note: Engineer Name 1 row "292" is in Average Resolution Time column (extra column merged).

Skill Normalizing..

| Product Line & Category 931 | EBS Product Line 933 Cases Owned & Closed | EBS Product Line 935 Cases Lead and Closed | EBS Product Line 937 Cases as Team Member | EBS Product Line 939 Average Resolution Time |
|---|---|---|---|---|
| Engineer Name | | | | |
| Engineer Name 1 | 0.377 | 0.333 | 0.333 | 0.574 |
| Engineer Name 2 | 0.565 | 0.333 | 0.444 | 0.466 |
| Engineer Name 3 | 0.725 | 1.000 | 1.000 | 0.904 |
| Engineer Name 4 | 1.000 | 0.667 | 0.889 | 1.000 |
| "Best Engineer" | 1.000 | 1.000 | 1.000 | 0.466 |

Skill Ranking..

| Product Line & Category 941 | EBS Product Line 943 Cases Owned & Closed | EBS Product Line 945 Cases Lead and Closed | EBS Product Line 947 Cases as Team Member | EBS Product Line 949 Average Resolution Time |
|---|---|---|---|---|
| Ranked Engineer Name | | | | |
| Engineer Name 1 | 0.000 | 0.006 | 0.001 | 0.014 |
| Engineer Name 2 | 0.009 | 0.022 | 0.015 | 0.000 |
| Engineer Name 3 | 0.004 | 0.000 | 0.000 | 0.010 |
| Engineer Name 4 | 0.019 | 0.022 | 0.004 | 0.001 |
| "Best Engineer" | 0 | 0 | 0 | 0 |

| | Case<br>153665 | Product Line<br>Product Line 1 | Product<br>Financials – AR | Release<br>12 | |
|---|---|---|---|---|---|
| 961 | Employee-1<br>Vector Example | Parameter | Value | | Euclidean Parameters |
| 963 | Total Case Closure Count-Product | | | | |
| | 963A | Employee-1 Case count-Product Closure | 84 | | v |
| | 963B | Min Case Number from data | 10 | | Min |
| | 963C | Max Case Number from data | 103 | | Max |
| | 963D | Normalized Value | 0.796 | | y1 |
| | 963E | Max Normalized Value | 1 | | x1 |
| 965 | Total Case Closure Count-Release | | | | |
| | 965A | Employee-1 Case count-Release Closure | 190 | | v |
| | 965B | Min Case Number from data | 20 | | Min |
| | 965C | Max Case Number from data | 443 | | Max |
| | 965D | Normalized Value | 0.402 | | y2 |
| | 965E | Max Normalized Value | 1 | | x2 |
| 967 | CSR Average Score-Product | | | | |
| | 967A | Employee-1 CSR Average Score (12months) | 4.89 | | v |
| | 967B | Min CSR Average Score from data | 3 | | Min |
| | 967C | Max CSR Average Score from data | 5 | | Max |
| | 967D | Normalized Value | 0.945 | | y3 |
| | 967E | Max Normalized Value | 1 | | x3 |
| 969 | CSR Average Score-Release | | | | |
| | 969A | Employee-1 CSR Average Score (12month) | 4.69 | | v |
| | 969B | Min CSR Average Score from data | 4 | | Min |
| | 969C | Max CSR Average Score from data | 5 | | Max |
| | 969D | Normalized Value | 0.69 | | y4 |
| | 969E | Max Normalized Value | 1 | | x4 |
| 971 | Min-Max Normalization Formula: (v-min)/(max-min) | | | | |
| 980 | Euclidean Distance Formula: SQRT(POWER((x1-y1),2)+POWER((x2-y2),2)+POWER((x3-y3),2)+POWER((x4-y4),2)+POWER((X5-Y5),2)+POWER((x6-y6),2)+...+POWE |
| | Euclidean Distance with 4 vectors | | 0.705935549 | 981 | |
| | Equally Weighted Euclidean Distance (Mean) | | 0.176483887 | 983 | |
| | Equally Weighted Euclidean Distance (Rounded)<br>Skill Match Closeness Factor | | 0.18 | 985 | |

| Step No | Function | What Happens Here |
|---|---|---|
| 1 | Data Collection | Get aggregated, summarized, analyzed values for each skill matched vector element |
| 2 | Find Best Value | Find the best value and assign to 1 |
| 3 | Normalize | Normalize each other data value in a scale of 0-1 |
| 4 | Repeat | Do this for all skill matched vector elements and for a skill matched employee having the Product-Module, Release and Customer Survey received |
| 5 | Feed to algorithm | Feed to Euclidean Distance algorithm for finding the closest match considering all skill matched vector elements |
| 6 | Rank | Rank employees based on the closeness factor derived from calculated Euclidean Distance |
| 7 | Filter and Recommend | Move the ranked employees to filter and recommendations |

Model Reasoning  1730

Engineer Name: Bruce Tysman    Location: Remote Japan    Manager: Alan Jewell

| Skill Match Vector | Findings | Explain More |
|---|---|---|
| Case History (Product-Module) Cases closed in last 365 days | 128 Cases | Select |
| Case History (Product-Module) Avg time to close in last 365 days | 17.7 Days | Select |
| Case History (Release) Cases closed in last 365 days | 124 Cases | Select |
| Case History (Release) Avg time to close in last 365 days | 14.33 Days | Select |
| Case History (CSR-Product-Module) Average for last 365 days | 4.8 | Select |
| Case History (CSR-Release) Average for last 365 days | 4.88 | Select |
| RtSP (Skill Matrix-Product Module) Years of Experience | WIP | Select |
| RtSP (Skill Matrix-Release) Years of Experience | WIP | Select |

| Passed Rules and Constraints | Findings | Explain More |
|---|---|---|
| Rule: Citizenship_Residency (Citizenship_Restriction)<br>Condition: Case Requirement, Engineer, Citizenship | Checked | Select |

FIG. 17D

Review Client Insight 1750

Client Name: Core Manufacturing Inc.  
Client Theater: North America

Escalated: Green:    High Value (>1M): Yes

| CSR Insight | Results | More Information |
|---|---|---|
| Last 3 Months CSR Average | 4.9 | Select |
| Last 6 Months CSR Average | 4.74 | Select |
| Last 12 Months CSR Average | 4.8 | Select |

| Case Inflow Insight | Results | More Information |
|---|---|---|
| Last 3 Months Case Inflow | 33 | Select |
| Last 6 Months Case Inflow | 70 | Select |
| Last 12 Months Case Inflow | 159 | Select |

| Case Closure Insight | Results | More Information |
|---|---|---|
| Last 3 Months Case Closure | 33 | Select |
| Last 6 Months Case Closure | 80 | Select |
| Last 12 Months Case Closure | 150 | Select |

Close

FIG. 17E

Review Engineer Insight 1760

Engineer Name: Bruce Tysman     Location: California, USA     Manager: Alan Jewell

| CSR Insight | Results | More Information |
|---|---|---|
| Last 3 Months Average CSR | 4.67 | Select |
| Last 6 Months Average CSR | 4.80 | Select |
| Last 12 Months Average CSR | 4.34 | Select |

| Case Closure Insight | Results | More Information |
|---|---|---|
| Last 3 Months Case Closed | 37 | Select |
| Last 6 Months Case Closed | 102 | Select |
| Last 12 Months Case Closed | 180 | Select |

Close

FIG. 17F

My Recommendations Page – When filtered on Region (Theater)

Case Assignment Advisor

My Recommendations 1770

Case Number: 00153577  Client Name: Core Manufacturing Inc.

Global Recommendations | Theater Recommendations | Review Client Insight

| No | Recommended Engineer | Engineer TimeZone | Skill Match Closeness | Current Load | | Assign As | | | Engineer Insight | Model Reasoning |
|---|---|---|---|---|---|---|---|---|---|---|
| | | | | Cases Open | Milestones/WK | Case Owner | Lead Engineer | Team Member | | |
| 1 | Ken Miller [Top for assignment] 1771 | EDT | 0.37 | 8 | 8 | ☐ | ☐ | ☐ | Review | Explain Me |
| 2 | Yuki Fong [Top for assignment] 1773 | EDT | 0.45 | 2 | 2 | ☐ | ☐ | ☐ | Review | Explain Me |
| 3 | Arun Kalla [Good for assignment] 1775 | EDT | 0.45 | 13 | 55 | ☐ | ☐ | ☐ | Review | Explain Me |
| 4 | Bruce Tysman [Good for assignment] 1777 | EDT | 0.46 | 12 | 12 | ☐ | ☐ | ☐ | Review | Explain Me |
| 5 | Brock Marnauzs [Good for assignment] 1779 | EDT | 0.47 | 5 | 5 | ☐ | ☐ | ☐ | Review | Explain Me |
| 6 | Jo Hung [Good for assignment] 1781 | EDT | 0.52 | 12 | 12 | ☐ | ☐ | ☐ | Review | Explain Me |
| 7 | Arthur Arandez [Good for assignment] 1783 | EDT | 0.54 | 12 | 12 | ☐ | ☐ | ☐ | Review | Explain Me |
| 8 | Brenda Flesch | EDT | 0.55 | 2 | 5 | ☐ | ☐ | ☐ | Review | Explain Me |

Save  Close

FIG. 17G

METHOD AND SYSTEM FOR PROVIDING A MULTI-DIMENSIONAL HUMAN RESOURCE ALLOCATION ADVISER

BACKGROUND

One of the major challenges facing businesses, and particularly businesses that provide professional services to clients, is effective and efficient allocation of human resources, e.g., the matching of employees' skill sets to the needs and requirements of particular tasks and projects to be performed on behalf of clients of the business, and the allocation of employees and associates to those tasks and projects. This is a particularly challenging and important issue when the business employs highly skilled and/or specialized personnel, such as engineers, technicians, or other professionals.

As a specific illustrative example, consider a business employing engineers to support various Enterprise Resource Planning (ERP) related software systems for the clients of the business and provide various engineering and support services to those clients. In this specific illustrative example, each engineer employee potentially has numerous specialized skills, and experience with numerous specific products, modules, and the features and capabilities associated with those products and modules. Given that each engineer employee can have potentially hundreds of skills associated with potentially hundreds of products and modules, it is often the case that a single engineer employee's skill set can include hundreds, or even thousands, of individual skills. Consequently, ensuring the efficient and effective allocation of the engineer employees best suited, i.e., most qualified, to support a given project, or case, can rapidly become a complicated and daunting task.

Indeed, the problem can be so complex that it is not practical, and in most cases not possible, for a human being to accurately identify and comprehend the interaction and relationships between the skill sets of multiple, even hundreds, of employees, each having potentially hundreds, or even thousands, of individual skills, and the requirements of multiple, even hundreds, of projects/cases for potentially hundreds of clients of the business, each having potentially hundreds, or even thousands, of job skill set requirements and contract performance requirements and limitations. In addition, the problem becomes even more complicated when availability and workload for each qualified employee must also be taken into account.

The result is a problem complexity that makes it impossible for a human being to recognize significant relationships and interconnections between factors necessary to most effectively and efficiently allocate human resources to particular tasks, projects, or cases.

The current problem of effectively and efficiently allocating human resources to particular tasks and projects is an on-going and dynamically changing problem due, in part, to the fact that many businesses, such as businesses that provide support engineers, have employees whose skill sets and experience are constantly changing as the employees are assigned to various projects and complete various tasks, thereby obtaining new skills and valuable experience. However, despite the dynamic nature of employee skill sets, currently, employee skill set data is typically initially obtained from the employees themselves when the employees are first hired. Then, typically, the employee's skill set data is updated infrequently, at best, such as annually. This results in inaccurate employee skill set data for at least three reasons.

First, the employee declared employee skill set data is often incomplete because the employee either accidentally omits one or more skills when providing the skill set data, and/or does not realize historic participation in specific teams or projects has provided the employee with a new skill or experience level. As noted above, in some cases employee skill sets can include hundreds, and even thousands, of specific skills and it is very difficult for employees to track these skills, much less to remember to list them for an employer business and update their skill set data accurately.

Second, as noted above, as the employee works on various projects and performs tasks for the business in the course of their employment, the employee not only gains more experience augmenting existing skills, but also acquires new skills, often without even realizing this fact. Currently, this "on the job" acquired experience and "on the job" acquired new skills are often not reflected in the "current" employee skill set data.

Third, even for reported/known skills, there is currently no method or system for objectively comparing the skills of one employee with respect to the skills of another employee so that the skill sets of multiple employees can be compared objectively with respect to the needs of a given project, task, or case. As a result, currently, any comparisons and analysis of the skill set data of multiple employees lacks any "real world" or relative "real-time" insight regarding the skills of the employees and the identified needs of a given project or client.

The current difficulty encountered when trying to effectively and efficiently allocate human resources is not only problematic for the businesses desiring to allocate human resources, but is also problematic for the clients of the businesses in that inefficient and ineffective allocation of human resources to a client's project can adversely impact the quality of the work performed and the time it takes to complete that work. Consequently, the long-standing technical problem of a lack of an effective and efficient system for allocating human resources is a detriment to both the business employer and the clients of that business, potentially resulting in missed deadlines and benchmarks, lost man-hours, cost overruns, and lower quality work. This, in turn, can have a very negative impact on the reputation, branding, and client/potential client, impressions of the business What is needed is a technical solution to the long-standing technical problem of effectively, efficiently, and objectively allocating human resources, i.e., assigning the most qualified employees to specific tasks and projects, in a manner that provides the most benefit to both the employer business and the clients of that business.

SUMMARY

Embodiments of the present disclosure provide one or more technical solutions to the long-standing technical problem of effectively, efficiently, and objectively assigning the most qualified employees to specific projects and tasks by disclosing a multi-dimensional human resource allocation adviser that automatically provides multi-dimensional employee assignment recommendations.

In one embodiment, the disclosed multi-dimensional human resource allocation adviser integrates with one or more employee skill set data sources to obtain holistic employee skill set data including both initial/employee declared skill set data and dynamic aggregated "on the job" acquired employee skill set data. The holistic employee skill set data so obtained is then aggregated, processed, and stored as aggregated employee skill set data.

In one embodiment, one or more machine learning algorithms are then used to identify, normalize, and rank the aggregated employee skill set data with respect to skill sets identified as being needed for a given project, case, or task and any job specific requirements associated with the given project, task, or case. In one embodiment, by this process, a set of employees determined to have normalized employee skill set data that matches, or most closely matches, the identified required skill set for the task, project, or case, and that meet the job specific requirements associated with the given project, task, or case is identified.

In one embodiment, the set of employees determined to have normalized employee skill set data that matches, or most closely matches, the identified required skill set for the task, project, or case and that meet the job specific requirements associated with the given project, task, or case, is then filtered based on rules and constraints determined and/or defined by the requirements of the business and/or by the client to identify a set of employees having normalized employee skill set data determined to match, or be the closest match, to the identified skill set for a project, task, or case, and that comply with the required rules and constraints.

In one embodiment, the set of employees having normalized employee skill set data determined to match, or be the closest match, to the identified skill set for a project, task, or case, and that comply with the required rules and constraints is then further processed/filtered based on employee competence with respect to the priority of the given project, task, or case, and/or regional considerations, and/or employee workload balancing considerations.

In one embodiment, the employee, or employees, having normalized skill set data most closely matching the identified skill set for the project, task, or case, that comply with the required rules and constraints and requirements associated with the given project, task, or case, and that meet the experience, region, and workload balancing requirements, are then recommended for assignment/allocation to the given project, task, or case.

Consequently, embodiments of the present disclosure use normalized multi-dimensional employee skill set data obtained from multiple sources along with machine learning algorithms, rules and constraints filtering, regional considerations, and workload balancing, to identify and recommend employees who: have the skills required to perform the tasks associated with a new project or case, are available and have the experience to perform the tasks associated with the project or case, and are eligible to be assigned to the new project, task, or case based on client and business requirements, regional requirements, and workload balancing considerations. Therefore, embodiments of the present disclosure address some of the shortcomings associated with traditional approaches to the long-standing technical problem of effectively and efficiently allocating human resources to projects, tasks, or cases being performed on behalf of the clients of the employer business.

In addition, the disclosed multi-dimensional system is not static or fixed, but rather is user customizable and capable or incorporating new data and input dynamically and in nearly real-time. This allows more data, elements, and dimensions, to be added to further refine the employee dynamic skills obtained from a potentially changing set of multiple sources.

BRIEF DESCRIPTION OF THE DRAWINGS

FIG. 4A is a specific illustrative example of initial employee/engineer skill profile data including initial/employee reported employee skill set data included in aggregated employee skill set data, in accordance with one embodiment.

FIG. 4B is a specific illustrative example of employee/engineer profile data included in dynamic employee/engineer skill set data of the aggregated employee skill set data, in accordance with one embodiment.

FIG. 4C is a specific illustrative example of employee/engineer product-module skills data included in dynamic employee/engineer skill set data of the aggregated employee skill set data, in accordance with one embodiment.

FIG. 4E is a specific illustrative example of employee/engineer complexity attained skills data included in dynamic employee/engineer skill set data of the aggregated employee skill set data, in accordance with one embodiment.

FIG. 6A shows a specific illustrative example of rules and constraints data included in a case assignment model showing selectable and editable rules and constraints in accordance with one embodiment.

FIG. 6B shows a specific illustrative example of a rules and constraints modification interface for setting and editing rule and constraint values in accordance with one embodiment.

FIG. 6C shows a specific illustrative example of a rules and constraints modification data entry interface for activating, setting, and editing rule and constraint values in accordance with one embodiment.

FIG. 9B is a specific illustrative example of the numerical results of from skill finding, skill normalizing, and skill ranking of FIG. 9A performed by the skill matching, normalization, and ranking sub-system of FIG. 7 in accordance with one embodiment.

FIG. 9C is a specific illustrative example of normalization data and processing attributes associated with one illustrative example of a normalization process performed by the skill matching, normalization, and ranking sub-system of FIG. 7, in accordance with one embodiment.

FIG. 9D illustrates some of the steps of a specific illustrative example of the skill matching process performed by the skill matching, normalization, and ranking sub-system of FIG. 7, in accordance with one embodiment.

FIGS. 17A, 17B, 17C, 17D, 17E, 17F, and 17G are specific illustrative examples of user interface screens in accordance with one embodiment that are indicative of the operation and user experience associated with one illustrative embodiment of a system and method for providing a multi-dimensional human resource allocation advisor.

Figure 1:
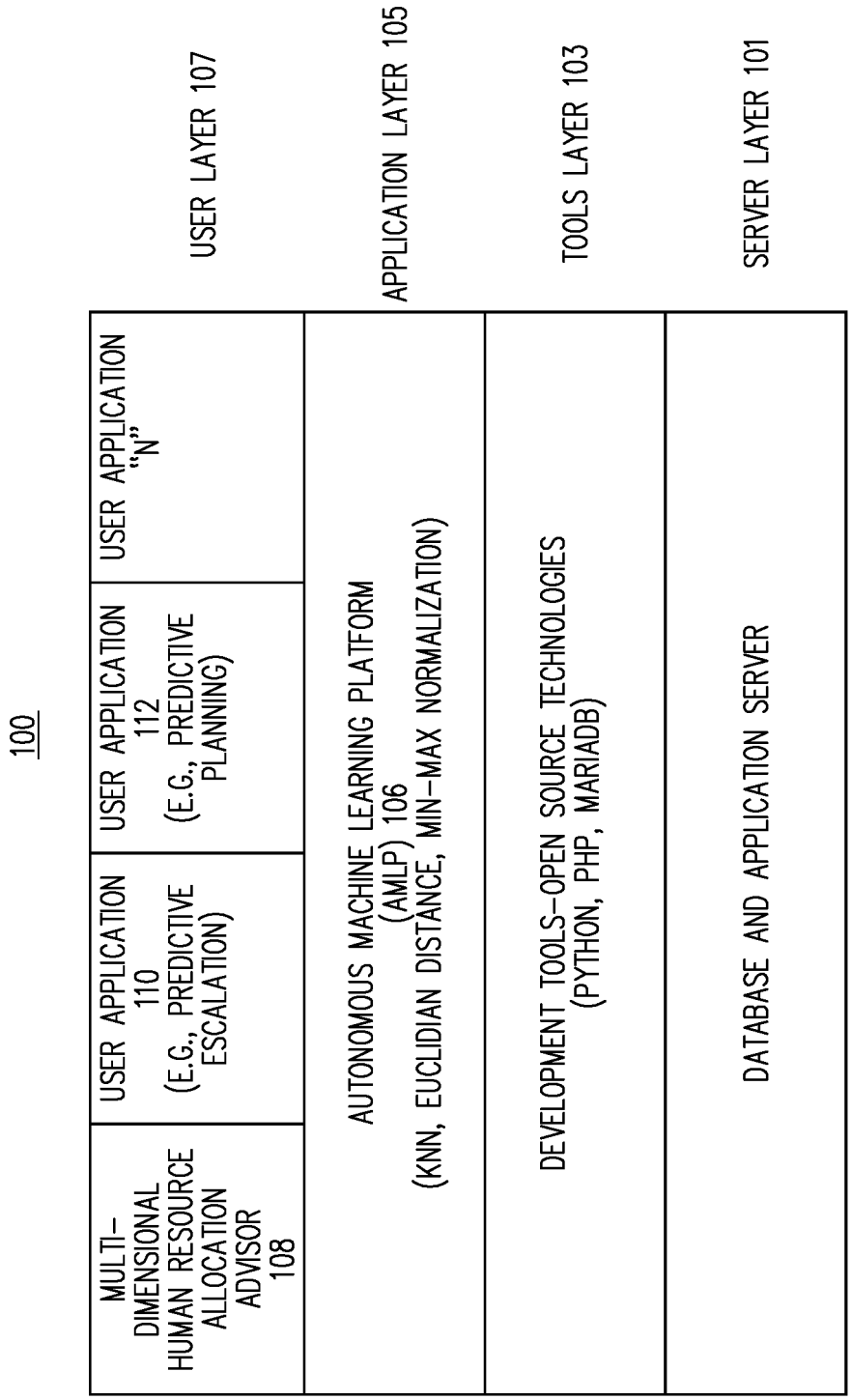
FIG. 1 is an illustration of the design hierarchy of a system and method for providing a multi-dimensional human resource allocation advisor, in accordance with one embodiment.

Common reference numerals are used throughout the FIGURES and the detailed description to indicate like elements. One skilled in the art will readily recognize that the above FIGURES are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of ordinary skill in the art.

OVERVIEW

As noted above, one of the major challenges facing businesses is effective and efficient allocation of human resources, i.e., the matching of employees' skill sets to the needs and requirements of particular tasks, projects, or cases to be performed on behalf of the clients of the employer business, and the allocation of employees and/or associates to those tasks. This is a particularly challenging and important issue when the business employs highly skilled and/or specialized personnel, such as engineers, technicians, or other professionals.

As also noted above, the problem of effectively and efficiently allocating human resources to particular tasks, projects, or cases is an on-going and dynamically changing problem due, in part, to the fact that many businesses, such as businesses that provide support engineers, have employees whose skill sets and experience are constantly changing as the employees are assigned to, and complete, various tasks, projects, or cases, and obtain new skills and valuable experience in the process.

As also noted above, despite the dynamic nature of employee skill sets, currently, employee skill set data is typically initially obtained from the employees themselves when the employees are first hired. Then, typically, the employee's skill set data is updated infrequently, at best, such as annually. This results in inaccurate and incomplete employee skill set data because the employee either accidentally omits one or more skills when providing the skill set data, and/or does not realize historic participation in specific teams or projects has provided the employee with a new skill or experience level. In addition, as noted above, as the employee works on various tasks, projects, or cases for the business in the course of their employment, the employee often gains both more experience augmenting existing skills, as well as new, "on the job" acquired skills, referred to herein as dynamic skills. Currently, these dynamic skills and experience acquired "on the job" are often not reflected in the employee skill set data.

The problem of efficiently and effectively allocating human resources is further complicated by the fact that many tasks, projects, or cases have specific requirements and employee skill sets that must be present in order for an employee to be able and eligible to perform a given task, project, or case. These job specific requirements and employee skill sets are often dictated by the clients, and/or other parties, and/or task/project/case-related contracts. These job specific requirements and employee skill sets and can include, but are not limited to, citizenship requirements, location requirements, language (both human and machine) requirements, geographic location and time zone requirements, full, part-time, or contract employee type requirements, etc. A problem arises from the fact that currently the job specific requirements data and employee skill set data are again typically spread out over multiple data sources that are not readily even identified, much less merged with existing employee skill set data to ensure that only qualified employees are assigned to a given task, project, or case.

In addition, efficiently and effectively allocating human resources is further hampered by the fact that any data representing whether a given employee has the experience to handle high-priority tasks, projects, or cases, and/or has the bandwidth to take on more tasks, projects, or cases, is again typically spread out over multiple data sources. Consequently, employee experience and workload data are typically not readily identified or merged with employee skill set data and job requirement data to ensure that only employees having the proper skill sets, are qualified to work on a particular task, project, or case, and have the experience and bandwidth to take on a given task, project, or case, are assigned to that task, project, or case.

The problem of effectively and efficiently allocating human resources is also aggravated by the fact that employee skill set data, including skill set data and historic performance data associated with tasks the employee has completed for the business, is often also spread out over multiple data sources. Typically, these potential sources of employee skill set data are not connected and/or integrated to provide a unified list or view of the employee's current skills, and most of these sources, and their data, are typically not even considered.

In addition, even for reported/known skills, there is currently no method for "normalizing" the skills of one employee with respect to the skills of another employee so that the skill sets of multiple employees can be compared objectively with respect to the needs of a given task, project, or case. This results from the current lack of consideration/integration of the effect of historical and current "on the job" employee performance and dynamic work experience parameters of the employees with respect to their skill sets and the potential tasks, projects, or cases and/or clients.

As a result, currently, any comparisons and analysis of the skill set data of multiple employees rendered using current methods lacks any "real world" and "on the job" performance considerations regarding the known skills of the employees and the identified needs of a given task/project/case or client. Consequently, there is currently no normalized and objective process through which dynamic employee skills obtained "on the job" can be uniformly evaluated, much less integrated in an employee's skill set data.

Finally, determining the best employee match for a new task, project, or case using both initial/employee declared skills and dynamic "on the job," acquired skills, even if this data were made available, is a challenging and non-trivial task. This is because consolidating, rectifying, and unifying the initial/employee declared skills data and dynamic skills data is so complicated it is beyond human capability. However, each source of skill set data provides skills dimensions that bring unique and different perspectives of employee skills that are important for a unified view of the employee skills, and for making conclusions and decisions for case assignments.

As noted above, the current difficulty encountered when trying to effectively and efficiently allocate human resources is not only extremely problematic for the businesses desiring to allocate human resources, but is also problematic for the clients of the businesses in that inefficient and ineffective allocation of human resources to a client's task, project, or case can adversely impact the quality of the work performed and the time it takes to complete that work. Consequently, the long-standing technical problem of a lack of a method and system to effectively and efficiently allocate human resources is a detriment to both the business employer and the clients of that business, potentially resulting in missed deadlines and benchmarks, lost man-hours, cost overruns, and lower quality work. This, in turn, can have a very negative impact on the reputation, branding, and client/potential client, impressions of the business.

Embodiments of the present disclosure provide one or more technical solutions to the long-standing technical problem of effectively and efficiently allocating human resources to tasks being performed on behalf of the clients of the business.

In one embodiment, a system, and computing system implemented method, for providing multi-dimensional human resource allocation recommendations includes obtaining access to one or more sources of employee skill set data and aggregating the employee skill set data to generate aggregated employee skill set data for a set of employees of a business.

In one embodiment, rules and constraints data governing the assignment of employees of the business to tasks to be performed by the employees of the business for clients of the business is generated.

In one embodiment, new case data representing a new task or project to be performed by employees of the business for a client of the business is obtained.

In one embodiment, the new case data is processed to generate new case requirements and skill set data representing required employee skills and qualifications for employees of the business that are to be assigned to the task or project represented by the new case data.

In one embodiment, the aggregated employee skill set data for each of the employees of the set of employees of the business and the new case requirements and skill set data are processed to identify skill set matched employee data representing a set of skill set matched employees having one or more matched skills matched to the new case skills and requirements represented in the new case requirements and skill set data.

In one embodiment, for each skill set matched employee, the matched skills for the skill set matched employee are normalized to generate normalized employee skill set data and for that skill set matched employee.

In one embodiment, the normalized employee skill set data for each skill set matched employee and the new case requirements and skill set data are provided to a machine learning algorithm to generate raw ranked skill matched employee recommendation data representing a set of raw ranked skill matched employees.

In one embodiment, the raw ranked skill matched employee recommendation data is filtered using the rules and constraints data to generate employee recommendation data representing a set of filtered and ranked skill matched employees.

In one embodiment, the recommended employee data is provided to a decision maker for approval, editing, and final employee assignment/allocation. In various embodiments, the decision maker receiving the recommended employee data for the new case can be, but is not limited to, one or more of: a human decision maker, such as a supervisor or other employee having access/decision maker permissions for approval, editing, and final employee assignment/allocation; one or more applications used for approval, editing, and final employee assignment/allocation, and/or for further processing of the recommended employee data for the new case; and/or any other entity, such as a corporation, responsible for approval, editing, and final employee assignment/allocation.

In one embodiment, a multi-dimensional human resource allocation adviser, and a system/method for providing multidimensional human resource allocation recommendations, is provided. In one embodiment, the multi-dimensional human resource allocation adviser, and system for providing multi-dimensional human resource allocation recommendations, integrates with one or more employee skill set data sources to obtain, process, aggregate, and normalize both initial employee skill set data and dynamic aggregated "on the job" acquired employee skill set data from those sources.

In one embodiment, the initial employee skill set data includes, but is not limited to, self-declared and reported skill set information from the employees themselves, and/or the employees' employment records, and/or the employees' HR records, and/or public records of certifications and schooling, and/or employee accounts with professional social media sites, and/or general social media sites, and/or any other source of initial, self-reported, and/or relatively static initial employee skill set data, as discussed or illustrated herein, and/or as known in the art at the time of filing, and/or as developed after the time of filing.

In one embodiment, the employees' dynamic employee skill set data associated with aggregated "on the job" acquired skills and performance is obtained at the product line, product, and release or version level based on, one or more of: dynamically updated task, project, or case closure data associated with the employees, including total number of closed tasks, projects, or cases; dynamically updated average time to close for tasks, projects, or cases; dynamically updated average client survey or ranking data per customer/product/employee; dynamically updated experience and team participation data, dynamically updated team leadership experience data; dynamically updated case priority experience; dynamically updated milestones per time period for determining the current loading of the employee; and/or any other source of dynamic employee skill set data as discussed or illustrated herein, as known in the art at the time of filing, and/or as developed after the time of filing.

In one embodiment, employee skill set consolidation is then performed based on a multi-dimensional analysis of the aggregated employee initial employee skill set data, the employees' dynamic employee skill set data, and other employee data such as, but not limited to, Human Resources (HR) and other employee records data, to generate aggregated employee skill set data, and to dynamically update the aggregated employee skill set data once it is generated.

In one embodiment, employer/supervisor-imposed rules and constraints are defined and employer/supervisor-imposed rules and constraints data is generated and stored.

In one embodiment, new case data is obtained. In one embodiment, the new case data is obtained from case intake and management systems used to enter new job requests by employees of the business and/or clients of the business.

In one embodiment, in addition to the new case data obtained, historic and/or current client data for the client associated with the new case data is also obtained. In various embodiments, the client data is aggregated client data and at least part of the client data is obtained as part of the new case data.

In one embodiment, the new case data and client data is then processed to identify new case requirements and/or contractual obligations associated with the new case and the skill set that will be required of the employees assigned to the new case in order to meet the needs of the client. In one embodiment, new case requirements and skill set data is then generated representing the identified new case requirements and/or contractual obligations associated with the new case, and the new case required skill set.

In one embodiment, the new case requirements and skill set data is further processed to identify client-imposed rules and constraints and client-imposed rules and constraints data is generated. In one embodiment, the employer/supervisor-imposed rules and constraints data and the client-imposed rules and constraints data are then aggregated and rectified to generate new case rules and constraints data.

In one embodiment, machine learning algorithms are then used to identify, normalize, and rank the aggregated employee skill set data with respect to skill sets identified as being needed for a given task, project, or case and specific requirements associated with the given task, project, or case determined to be associated with the new case data.

To this end, in one embodiment, the new case requirements and skill set data and the new case rules and constraints data are used to generate new case vector data representing the required skills and requirements for a hypothetical employee ideally matched to the new case. In one embodiment, the new case vector data includes two or more new case ideal employee vector elements. In one embodiment, each of the two or more new case ideal employee vector elements correlates to one of the new case requirements and skill set data elements.

In one embodiment, the aggregated employee skill set data for each employee and the new case requirements and skill set data are skill matched to identify initial skill set matched employee data representing employees that appear to have associated skill set data that matches, or closely matches, the skill set indicated in the new case requirements and skill set data, along with their associated skill set data.

In one embodiment, employees are initially determined to match, or closely match, the skill set indicated in the new case requirements and skill set data based on identified common skills present in both the new case requirements and skill set data and the aggregated employee skill set data, also called matched skills or matched skill features.

In one embodiment, the matched skills included in the skill set for each employee represented in the initial skill set matched employee data are normalized to generate normalized initial skill set matched employee data for each employee. In one embodiment, the normalization process is based on the dynamic aggregated "on-the-job" acquired skill set data for the employee associated with the matched skills.

Consequently, the disclosed embodiments provide for "normalizing" the skills of one employee with respect to the skills of another employee so that the skill sets of multiple employees can be compared objectively with respect to the needs of a given task, project, or case. This is accomplished by dynamically taking into consideration, and integrating, the effect of historical and current aggregated "on the job" employee performance and work experience parameters of the employees with respect to their reported/known skills and the potential tasks, projects, and cases, and/or clients. As a result, using the disclosed embodiments, the comparisons and analysis of the skill set data of multiple employees reflects "real world" and aggregated "on the job" performance considerations regarding the reported/known skills of the employees and the identified needs of a given job or client. Consequently, the disclosed normalization process integrates aggregated dynamic employee skills obtained "on the job" to uniformly evaluate an employee's skill set data.

In one embodiment, the normalized matched skill set features represented in the normalized initial skill set matched employee data for each initially matched employee is then used to generate normalized employee skill set vector data for each employee represented in the initial skill set matched employee data. In one embodiment, the normalized employee skill set vector data includes normalized employee skill set vector elements that correlate to each of the normalized matched skill set features associated with each initially matched employee represented in the initial skill set matched employee data.

In one embodiment, the new case vector data, the normalized employee skill set vector data for each initially matched employee, and the new case rules and constraints data are used as input data to a previously trained machine learning model.

In one embodiment, the output of the machine learning model is raw ranked skill matched employee recommendation data. In one embodiment, the raw ranked skill matched employee recommendation data includes data representing the employees matched, or most closely matched, to the new case using the machine learning model.

In one embodiment, the raw ranked skill matched employee recommendation data is then filtered based on rules and constraints represented in the new case rules and constraints data to generate filtered skill matched employee recommendation data representing the employees matched, or most closely matched, to the new case that also comply with the rules and constraints of the new case rules and constraints data.

In one embodiment, the filtered skill matched employee recommendation data is then further processed/filtered to generate recommended employee data for the new case based on employee workload balancing, and/or regional considerations, and/or the need to more fully develop/expand individual employee skills, and/or anticipated needs or issues associated with a given task, project, or case.

In one embodiment, the recommended employee data for the new case includes data representing the employee, or employees, having normalized skill set data most closely matching the new case requirements and skill set data, that are in compliance with the new case rules and constraints, that meet the experience, regional, and/or workload balancing requirements, and that are therefore recommended for assignment/allocation to the new task, project, or case.

In one embodiment, the recommended employee data for the new case, and/or the reasons and ranking for the recommended employees, is provided to a decision maker for approval, editing, and final employee assignment/allocation. In various embodiments, the decision maker receiving the recommended employee data for the new case can be, but is not limited to, one or more of: a human decision maker, such as a supervisor or other employee having access/decision maker permissions for approval, editing, and final employee assignment/allocation; one or more applications used for approval, editing, and final employee assignment/allocation, and/or for further processing of the recommended employee data for the new case; and/or any other entity, such as a corporation, responsible for approval, editing, and final employee assignment/allocation.

As shown above, embodiments of the present disclosure use normalized multi-dimensional employee skill set data obtained from multiple sources along with machine learning algorithms, rules and constraints filtering, and load balancing to address some of the shortcomings associated with traditional approaches to the long-standing technical problem of effectively and efficiently allocating human resources to tasks, projects, or cases being performed on behalf of the clients of the employer business.

In addition, the disclosed multi-dimensional system is not static or fixed, but rather is user customizable and capable or incorporating new data and input dynamically and in nearly real-time. This allows more data, elements, and dimensions, to be added to further refine the employee dynamic skills obtained from a potentially changing set of multiple sources.

However, while the embodiments of the present disclosure provide highly efficient, effective, and versatile systems and methods for effectively and efficiently allocating human resources to tasks, projects, or cases being performed on behalf of the clients of the employer business, the disclosed embodiments of systems and methods for providing a multi-dimensional human resource allocation advisor do not encompass, embody, or preclude other forms of innovation in the area of human resource allocation.

In addition, the disclosed embodiments of systems and methods for providing a multi-dimensional human resource allocation advisor are not abstract ideas for at least several reasons.

First, as noted above, each employee of a business can potentially have numerous specialized skills, and/or experience with numerous specific products, modules, and/or features and/or capabilities associated with those products and modules for which the business provides support and employees. Given that each employee can have potentially hundreds of skills associated with potentially hundreds of products and modules, it is often the case that a single employee's skill set can include hundreds, or even thousands, of individual skills. Consequently, ensuring the efficient and effective allocation of the employees best suited, i.e., most qualified, to support a given task, project, or case can rapidly become a complicated and daunting task.

Indeed, the problem can be so complex that it is not possible for a human being to accurately identify and comprehend the interaction and relationships between the skill sets of multiple, even hundreds, of employees, each having potentially hundreds, or even thousands, of individual skills, and the requirements of multiple, even hundreds, of tasks, projects, or cases for potentially hundreds of clients of the business, each having potentially hundreds, or even thousands, of skill set requirements and contract performance requirements and limitations. The problem becomes even more complicated when availability, regional need, and workload for each qualified employee must also be taken into account. The result is a problem complexity that makes it impossible for a human being to recognize significant relationships and interconnections between factors necessary to most effectively and efficiently allocate human resources to particular tasks, projects, or cases.

In contrast, the disclosed embodiments utilize machine learning techniques in a unique way to identify, normalize, and rank employee skill sets in ways a human being is not capable of doing, and based on relationships a human being could not discern. Consequently, the disclosed systems and methods for providing a multi-dimensional human resource allocation advisor are not abstract ideas because they are not merely an idea itself and cannot be performed mentally or using pen and paper.

Second, the disclosed systems and methods for providing a multi-dimensional human resource allocation advisor are not abstract ideas because they are not a fundamental economic practice (e.g., are not merely creating a contractual relationship, hedging, mitigating a settlement risk, etc.).

Third, although mathematics may be used in the disclosed systems and methods for providing a multi-dimensional human resource allocation advisor, the disclosed and claimed systems and methods are not abstract ideas because they are not simply a mathematical relationship/formula.

In addition, as discussed above, the disclosed method and system for providing a multi-dimensional human resource allocation advisor provides consolidated, normalized, and more focused data which provides for the processing and storage of consolidated and more accurate data, and minimizes the processing of irrelevant, inaccurate, or erroneous data. Therefore, using the disclosed embodiments, unnecessary data analysis, transfer, and storage is avoided. Consequently, using the disclosed method and system for providing a multi-dimensional human resource allocation advisor results in more efficient use of human and non-human resources, fewer processor cycles being utilized, reduced memory utilization, and less communications bandwidth being utilized to relay data to, and from, backend systems and various systems and parties. As a result, computing systems are transformed into faster, more efficient, and more effective computing systems by implementing the disclosed embodiments.

In addition, the disclosed embodiments represent an ordered combination of operations, including integration, normalization, and machine learning processing of data that together amount to significantly more than any abstract idea and represent an inventive concept and technological advancement.

FIG. 1 is an illustration of the design hierarchy 100 of a system and method for providing a multi-dimensional human resource allocation advisor, in accordance with one embodiment.

As seen in FIG. 1, design hierarchy 100 can include: server layer 101 which can include the various databases and application servers and their functions discussed and/or illustrated herein; tools layer 103 which can include the various development tools and/or open source technologies discussed and/or illustrated herein such as, but not limited to, Python, Personal Home Page (PHP), i.e., recursive initialism PHP, MariaDB, etc.; application layer 105 which can include the Autonomous Machine Learning Platform (AMLP) 106 disclosed herein and the machine learning algorithms, services and models, discussed and/or illustrated herein; and user layer 107 which can include one or more user applications.

In various embodiments, the one or more user applications of user layer 107 can include, but are not limited to: application 108 which, in the present disclosed embodiment, is Multi-dimensional Human Resources Allocation Advisor (MHRAA) application; application 110 which, in one embodiment, can be a predictive escalation application used to estimate the odds of a given case being escalated in priority; application 112 which, in one embodiment, can be a predictive planning application; and any number of other types of applications "N;" as discussed or illustrated herein, and/or as known in the art at the time of filing, and/or as developed after the time of filing.

In various embodiments, any or all of applications 108, 110, 112, and "N," use all, or part of, the components and functions of the Autonomous Machine Learning Platform (AMLP) of application layer 105, and the components of tools layer 103 and/or server layer 101, with various modifications, to perform their assigned tasks and provide their respective functions to users.

A focus of the current disclosure is on the interaction of the Autonomous Machine Learning Platform with Multi-dimensional Human Resources Allocation Advisor (MHRAA) application 108 for the purpose of providing a multi-dimensional human resources advisor, and multi-dimensional human resources recommendation data to users.

Process

Figure 2A:
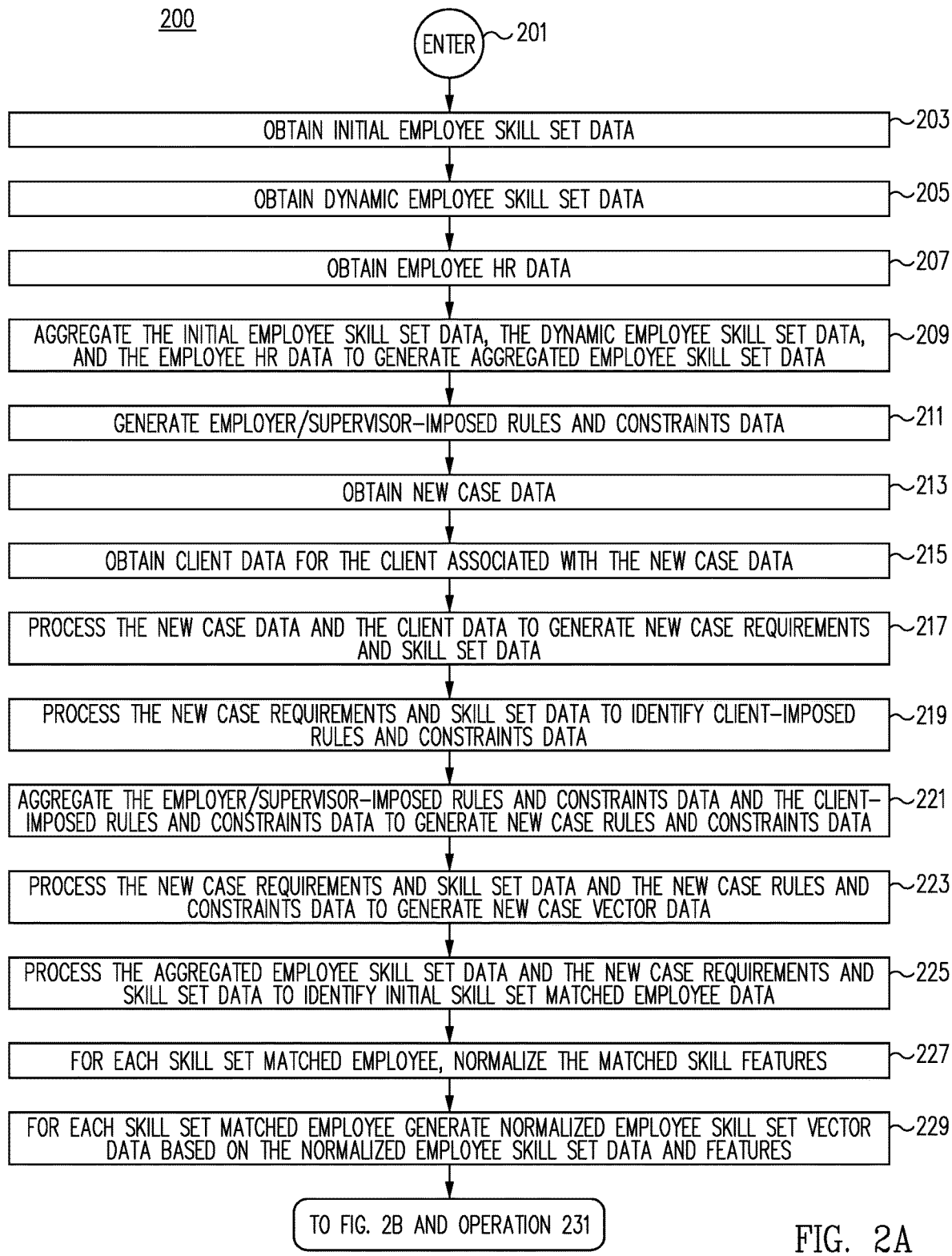
FIGS. 2A and 2B together are a flow diagram of a process for providing multi-dimensional human resource allocation recommendations, in accordance with one embodiment.
Figure 2B:
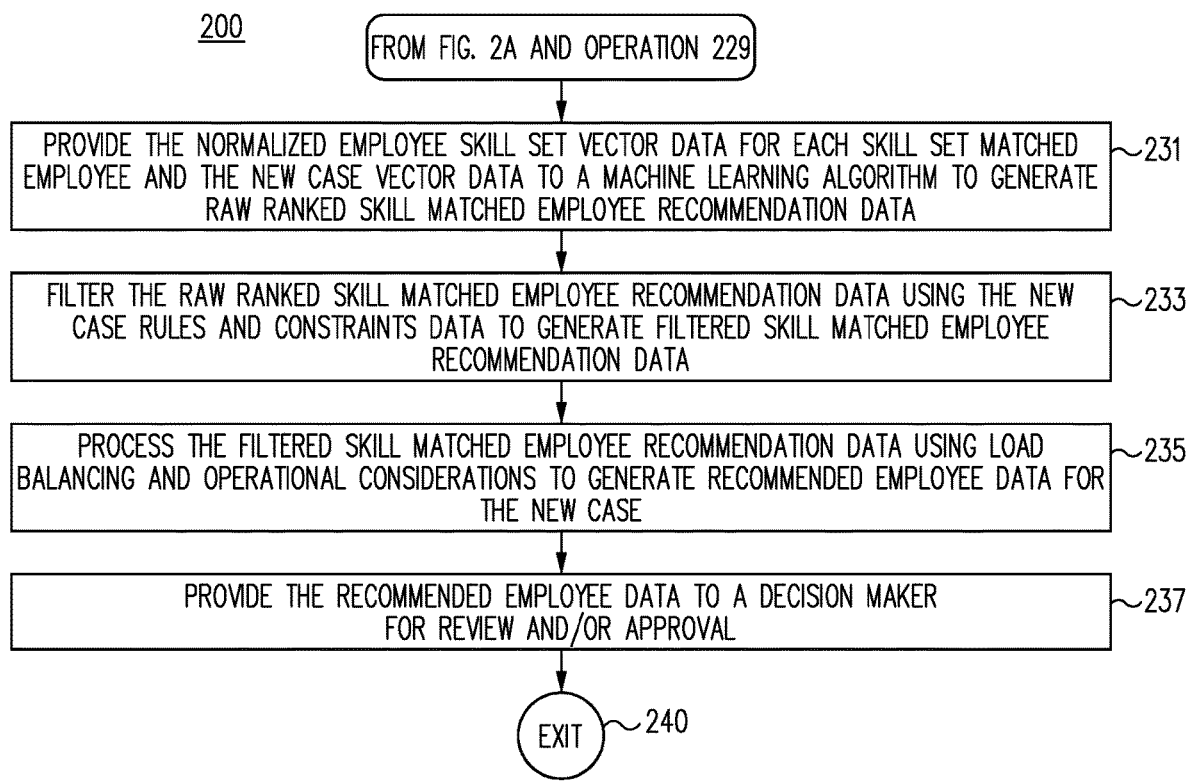

FIGS. 2A and 2B together are a flow diagram of a process for providing multi-dimensional human resource allocation recommendations, in accordance with one embodiment.

In one embodiment, process 200 for providing multi-dimensional human resource allocation recommendations begins at ENTER OPERATION 201 and process flow proceeds to OBTAIN INITIAL EMPLOYEE SKILL SET DATA OPERATION 203.

In one embodiment, at OBTAIN INITIAL EMPLOYEE SKILL SET DATA OPERATION 203 initial employee skill set data is obtained from one or more sources.

In one embodiment, at OBTAIN INITIAL EMPLOYEE SKILL SET DATA OPERATION 203, the initial employee skill set data is obtained from one or more sources including, but not limited to, one or more of: the employees themselves, and/or the employees' employment records, and/or the employees' HR records, and/or public records of certifications and schooling, and/or employee accounts with professional social media sites, and/or general social media sites, and/or any other source of initial, self-reported/declared, and/or relatively static initial employee skill set data, as discussed or illustrated herein, and/or as known in the art at the time of filing, and/or as developed after the time of filing.

FIG. 4A is a specific illustrative example of initial employee skill set data where the employees are engineers and the initial employee skill set data is presented in an initial employee/engineer skill profile 400. FIG. 4A is discussed in more detail below.

Returning to FIGS. 2A and 2B, in one embodiment, once initial employee skill set data is obtained from one or more sources at OBTAIN INITIAL EMPLOYEE SKILL SET DATA OPERATION 203, process flow proceeds to OBTAIN DYNAMIC EMPLOYEE SKILL SET DATA OPERATION 205.

In one embodiment, at OBTAIN DYNAMIC EMPLOYEE SKILL SET DATA OPERATION 205 dynamic employee skill set data associated with aggregated "on the job" acquired employee skills and performance is obtained.

In one embodiment, at OBTAIN DYNAMIC EMPLOYEE SKILL SET DATA OPERATION 205 the employees' dynamic employee skill set data associated with aggregated "on the job" acquired skills and performance includes, and is obtained at the product line, product, and release or version level based on, one or more of: dynamically updated task, project, or case closure data associated with the employees, including total number of closed tasks, projects, or cases; dynamically updated average time to close for tasks, projects, or cases; dynamically updated average client survey or ranking data per customer/product/employee; dynamically updated experience and team participation data, dynamically updated team leadership experience data; dynamically updated case priority experience; dynamically updated milestones per time period for determining the current loading of the employee; and/or any other source of dynamic employee skill set data as discussed or illustrated herein, as known in the art at the time of filing, and/or as developed after the time of filing.

FIGS. 4B through 4F illustrate specific illustrative examples of dynamic employee skill data for the specific illustrative example where the employees are software engineers.

Figure 4D:
FIG. 4D is a specific illustrative example of employee/engineer case type skills data included in dynamic employee/engineer skill set data of the aggregated employee skill set data, in accordance with one embodiment.
Figure 4F:
FIG. 4F is a specific illustrative example of employee/engineer survey averages data included in dynamic employee/engineer skill set data of the aggregated employee skill set data, in accordance with one embodiment.

In particular: FIG. 4B is a specific illustrative example of employee/engineer profile data 420 in accordance with one embodiment; FIG. 4C is a specific illustrative example of employee/engineer product-module skills data 430 included in the dynamic employee skill data in accordance with one embodiment; FIG. 4D is a specific illustrative example of employee/engineer case type skills data 440 included in dynamic employee skill data in accordance with one embodiment; FIG. 4E is a specific illustrative example of employee/engineer complexity attained skills data 450, included in dynamic employee skill data in accordance with one embodiment; and FIG. 4F is a specific illustrative example of employee/engineer survey averages data 460 included in dynamic employee skill data in accordance with one embodiment.

FIG. 4A through 4F are discussed in more detail below.

Returning to FIGS. 2A and 2B, in one embodiment, once dynamic employee skill set data associated with aggregated "on the job" acquired employee skills and performance is obtained at OBTAIN DYNAMIC EMPLOYEE SKILL SET DATA OPERATION 205, process flow proceeds to OBTAIN EMPLOYEE HR DATA OPERATION 207.

In one embodiment, at OBTAIN EMPLOYEE HR DATA OPERATION 207 Human Resources (HR) data associated with the employees is obtained.

In various embodiments, the HR data associated with the employees obtained at OBTAIN EMPLOYEE HR DATA OPERATION 207 can include, but is not limited to: the geographic location of the employee; the time zone associated with the employee; the working time zone associated with the employee; human languages the employee understands, speaks or writes; machine and programming languages the employee has proficiency with; employee certifications and/or education data; employee type, such as full-time, part time, contractor, etc.; employee planned Paid Time Off (PTO); and/or any other HR data, as discussed or illustrated herein, and/or as known in the art at the time of filing, and/or as becomes known/available after the time of filing.

In one embodiment, once HR data associated with the employees is obtained at OBTAIN EMPLOYEE HR DATA OPERATION 207, process flow proceeds to AGGREGATE THE INITIAL EMPLOYEE SKILL SET DATA, THE DYNAMIC EMPLOYEE SKILL SET DATA, AND THE EMPLOYEE HR DATA TO GENERATE AGGREGATED EMPLOYEE SKILL SET DATA OPERATION 209.

In one embodiment, at AGGREGATE THE INITIAL EMPLOYEE SKILL SET DATA, THE DYNAMIC EMPLOYEE SKILL SET DATA, AND THE EMPLOYEE HR DATA TO GENERATE AGGREGATED EMPLOYEE SKILL SET DATA OPERATION 209 employee skill set consolidation is performed.

In one embodiment, at AGGREGATE THE INITIAL EMPLOYEE SKILL SET DATA, THE DYNAMIC EMPLOYEE SKILL SET DATA, AND THE EMPLOYEE HR DATA TO GENERATE AGGREGATED EMPLOYEE SKILL SET DATA OPERATION 209, employee skill set consolidation is performed based on a multi-dimensional analysis of the aggregated initial employee skill set data, dynamic employee skill set data, and other employee data such as, but not limited to, Human Resources (HR), and/or other employee records data, to generate aggregated employee skill set data for each employee, and dynamically update the aggregated employee skill set data for each employee.

As discussed below, in one embodiment, the disclosed consolidating, rectifying, and unifying of the initial employee skill set data, the dynamic employee skill set data, and the employee HR data performed at AGGREGATE THE INITIAL EMPLOYEE SKILL SET DATA, THE DYNAMIC EMPLOYEE SKILL SET DATA, AND THE EMPLOYEE HR DATA TO GENERATE AGGREGATED EMPLOYEE SKILL SET DATA OPERATION 209 provides employee skill set dimensions that bring unique and different perspectives of employee skills that are important for a unified view of the employee skills, and, as also discussed in more detail below, allow for the generation and normalization of employee skill set data which, in turn, is used in one embodiment, to generate the disclosed normalized employee skill set vector data used for making conclusions and decisions for case assignments in accordance with one embodiment.

In one embodiment, once employee skill set consolidation is performed at AGGREGATE THE INITIAL EMPLOYEE SKILL SET DATA, THE DYNAMIC EMPLOYEE SKILL SET DATA, AND THE EMPLOYEE HR DATA TO GENERATE AGGREGATED EMPLOYEE SKILL SET DATA OPERATION 209, process flow proceeds to GENERATE EMPLOYER/SUPERVISOR-IMPOSED RULES AND CONSTRAINTS DATA OPERATION 211.

In one embodiment, at GENERATE EMPLOYER/SUPERVISOR-IMPOSED RULES AND CONSTRAINTS DATA OPERATION 211 employer/supervisor-imposed rules and constraints are defined and employer/supervisor-imposed rules and constraints data is generated.

In one embodiment, specific examples of employer/supervisor-imposed rules and constraints defined at GENERATE EMPLOYER/SUPERVISOR-IMPOSED RULES AND CONSTRAINTS DATA OPERATION include, but are not limited to: rules and constraints limiting the number of active tasks, projects, or cases that can be assigned to any, or particular, employees; rules and constraints limiting the number of active deadlines or benchmarks per defined time frame that can be assigned to any, or particular, employees; rules and constraints limiting the maximum number of active tasks, projects, or cases of a particular priority or urgency that can be assigned to any, or particular, employees; rules and constraints regarding the use of particular types of employees, such as full-time employees, before assigning other types of employees, such as contract employees; rules and constraints regarding employee experience required for various roles with different priority tasks, projects, or cases, and clients, and/or any other employer/supervisor-imposed rules and constraints as discussed or illustrated herein, and/or as known in the art at the time of filing, and/or as developed or made available after the time of filing.

Of note, typically, cases having a higher assigned priority have a correspondingly higher number of associated milestones/goals for a given time frame. As an example, a priority two (P2) case may have 5 milestones/goals being tracked per week while a priority one (P1) case may have 10 milestones per day. Consequently, using the disclosed embodiments, not just the total number of cases is tracked, but also the priority, and therefore associated milestones/goals per given time frame, is tracked.

In one embodiment, specific examples of employer/supervisor-imposed rules and constraints defined at GENERATE EMPLOYER/SUPERVISOR-IMPOSED RULES AND CONSTRAINTS DATA OPERATION include also, but are not limited to: rules and constraints pertaining to the region an employee works in, and the teams, supervisors, and organization for that region, to allow for the selection of employees that can service a product line and/or support a team for clients and cases throughout the globe in a "follow the sun" model where cases can be passed between teams, regions, and offices globally to reduce delays and increase responsiveness to clients.

In one embodiment, the employer/supervisor-imposed rules and constraints can be activated and/or modified and adjusted at any time by any employer or supervisor with access rights and for any supported product or module. Consequently, the disclosed embodiments are extremely flexible in that thresholds and rule and constraint sets can be defined and modified for each of the employee skills with respect to any product line, product team, service, client, or case, at any time, and by anyone having access/allocation rights.

In one embodiment, once employer/supervisor-imposed rules and constraints are defined and employer/supervisor-imposed rules and constraints data is generated at GENERATE EMPLOYER/SUPERVISOR-IMPOSED RULES AND CONSTRAINTS DATA OPERATION 211, process flow proceeds to OBTAIN NEW CASE DATA OPERATION 213.

In one embodiment, at OBTAIN NEW CASE DATA OPERATION 213 new case data is obtained.

In one embodiment, the new case data is obtained at OBTAIN NEW CASE DATA OPERATION 213 from case intake and management systems used to enter new task, project, or case requests by employees of the business and/or clients of the business.

In various embodiments, the new case data includes, but is not limited to, data representing: the name of the task, project, or case; the name of the client for which the task, project, or case is to be performed; the priority of the task, project, or case; the priority of the client associated with the task, project, or case; the equipment type or product line associated with the task, project, or case; any subcomponents included with the equipment type or product line associated with the task, project, or case; the type of task, project, or case; the complexity of task, project, or case; whether the client associated with the task, project, or case is an escalated or strategic client; the average of any survey or review data associated with the client and/or task, project, or case; the geographic location of the client and/or where task, project, or case is to be performed; the time zone associated with the location of the client and/or where the task, project, or case is to be performed; and/or any other new case data, as discussed or illustrated herein, and/or as known in the art at the time of filing, and/or as made available after the time of filing.

In one embodiment, once new case data is obtained at OBTAIN NEW CASE DATA OPERATION 213, process flow proceeds to OBTAIN CLIENT DATA FOR THE CLIENT ASSOCIATED WITH THE NEW CASE DATA OPERATION 215.

In one embodiment, in addition to the new case data obtained, historic and current client data for the client associated with the new case data is obtained at OBTAIN CLIENT DATA FOR THE CLIENT ASSOCIATED WITH THE NEW CASE DATA OPERATION 215. In various embodiments, the client data obtained at OBTAIN CLIENT DATA FOR THE CLIENT ASSOCIATED WITH THE NEW CASE DATA OPERATION 215 is aggregated client data and at least part of the client data is obtained as part of the new case data and can include, but is not limited to, data representing: the priority of the client; the type of equipment or product lines associated with the client; any contractual obligations and/or requirements associated with the client and/or task, project, or case performed on behalf of the client; whether the client is an escalated or strategic client; the average of any survey or review data associated with the client; the geographic location of the client; the time zone associated with the location of the client; and/or any other client data, as discussed or illustrated herein, and/or as known in the art at the time of filing, and/or as made available or known after the time of filing.

In various embodiments, the client data is obtained from one or more of, but not limited to: client and/or case records maintained by the employer business; social media accounts associated with the client; websites and advertising associated with the client; and/or any other source of client data, as discussed or illustrated herein, and/or as known in the art at the time of filing, and/or as made available or known after the time of filing.

In one embodiment, once historic and current client data for the client associated with the new case data is obtained at OBTAIN CLIENT DATA FOR THE CLIENT ASSOCIATED WITH THE NEW CASE DATA OPERATION 215, process flow proceeds to PROCESS THE NEW CASE DATA AND THE CLIENT DATA TO GENERATE NEW CASE REQUIREMENTS AND SKILL SET DATA OPERATION 217.

In one embodiment, at PROCESS THE NEW CASE DATA AND THE CLIENT DATA TO GENERATE NEW CASE REQUIREMENTS AND SKILL SET DATA OPERATION 217 new case requirements and skill set data is identified/generated.

In one embodiment, at PROCESS THE NEW CASE DATA AND THE CLIENT DATA TO GENERATE NEW CASE REQUIREMENTS AND SKILL SET DATA OPERATION 217 the new case data of OBTAIN NEW CASE DATA OPERATION 213 and the client data of OBTAIN CLIENT DATA FOR THE CLIENT ASSOCIATED WITH THE NEW CASE DATA OPERATION 215 is processed to identify new case requirements and/or contractual obligations associated with the new case and the skill set that will be required of the employees assigned to the new case in order to meet the needs of the task, project, or case and/or client.

In one embodiment, new case requirements and skill set data is then generated representing the identified new case requirements and/or contractual obligations associated with the new case and new case skill set.

In one embodiment, once new case requirements and skill set data is identified at PROCESS THE NEW CASE DATA AND THE CLIENT DATA TO GENERATE NEW CASE REQUIREMENTS AND SKILL SET DATA OPERATION 217, process flow proceeds to PROCESS THE NEW CASE REQUIREMENTS AND SKILL SET DATA TO IDENTIFY CLIENT-IMPOSED RULES AND CONSTRAINTS DATA OPERATION 219.

In one embodiment, at PROCESS THE NEW CASE REQUIREMENTS AND SKILL SET DATA TO IDENTIFY CLIENT-IMPOSED RULES AND CONSTRAINTS DATA OPERATION 219 client-imposed rules and constraints data is generated.

In one embodiment, at PROCESS THE NEW CASE REQUIREMENTS AND SKILL SET DATA TO IDENTIFY CLIENT-IMPOSED RULES AND CONSTRAINTS DATA OPERATION 219 the new case requirements and skill set data of PROCESS THE NEW CASE DATA AND THE CLIENT DATA TO GENERATE NEW CASE REQUIREMENTS AND SKILL SET DATA OPERATION 217 is further processed to identify client-imposed rules and constraints and client-imposed rules and constraints data is generated.

In various embodiments, the client-imposed rules and constraints data includes, but is not limited to: rules and constraints indicating required citizenship for employees working for the client and/or assigned to the new case; rules and constraints indicating required languages spoken by employees working for the client and/or assigned to the new case; rules and constraints regarding availability of employees working for the client and/or assigned to the new case; and/or any other client-imposed rules and constraints, as discussed or illustrated herein, and/or as known in the art at the time of filing, and/or as developed or made available after the time of filing.

In one embodiment, once the client-imposed rules and constraints data is generated at PROCESS THE NEW CASE REQUIREMENTS AND SKILL SET DATA TO IDENTIFY CLIENT-IMPOSED RULES AND CONSTRAINTS DATA OPERATION 219, process flow proceeds to AGGREGATE THE EMPLOYER/SUPERVISOR-IMPOSED RULES AND CONSTRAINTS DATA AND THE CLIENT-IMPOSED RULES AND CONSTRAINTS DATA TO GENERATE NEW CASE RULES AND CONSTRAINTS DATA OPERATION 221.

In one embodiment, at AGGREGATE THE EMPLOYER/SUPERVISOR-IMPOSED RULES AND CONSTRAINTS DATA AND THE CLIENT-IMPOSED RULES AND CONSTRAINTS DATA TO GENERATE NEW CASE RULES AND CONSTRAINTS DATA OPERATION 221 the employer/supervisor-imposed rules and constraints data of GENERATE EMPLOYER/SUPERVISOR-IMPOSED RULES AND CONSTRAINTS DATA OPERATION 211 and the client-imposed rules and constraints data of PROCESS THE NEW CASE REQUIREMENTS AND SKILL SET DATA TO IDENTIFY CLIENT-IMPOSED RULES AND CONSTRAINTS DATA OPERATION 219 are aggregated and rectified to generate new case rules and constraints data.

FIG. 6A shows specific illustrative examples of rules and constraints data representing selectable and editable rules and constraints generated at AGGREGATE THE EMPLOYER/SUPERVISOR-IMPOSED RULES AND CONSTRAINTS DATA AND THE CLIENT-IMPOSED RULES AND CONSTRAINTS DATA TO GENERATE NEW CASE RULES AND CONSTRAINTS DATA OPERATION 221.

As mentioned above, in one embodiment, the rules and constraints of FIG. 6A can be activated and/or modified and adjusted at any time by any employer or supervisor with access rights and for any supported product or module. Consequently, the disclosed embodiments are extremely flexible in that thresholds and rule and constraint sets can be defined for each of the employee skills with respect to any product line, product team, service, client, or task/project/case, at any time, and by anyone having access/allocation rights.

As a specific illustrative example, FIGS. 6B and 6C show specific illustrative examples of rules and constraints modification interfaces for setting and editing rule and constraint values in accordance with one embodiment.

FIGS. 6A, 6B, and 6C are discussed in more detail below.

Returning to FIGS. 2A and 2B, in one embodiment, once the employer/supervisor-imposed rules and constraints data and the client-imposed rules and constraints data are aggregated and rectified to generate new case rules and constraints data at AGGREGATE THE EMPLOYER/SUPERVISOR-IMPOSED RULES AND CONSTRAINTS DATA AND THE CLIENT-IMPOSED RULES AND CONSTRAINTS DATA TO GENERATE NEW CASE RULES AND CONSTRAINTS DATA OPERATION 221, process flow proceeds to PROCESS THE NEW CASE REQUIREMENTS AND SKILL SET DATA AND THE NEW CASE RULES AND CONSTRAINTS DATA TO GENERATE NEW CASE VECTOR DATA OPERATION 223.

As discussed below, in one embodiment, machine learning algorithms are used to identify, normalize, and rank the aggregated employee skill set data with respect to skill sets identified as being needed for a given task, project, or case and job specific requirements associated with the given project, task, or case, of the new case requirements and skill set data. To this end, in one embodiment, at PROCESS THE NEW CASE REQUIREMENTS AND SKILL SET DATA AND THE NEW CASE RULES AND CONSTRAINTS DATA TO GENERATE NEW CASE VECTOR DATA OPERATION 223 the new case requirements and skill set data of PROCESS THE NEW CASE DATA AND THE CLIENT DATA TO GENERATE NEW CASE REQUIREMENTS AND SKILL SET DATA OPERATION 217 and the new case rules and constraints data of AGGREGATE THE EMPLOYER/SUPERVISOR-IMPOSED RULES AND CONSTRAINTS DATA AND THE CLIENT-IMPOSED RULES AND CONSTRAINTS DATA TO GENERATE NEW CASE RULES AND CONSTRAINTS DATA OPERATION 221 are processed to generate new case vector data.

In one embodiment, at PROCESS THE NEW CASE REQUIREMENTS AND SKILL SET DATA AND THE NEW CASE RULES AND CONSTRAINTS DATA TO GENERATE NEW CASE VECTOR DATA OPERATION 223 the new case requirements and skill set data and the new case rules and constraints data are processed to generate new case vector data representing the required skills and requirements for a hypothetical employee ideally matched to the new case.

In one embodiment, the new case vector data is derived from identified new case ideal employee data and includes two or more new case vector elements corresponding to the new case ideal employee data elements. In one embodiment, the new case vector data is generated by one or more machine learning services and/or modules using the new case requirements and skill set data and the new case rules and constraints data as input data. In one embodiment, each of the two or more new case elements correlates to one of the new case requirements and skill set data elements.

In various embodiments, one or more of the machine learning services or modules includes but is not limited to, one or more of: a supervised machine learning service or model; an unsupervised machine learning service or model; a semi-supervised machine learning service or model; or any other machine learning service or model capable of generating new case vector data based on the new case requirements and skill set data and the new case rules and constraints data, as discussed or illustrated herein, and/or as known in the art at the time of filing, and/or as developed or made available after the time of filing.

Figure 8:
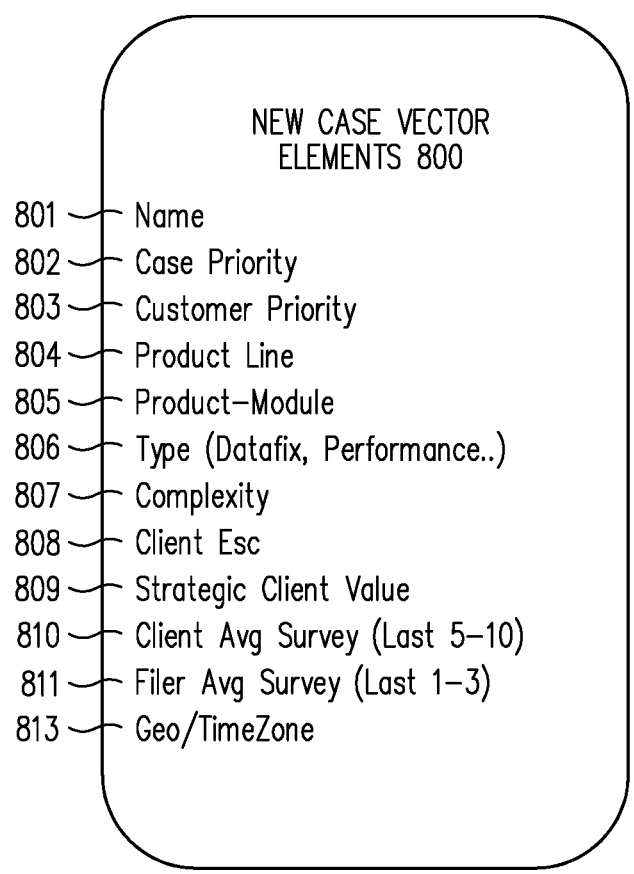
FIG. 8 is a graphic illustration of a specific illustrative example of new case vector elements, in accordance with one embodiment.

FIG. 8 is a graphic illustration of a specific illustrative example of new case vector elements 800 where the employees are software engineers, in accordance with one embodiment. FIG. 8 is discussed in more detail below.

Returning to FIGS. 2A and 2B, in one embodiment, once the new case vector data is generated at PROCESS THE NEW CASE REQUIREMENTS AND SKILL SET DATA AND THE NEW CASE RULES AND CONSTRAINTS DATA TO GENERATE NEW CASE VECTOR DATA OPERATION 223, process flow proceeds to PROCESS THE AGGREGATED EMPLOYEE SKILL SET DATA AND THE NEW CASE REQUIREMENTS AND SKILL SET DATA TO IDENTIFY INITIAL SKILL SET MATCHED EMPLOYEE DATA OPERATION 225.

In one embodiment, at PROCESS THE AGGREGATED EMPLOYEE SKILL SET DATA AND THE NEW CASE REQUIREMENTS AND SKILL SET DATA TO IDEN- TIFY INITIAL SKILL SET MATCHED EMPLOYEE DATA OPERATION 225 initial skill set matched employee data is generated.

In one embodiment, at PROCESS THE AGGREGATED EMPLOYEE SKILL SET DATA AND THE NEW CASE REQUIREMENTS AND SKILL SET DATA TO IDENTIFY INITIAL SKILL SET MATCHED EMPLOYEE DATA OPERATION 225 the aggregated employee skill set data for each employee and the new case requirements and skill set data are skill matched to identify initial skill set matched employee data representing employees that appear to have associated skill set data that matches, or most closely matches, the skill set indicated in the new case requirements and skill set data, along with their associated skill set data.

In one embodiment, at PROCESS THE AGGREGATED EMPLOYEE SKILL SET DATA AND THE NEW CASE REQUIREMENTS AND SKILL SET DATA TO IDENTIFY INITIAL SKILL SET MATCHED EMPLOYEE DATA OPERATION 225 the aggregated employee skill set data for each employee and the new case requirements and skill set data are skill matched using one or more machine learning algorithms such as, but not limited to, K nearest Neighbor (KNN) classification and weighted or non-weighted Euclidian Distance methods, or any other classification algorithms/methods, as discussed or illustrated herein, and/or as known in the art at the time of filing, and/or as developed after the time of filing.

In one embodiment, at PROCESS THE AGGREGATED EMPLOYEE SKILL SET DATA AND THE NEW CASE REQUIREMENTS AND SKILL SET DATA TO IDENTIFY INITIAL SKILL SET MATCHED EMPLOYEE DATA OPERATION 225 employees are initially determined to match, or most closely match, the skill set indicated in the new case requirements and skill set data based on identified common skills present in both the new case requirements and skill set data and the aggregated employee skill set data, also called matched skills or matched skill features.

In one embodiment, once initial skill set matched employee data is generated at PROCESS THE AGGREGATED EMPLOYEE SKILL SET DATA AND THE NEW CASE REQUIREMENTS AND SKILL SET DATA TO IDENTIFY INITIAL SKILL SET MATCHED EMPLOYEE DATA OPERATION 225, process flow proceeds to FOR EACH SKILL SET MATCHED EMPLOYEE, NORMALIZE THE MATCHED SKILL FEATURES OPERATION 227.

In one embodiment, machine learning algorithms are used to identify, normalize, and rank the aggregated employee skill set data with respect to skill sets identified as being needed for a given task, project, or case and job specific requirements associated with the given task, project, or case.

In one embodiment, at FOR EACH SKILL SET MATCHED EMPLOYEE, NORMALIZE THE MATCHED SKILL FEATURES OPERATION 227 normalized employee skill set data is generated for each employee skill set matched employee.

In one embodiment, the matched skills included in the skill set for each employee represented in the initial skill set matched employee data are normalized to generate normalized employee skill set data for each employee. In one embodiment, the normalization process is based on the dynamic "on-the-job" acquired skill set data for the employee associated with the matched skills.

In various embodiments, the dynamic skill set data for the employee associated with the matched skill set features can include, but is not limited to, data representing one or more of: total cases closed by the employee; average resolution time for cases closed by the employee; average customer satisfaction review score data for the employee; cases owned and/or closed by the employee that are related to the matched skill set feature; cases led and closed by the employee that are related to the skill set feature; cases contributed to by the employee that are related to the matched skill set feature; resolution time associated with cases owned, and/or closed, and/or participated in by the employee team that are related to the matched skill set feature; reviews and customer satisfaction input/ratings for the employee team associated with the matched skill set feature; and/or any other dynamic skill set data associated with an employee and a matched skill set feature, as discussed or illustrated herein, and/or as known in the art at the time of filing, and/or as becomes available after the time of filing.

Figure 9A:
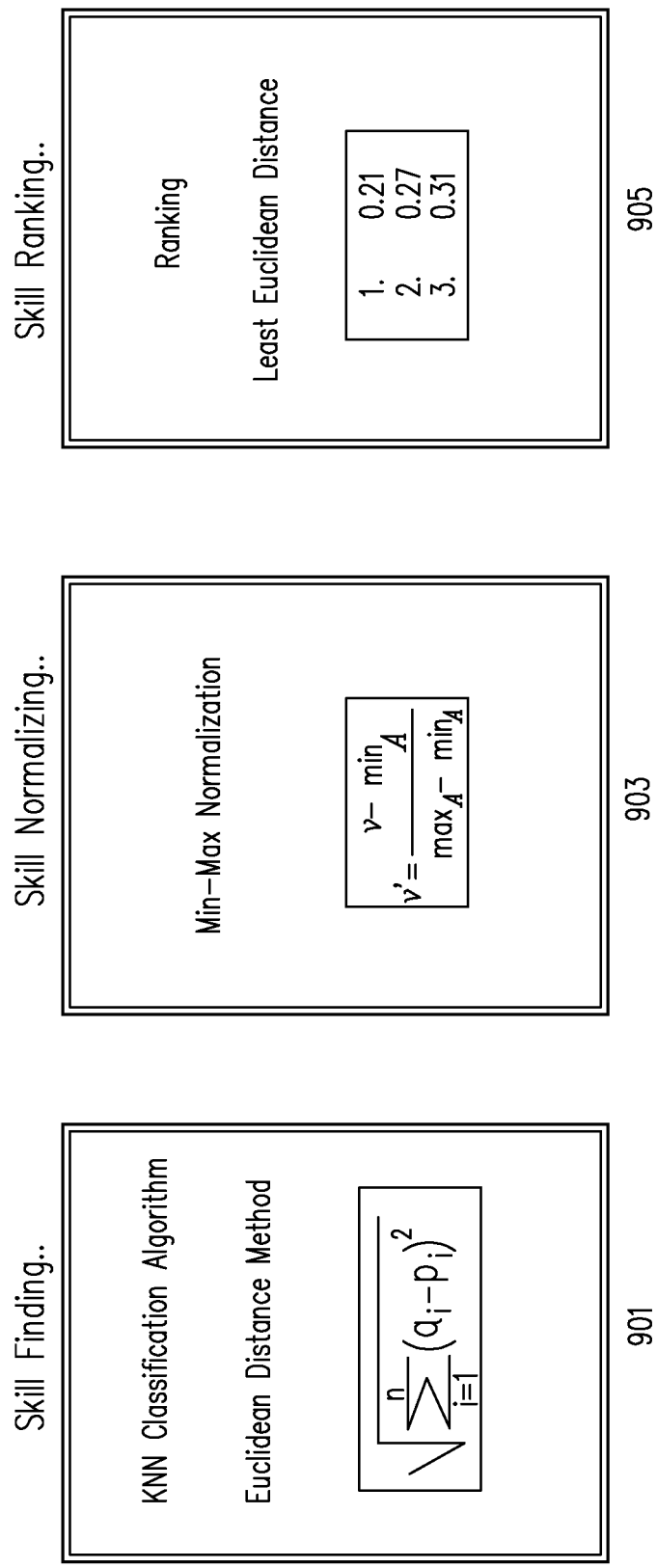
FIG. 9A is a high-level graphic illustration of a specific illustrative example of the skill finding, skill normalizing, and skill ranking performed by the skill matching, normalization, and ranking sub-system of FIG. 7 in accordance with one embodiment.

FIG. 9A is a high-level graphic illustration of a specific illustrative example of the skill finding, skill normalizing, and skill ranking performed in accordance with one embodiment.

FIG. 9B is a specific illustrative example of the results of the skill finding, skill normalizing, and skill ranking of FIG. 9A performed in accordance with one embodiment.

Returning to FIGS. 2A and 2B, in one embodiment, the normalized initial skill set matched employee data for each employee is generated using the dynamic skill set data for the employee associated with the matched skills and one or more machine learning algorithms such as, but not limited to, Min-Max Normalization, or any other normalization algorithms/methods, as discussed or illustrated herein, and/or as known in the art at the time of filing, and/or as developed after the time of filing.

FIG. 9C is a specific illustrative example of normalization data and processing attributes associated with one illustrative example of a normalization process performed in accordance with one embodiment.

FIG. 9D illustrates some of the steps of a specific illustrative example of the normalization and skill matching process in accordance with one embodiment.

The disclosed embodiments provide for "normalizing" the skills of one employee with respect to the skills of another employee so that the skill sets of multiple employees can be compared objectively with respect to the needs of a given task, project, or case. This is accomplished by taking into consideration, and integrating, the effect of historical and current aggregated "on the job" employee performance and dynamic work experience parameters of the employees with respect to their reported/known skills and the potential tasks, projects, or cases and/or clients. As a result, using the disclosed embodiments, the comparisons and analysis of the skill set data of multiple employees reflects "real world" and aggregated "on the job" performance considerations regarding the reported/known skills of the employees and the identified needs of a given task, project, or case or client. Consequently, the disclosed normalization process integrates dynamic employee skills obtained "on the job" to uniformly evaluate an employee's skill set data.

FIGS. 9A, 9B, 9C, and 9D are discussed in more detail below.

Returning to FIGS. 2A and 2B, in one embodiment, once normalized employee skill set data is generated for each employee skill set matched employee at FOR EACH SKILL SET MATCHED EMPLOYEE, NORMALIZE THE MATCHED SKILL FEATURES OPERATION 227, process flow proceeds to FOR EACH SKILL SET MATCHED EMPLOYEE GENERATE NORMALIZED EMPLOYEE SKILL SET VECTOR DATA BASED ON THE NORMALIZED EMPLOYEE SKILL SET DATA AND FEATURES OPERATION 229.

In one embodiment, at FOR EACH SKILL SET MATCHED EMPLOYEE GENERATE NORMALIZED EMPLOYEE SKILL SET VECTOR DATA BASED ON THE NORMALIZED EMPLOYEE SKILL SET DATA AND FEATURES OPERATION 229 normalized employee skill set vector data is generated.

In one embodiment, at FOR EACH SKILL SET MATCHED EMPLOYEE GENERATE NORMALIZED EMPLOYEE SKILL SET VECTOR DATA BASED ON THE NORMALIZED EMPLOYEE SKILL SET DATA AND FEATURES OPERATION 229, the normalized skill set features represented in the normalized employee skill set data for each initially matched employee of FOR EACH SKILL SET MATCHED EMPLOYEE, NORMALIZE THE MATCHED SKILL FEATURES OPERATION 227 is used to generate normalized employee skill set vector data for each employee represented in the initial skill set matched employee data. In one embodiment, the normalized employee skill set vector data includes normalized employee skill set vector elements that correlate to each of the normalized employee skill set data features associated with each initially matched employee represented in the initial skill set matched employee data.

In one embodiment, normalized employee skill set vector data for each initially matched employee is generated by one or more machine learning services and/or models using the normalized matched skill set features and the new case rules and constraints data as input data. In various embodiments, one or more of the machine learning services or modules includes but is not limited to, one or more of: a supervised machine learning service or model; an unsupervised machine learning service or model; a semi-supervised machine learning service or model; or any other machine learning service or model capable of generating normalized employee skill set vector data based on using the normalized employee skill set data features and the new case rules and constraints data as input data, as discussed or illustrated herein, and/or as known in the art at the time of filing, and/or as developed or made available after the time of filing.

Figure 10:
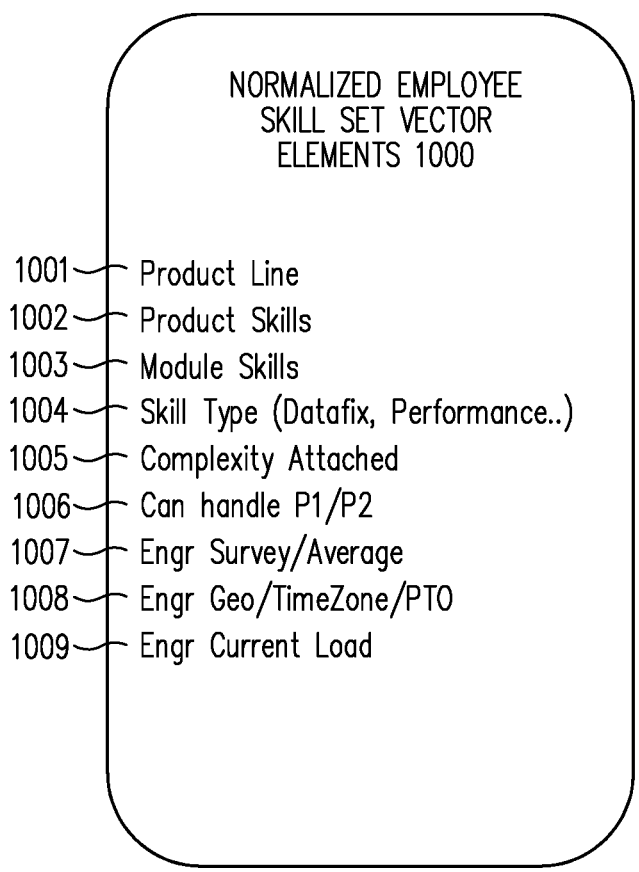
FIG. 10 is a graphic illustration of a specific illustrative example of normalized employee skill set vector elements, in accordance with one embodiment.

FIG. 10 is a graphic illustration of a specific illustrative example normalized employee skill set vector elements 1000, in accordance with one embodiment. FIG. 10 is discussed in more detail below.

Returning to FIGS. 2A and 2B, in one embodiment, once normalized employee skill set vector data is generated at FOR EACH SKILL SET MATCHED EMPLOYEE GENERATE NORMALIZED EMPLOYEE SKILL SET VECTOR DATA BASED ON THE NORMALIZED EMPLOYEE SKILL SET DATA AND FEATURES OPERATION 229, process flow proceeds from FIG. 2A to FIG. 2B and PROVIDE THE NORMALIZED EMPLOYEE SKILL SET VECTOR DATA FOR EACH SKILL SET MATCHED EMPLOYEE AND THE NEW CASE VECTOR DATA TO A MACHINE LEARNING ALGORITHM TO GENERATE RAW RANKED SKILL MATCHED EMPLOYEE RECOMMENDATION DATA OPERATION 231.

In one embodiment, at PROVIDE THE NORMALIZED EMPLOYEE SKILL SET VECTOR DATA FOR EACH SKILL SET MATCHED EMPLOYEE AND THE NEW CASE VECTOR DATA TO A MACHINE LEARNING ALGORITHM TO GENERATE RAW RANKED SKILL MATCHED EMPLOYEE RECOMMENDATION DATA OPERATION 231, raw ranked skill matched employee recommendation data is generated using one or more machine learning algorithms.

In one embodiment, at PROVIDE THE NORMALIZED EMPLOYEE SKILL SET VECTOR DATA FOR EACH SKILL SET MATCHED EMPLOYEE AND THE NEW CASE VECTOR DATA TO A MACHINE LEARNING ALGORITHM TO GENERATE RAW RANKED SKILL MATCHED EMPLOYEE RECOMMENDATION DATA OPERATION 231 the new case vector data of PROCESS THE NEW CASE REQUIREMENTS AND SKILL SET DATA AND THE NEW CASE RULES AND CONSTRAINTS DATA TO GENERATE NEW CASE VECTOR DATA OPERATION 223, the normalized employee skill set vector data for each initially matched employee of FOR EACH SKILL SET MATCHED EMPLOYEE GENERATE NORMALIZED EMPLOYEE SKILL SET VECTOR DATA BASED ON THE NORMALIZED EMPLOYEE SKILL SET DATA AND FEATURES OPERATION 229, and the new case rules and constraints data of AGGREGATE THE EMPLOYER/SUPERVISOR-IMPOSED RULES AND CONSTRAINTS DATA AND THE CLIENT-IMPOSED RULES AND CONSTRAINTS DATA TO GENERATE NEW CASE RULES AND CONSTRAINTS DATA OPERATION 221 are used as input data to a previously trained machine learning model.

In one embodiment, the machine learning model is trained in an offline environment using training data including, but not limited to: total cases closed by the employee; average resolution time for cases closed by the employee; average customer satisfaction review score data for the employee; historic case data, historic client data, historic initial employee skill set data, historic dynamic employee skill set data, historic employee HR data, and historic rules and constraints data, as well as aggregated task, project, or case completion data, customer review/ratings data, and other historic case and historic employee data. In one embodiment, using this training data, the machine learning model is trained to match and rank the normalized employee skill set vector data for each initially matched employee with the new case vector data using the new case rules and constraints data as matching constraints/filters.

In various embodiments, the machine learning model is any one or more of: a supervised machine learning service or model; an unsupervised machine learning service or model; a semi-supervised machine learning service or model; or any other machine learning service or model capable of matching and ranking the normalized employee skill set vector data for each initially matched employee with the new case vector data using the new case rules and constraints data as matching constraints/filters.

As a specific illustrative example, in one embodiment, the machine learning model utilizes weighted or non-weighted Euclidian Distance methods, or any other ranking algorithms/methods, as discussed or illustrated herein, and/or as known in the art at the time of filing, and/or as developed after the time of filing.

In one embodiment, the output of the machine learning model is raw ranked skill matched employee recommendation data. In one embodiment, the raw ranked skill matched employee recommendation data includes data representing the employees matched, or most closely matched, to the new case.

Figure 3:
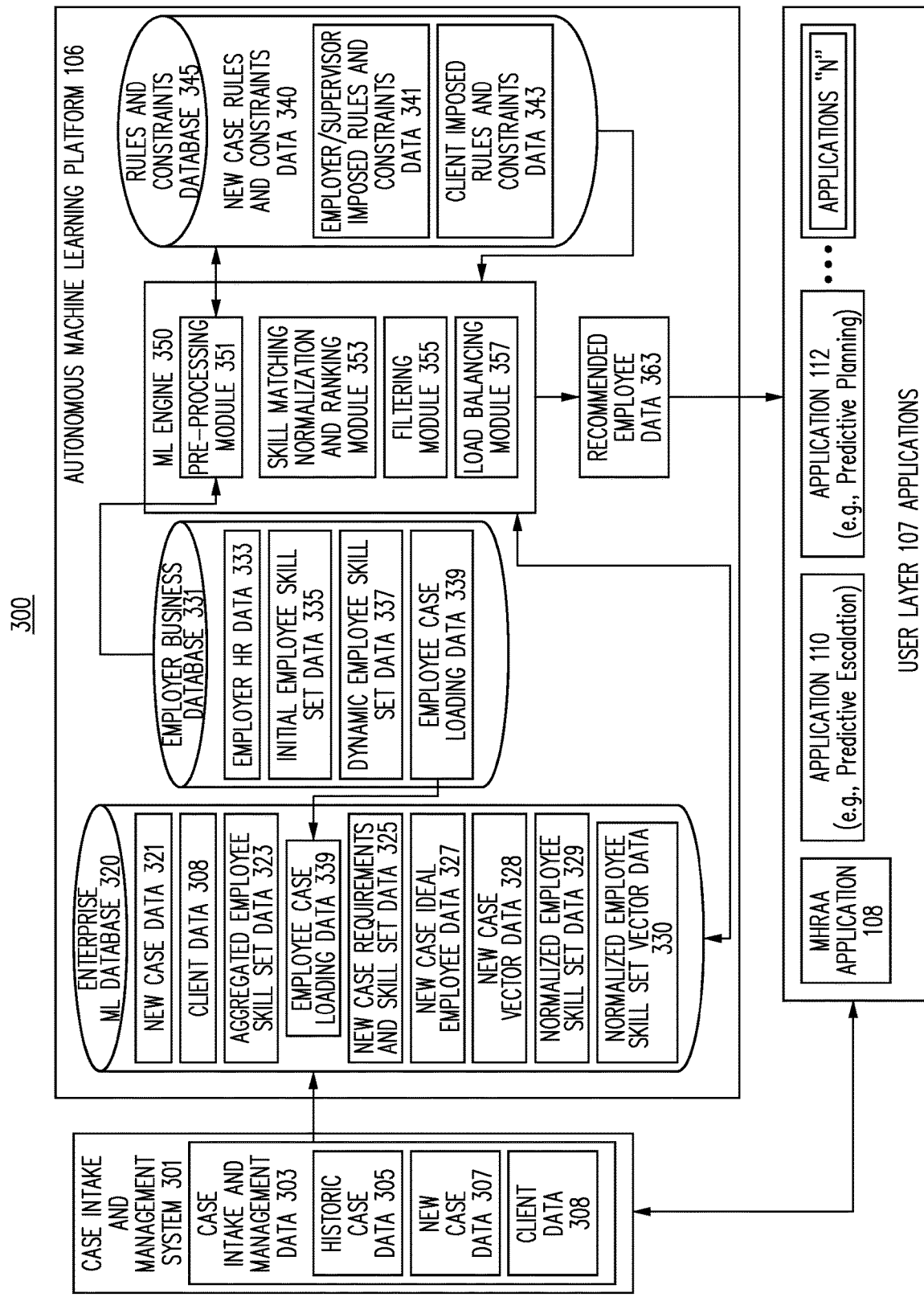
FIG. 3 is a component diagram showing the various components and overall interaction of the various components of a system for providing a multi-dimensional human resource allocation advisor, in accordance with one embodiment.
Figure 7:
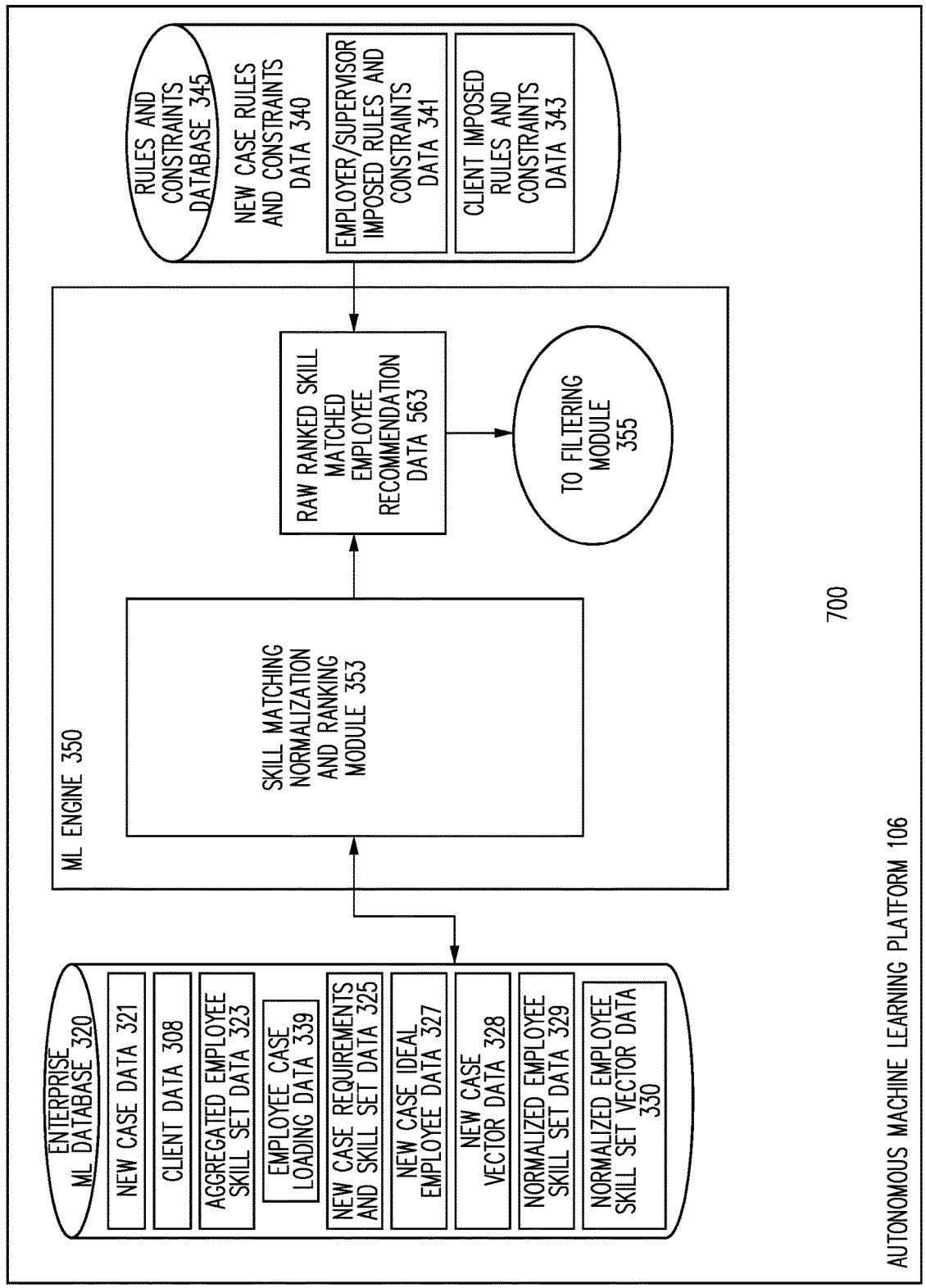
FIG. 7 is a component diagram showing the interaction of various components of a skill matching, normalization, and ranking sub-system of a system for providing a multi-dimensional human resource allocation advisor, in accordance with one embodiment.
Figure 11:
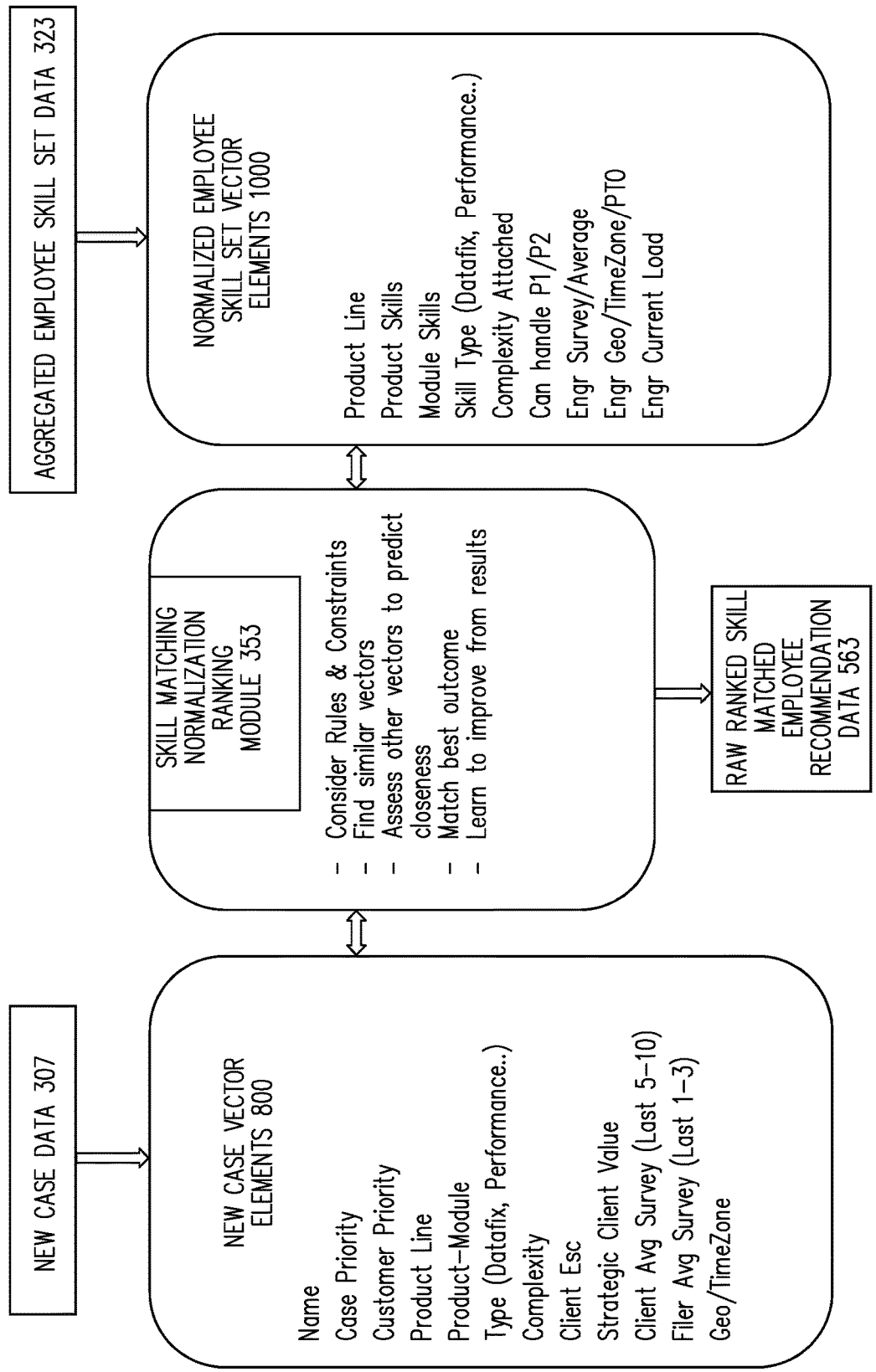
FIG. 11 is a graphic illustration of a specific illustrative example of the interaction and relationship of the new case data of FIG. 3, the new case vector elements of FIG. 8, the aggregated employee skill set data of FIG. 3, and the normalized employee skill set vector elements of FIG. 10, and the skill matching, normalization, and ranking sub-system of FIG. 7 in accordance with one embodiment.

FIG. 11 is a graphic illustration of a specific illustrative example of the interaction and relationship of the new case data 307 of FIG. 3 and new case vector elements 800 of FIG. 8, the aggregated employee skill set data 323 of FIG. 3 and normalized employee skill set vector elements 1000 of FIG. 10, the skill matching, normalization, and ranking sub-system 700 of FIG. 7, and raw ranked skill matched employee recommendation data 563 of FIG. 7 in accordance with one embodiment. FIGS. 3, 7, 8, 10, and 11 are discussed in more detail below.

Returning to FIGS. 2A and 2B, in one embodiment, once raw ranked skill matched employee recommendation data is generated using one or more machine learning algorithms at PROVIDE THE NORMALIZED EMPLOYEE SKILL SET VECTOR DATA FOR EACH SKILL SET MATCHED EMPLOYEE AND THE NEW CASE VECTOR DATA TO A MACHINE LEARNING ALGORITHM TO GENERATE RAW RANKED SKILL MATCHED EMPLOYEE RECOMMENDATION DATA OPERATION 231, process flow proceeds to FILTER THE RAW RANKED SKILL MATCHED EMPLOYEE RECOMMENDATION DATA USING THE NEW CASE RULES AND CONSTRAINTS DATA TO GENERATE FILTERED SKILL MATCHED EMPLOYEE RECOMMENDATION DATA OPERATION 233.

In one embodiment, at FILTER THE RAW RANKED SKILL MATCHED EMPLOYEE RECOMMENDATION DATA USING THE NEW CASE RULES AND CONSTRAINTS DATA TO GENERATE FILTERED SKILL MATCHED EMPLOYEE RECOMMENDATION DATA OPERATION 233 filtered skill matched employee recommendation data is generated.

In one embodiment, at FILTER THE RAW RANKED SKILL MATCHED EMPLOYEE RECOMMENDATION DATA USING THE NEW CASE RULES AND CONSTRAINTS DATA TO GENERATE FILTERED SKILL MATCHED EMPLOYEE RECOMMENDATION DATA OPERATION 233 the raw ranked skill matched employee recommendation data of PROVIDE THE NORMALIZED EMPLOYEE SKILL SET VECTOR DATA FOR EACH SKILL SET MATCHED EMPLOYEE AND THE NEW CASE VECTOR DATA TO A MACHINE LEARNING ALGORITHM TO GENERATE RAW RANKED SKILL MATCHED EMPLOYEE RECOMMENDATION DATA OPERATION 231 is filtered based on rules and constraints represented in the new case rules and constraints data of AGGREGATE THE EMPLOYER/SUPERVISOR-IMPOSED RULES AND CONSTRAINTS DATA AND THE CLIENT-IMPOSED RULES AND CONSTRAINTS DATA TO GENERATE NEW CASE RULES AND CONSTRAINTS DATA OPERATION 221 to generate filtered skill matched employee recommendation data representing the employees matched, or most closely matched, to the new case that also comply with the rules and constraints of the new case rules and constraints data.

Figure 13:
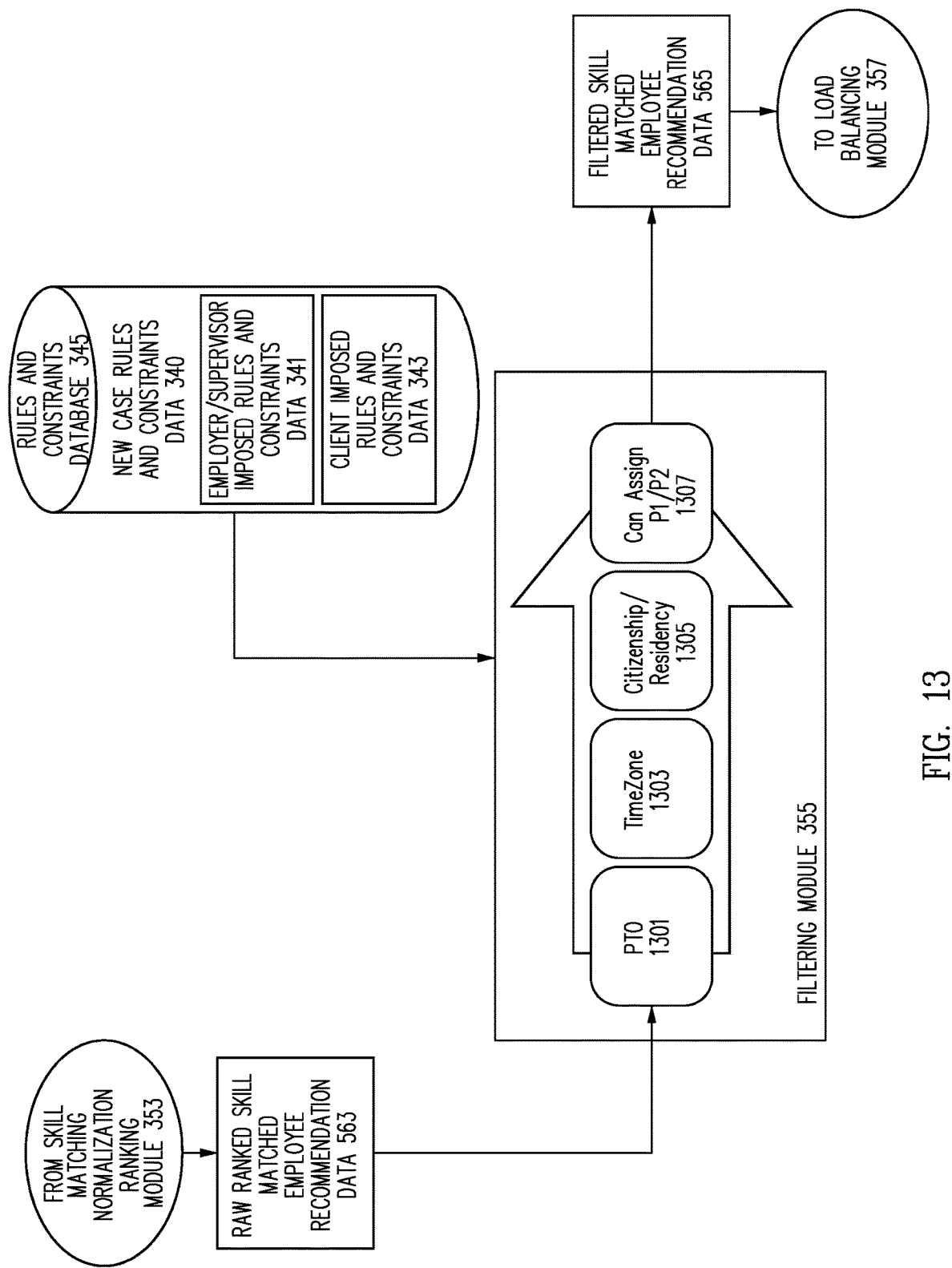
FIG. 13 is a simplified graphic illustration of the operation of a specific illustrative example of the filtering sub-system of FIG. 12 in accordance with one embodiment.

FIG. 13 is a graphic illustration of the operation of a specific illustrative example of the filtering sub-system in accordance with one embodiment. FIG. 13 is discussed in more detail below.

Returning to FIGS. 2A and 2B, in one embodiment, once filtered skill matched employee recommendation data is generated at FILTER THE RAW RANKED SKILL MATCHED EMPLOYEE RECOMMENDATION DATA USING THE NEW CASE RULES AND CONSTRAINTS DATA TO GENERATE FILTERED SKILL MATCHED EMPLOYEE RECOMMENDATION DATA OPERATION 233, process flow proceeds to PROCESS THE FILTERED SKILL MATCHED EMPLOYEE RECOMMENDATION DATA USING LOAD BALANCING AND OPERATIONAL CONSIDERATIONS TO GENERATE RECOMMENDED EMPLOYEE DATA FOR THE NEW CASE OPERATION 235.

In one embodiment, at PROCESS THE FILTERED SKILL MATCHED EMPLOYEE RECOMMENDATION DATA USING LOAD BALANCING AND OPERATIONAL CONSIDERATIONS TO GENERATE RECOMMENDED EMPLOYEE DATA FOR THE NEW CASE OPERATION 235 recommended employee data for the new case is generated.

In one embodiment, at PROCESS THE FILTERED SKILL MATCHED EMPLOYEE RECOMMENDATION DATA USING LOAD BALANCING AND OPERATIONAL CONSIDERATIONS TO GENERATE RECOMMENDED EMPLOYEE DATA FOR THE NEW CASE OPERATION 235 the filtered skill matched employee recommendation data of FILTER THE RAW RANKED SKILL MATCHED EMPLOYEE RECOMMENDATION DATA USING THE NEW CASE RULES AND CONSTRAINTS DATA TO GENERATE FILTERED SKILL MATCHED EMPLOYEE RECOMMENDATION DATA OPERATION 233 is further processed/filtered to generate recommended employee data for the new case based on employee workload balancing considerations.

In one embodiment, the purpose of load balancing considerations at PROCESS THE FILTERED SKILL MATCHED EMPLOYEE RECOMMENDATION DATA USING LOAD BALANCING AND OPERATIONAL CONSIDERATIONS TO GENERATE RECOMMENDED EMPLOYEE DATA FOR THE NEW CASE OPERATION 235 is to further process and/or filter the filtered skill matched employee recommendation data to generate recommended employee data for the new case based on employee workload balancing considerations as indicated in employee case loading data and in accordance with one or more rules and constraints as indicated in new case rules and constraints data. This feature is discussed in more detail below with respect to FIG. 14.

In one embodiment, at PROCESS THE FILTERED SKILL MATCHED EMPLOYEE RECOMMENDATION DATA USING LOAD BALANCING AND OPERATIONAL CONSIDERATIONS TO GENERATE RECOMMENDED EMPLOYEE DATA FOR THE NEW CASE OPERATION 235 the filtered skill matched employee recommendation data of FILTER THE RAW RANKED SKILL MATCHED EMPLOYEE RECOMMENDATION DATA USING THE NEW CASE RULES AND CONSTRAINTS DATA TO GENERATE FILTERED SKILL MATCHED EMPLOYEE RECOMMENDATION DATA OPERATION 233 is further processed/filtered to generate recommended employee data for the new case based on developing/expanding individual employee skills.

In one embodiment, the purpose of the addition of developing/expanding individual employee skills considerations at FILTER THE RAW RANKED SKILL MATCHED EMPLOYEE RECOMMENDATION DATA USING THE NEW CASE RULES AND CONSTRAINTS DATA TO GENERATE FILTERED SKILL MATCHED EMPLOYEE RECOMMENDATION DATA OPERATION 233 is to develop the skill sets of the employees of the employer business while, at the same time, meeting the needs of the new case and client. To this end, employer/supervisor employee development rules governing the assignment of employees to jobs and cases where they can develop new, and defined, skills determined to be needed by the employer business and/or the clients of the business, are generated and stored in a rules and constraints. This feature is discussed in more detail below with respect to FIG. 16.

In one embodiment, at PROCESS THE FILTERED SKILL MATCHED EMPLOYEE RECOMMENDATION DATA USING LOAD BALANCING AND OPERATIONAL CONSIDERATIONS TO GENERATE RECOMMENDED EMPLOYEE DATA FOR THE NEW CASE OPERATION 235 the filtered skill matched employee recommendation data of FILTER THE RAW RANKED SKILL MATCHED EMPLOYEE RECOMMENDATION DATA USING THE NEW CASE RULES AND CONSTRAINTS DATA TO GENERATE FILTERED SKILL MATCHED EMPLOYEE RECOMMENDATION DATA OPERATION 233 is further processed/filtered to generate recommended employee data for the new case based the rules and constraints pertaining to the region or "theater" an employee works in, and the teams, supervisors, and organization for that region/theater, to allow for the selection of employees that can service a product line and/or support a team for clients and cases throughout the globe in a "follow the sun" model where cases can be passed between teams, regions, and offices globally to reduce delays and increase responsiveness to clients.

In one embodiment, the recommended employee data for the new case includes data representing the employee, or employees, having skill set data most closely matching the new case requirements and skill set data, that are in compliance with the new case rules and constraints, and that meet the experience and/or workload balancing requirements, and that are therefore recommended for assignment/allocation to the new task, project, or case.

Figure 15:
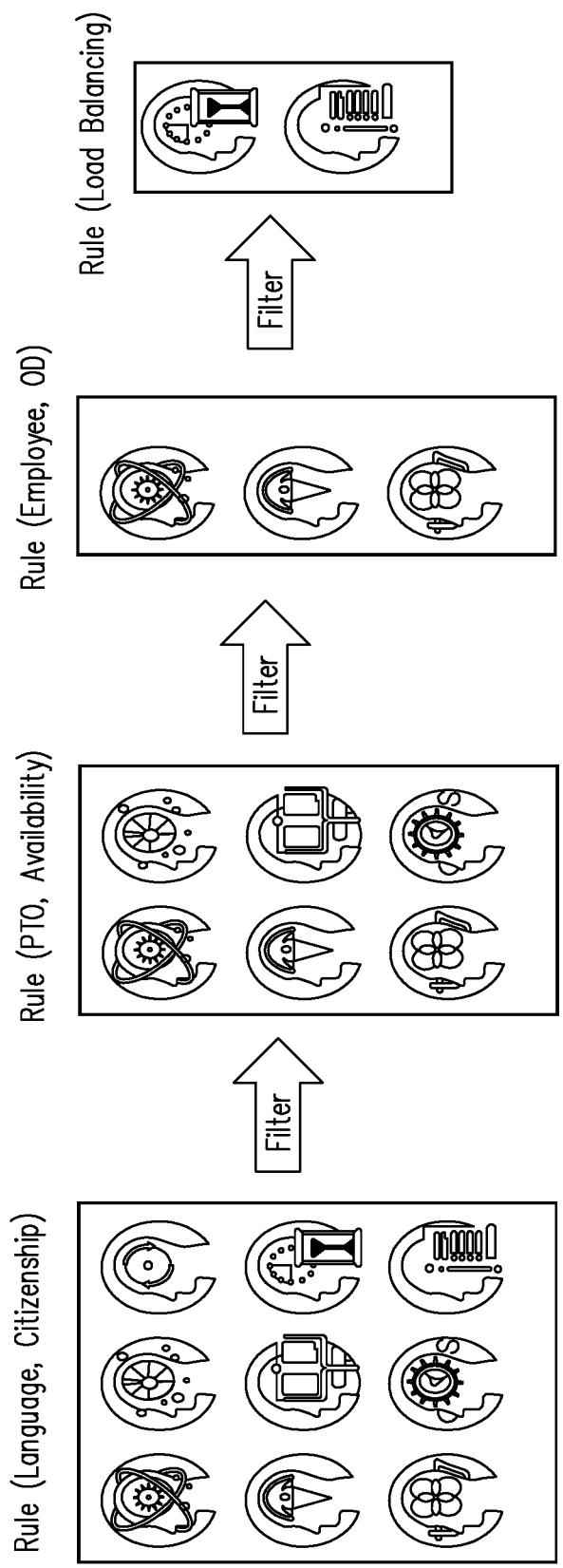
FIG. 15 is a high-level graphic illustration of the cumulative effect of the application of the filtering sub-system of FIG. 12 and the load balancing sub-system of FIG. 14 on an initial pool of employees having skill set data matching, or most closely matching, the identified required skills associated with a specific case, in accordance with one embodiment.

FIG. 15 is a high level graphic illustration of the cumulative effect of the application of a filtering sub-system at FILTER THE RAW RANKED SKILL MATCHED EMPLOYEE RECOMMENDATION DATA USING THE NEW CASE RULES AND CONSTRAINTS DATA TO GENERATE FILTERED SKILL MATCHED EMPLOYEE RECOMMENDATION DATA OPERATION 233 and a load balancing sub-system of PROCESS THE FILTERED SKILL MATCHED EMPLOYEE RECOMMENDATION DATA USING LOAD BALANCING AND OPERATIONAL CONSIDERATIONS TO GENERATE RECOMMENDED EMPLOYEE DATA FOR THE NEW CASE OPERATION 235 on an initial pool of employees having skill set data matching, or most closely matching, the identified required skills associated with a specific case, in accordance with one embodiment. FIG. 15 is discussed in more detail below.

Returning to FIGS. 2A and 2B, in one embodiment, once recommended employee data for the new case is generated at PROCESS THE FILTERED SKILL MATCHED EMPLOYEE RECOMMENDATION DATA USING LOAD BALANCING AND OPERATIONAL CONSIDERATIONS TO GENERATE RECOMMENDED EMPLOYEE DATA FOR THE NEW CASE OPERATION 235, process flow proceeds to PROVIDE THE RECOMMENDED EMPLOYEE DATA TO A DECISION MAKER FOR REVIEW AND/OR APPROVAL OPERATION 237.

In one embodiment, at PROVIDE THE RECOMMENDED EMPLOYEE DATA TO A DECISION MAKER FOR REVIEW AND/OR APPROVAL OPERATION 237 the recommended employee data for the new case of PROCESS THE FILTERED SKILL MATCHED EMPLOYEE RECOMMENDATION DATA USING LOAD BALANCING AND OPERATIONAL CONSIDERATIONS TO GENERATE RECOMMENDED EMPLOYEE DATA FOR THE NEW CASE OPERATION 235, and/or the reasons and ranking for the recommended employees, is provided to a decision maker for approval, editing, and final employee assignment/allocation.

In various embodiments, the decision maker receiving the recommended employee data for the new case can be, but is not limited to, one or more of: a human decision maker, such as a supervisor or other employee having access/decision maker permissions for approval, editing, and final employee assignment/allocation; one or more applications used for approval, editing, and final employee assignment/allocation, and/or for further processing of the recommended employee data for the new case; and/or any other entity, such as a corporation, responsible for approval, editing, and final employee assignment/allocation.

FIGS. 17A, 17B, 17C, 17D, 17E, 17F, and 17G are specific illustrative examples of user interface screens in accordance with one embodiment that are indicative of the operation and user experience associated with one illustrative embodiment of a system and method for providing a multi-dimensional human resource allocation advisor. FIGS. 17A, 17B, 17C, 17D, 17E, 17F, and 17G are discussed in more detail below.

Returning to FIGS. 2A and 2B, in one embodiment, once the recommended employee data for the new case is provided to a decision maker for approval, editing, and final employee assignment/allocation at PROVIDE THE RECOMMENDED EMPLOYEE DATA TO A DECISION MAKER FOR REVIEW AND/OR APPROVAL OPERATION 237, process flow proceeds to EXIT 240.

In one embodiment, at EXIT 240, process 200 for providing multi-dimensional human resource allocation recommendations is exited to await new data.

System Components, Interaction, and Operation

In the discussion that follows, a specific illustrative example of the component organization and operation of one embodiment of a multi-dimensional human resource allocation advisor system is provided. In the discussion that follows, a specific illustrative example of a multi-dimensional human resource allocation advisor system and sub-systems of FIGS. 3, 5, 7, 12, 14, and 16, are but one example of the organization and operation of one embodiment of a multi-dimensional human resource allocation advisor system. Those of ordinary skill in the art will recognize that numerous other examples of organization and operation of the multi-dimensional human resource allocation advisor system disclosed herein are possible. Therefore, the following discussion, and FIGS. 3, 5, 7, 12, 14, and 16, should not be construed as imposing any limitations on the invention, as set forth in the claims below.

In addition, the associated supporting FIGS. 4A through 4F, 6A through 6C, 8, 9A through 9D, 10, 11, 13, 15, and 17A through 17G, are also associated with a specific illustrative example of one embodiment of the organization and operation of one embodiment of a multi-dimensional human resource allocation advisor system that, in the specific illustrative example of FIGS. 4A through 4F, 6A through 6C, 8, 9A through 9D, 10, 11, 13, 15, and 17A through 17G, is implemented for use with an employer business that provides software engineers to support Enterprise Resource Planning (ERP) systems for the clients of the business. Those of ordinary skill in the art will recognize that numerous other implementations, for numerous other types of employer businesses and clients, are possible and contemplated by the inventors. Therefore, the following discussion, and the FIGS., should not be construed as imposing any limitations on the invention, as set forth in the claims below.

FIG. 3 is a component diagram showing the overall organization, interaction, and operation of various components of a multi-dimensional human resource allocation advisor system 300, in accordance with one embodiment.

As seen in FIG. 3, multi-dimensional human resource allocation advisor system 300 includes autonomous machine learning platform 106, case intake and management system 301, and user layer 107, including various user applications.

As seen in FIG. 3, and as discussed above with respect to FIG. 1, user layer 107 can include various user applications for use by users via case intake and management system 301, such as, but not limited to: Application 108 which, in the present disclosed embodiment, is Multi-dimensional Human Resources Allocation Advisor (MHRAA) application; Application 110 which, in one embodiment, can be a predictive escalation application used to estimate the odds of a given case being escalated in priority; Application 112 which, in one embodiment, can be a predictive planning application; and any number of other types of applications "N;" as discussed herein, and/or as known in the art at the time of filing, and/or as developed after the time of filing.

In various embodiments, any or all of applications 108, 110, 112, and "N," use all, or part, of the components and functions of Autonomous Machine Learning Platform (AMLP) 106, with various modifications, to perform their assigned tasks and provide their respective functions to users, via case intake and management system 301. One focus of the current disclosure is on the interaction of Autonomous Machine Learning Platform 106 with Multi-dimensional Human Resources Advisor (MHRAA) application for the purpose of providing a multi-dimensional human resources advisor, and recommended employee data 363, to users via case intake and management system 301.

To this end, as seen in FIG. 3, in one embodiment, autonomous machine learning platform 106 includes enterprise Machine Learning (ML) database 320, employer business database 331, rules and constraints database 345, and Machine Learning (ML) engine 350.

As discussed in more detail below, in the operation of one embodiment, enterprise ML database 320 is the main repository for data obtained from, and/or provided/generated by, the other components of multi-dimensional human resource allocation advisor system 300. As such, in one embodiment, enterprise ML database 320 receives data from the other components, and provides data to the other components, of multi-dimensional human resource allocation advisor system 300 and is therefore, in one embodiment, the central hub of multi-dimensional human resource allocation advisor system 300.

In one embodiment, case intake and management system 301 represents one or more computing systems and databases through which sales personal for an employer business take in and record sales, track contracts and performance for both historic and current tasks, projects, or cases, coordinate new incoming tasks, projects, or cases, track on-going performance and milestones, record client feedback and satisfaction, and perform any other client intake and customer relations management functions as discussed or illustrated herein, and/or as known in the art at the time of filing, and/or as made known/available after the time of filing.

As seen in FIG. 3, in one embodiment, case intake and management system 301 includes case intake and management data 303. In one embodiment, case intake and management data 303 includes historic case data 305. In one embodiment, historic case data 305 includes case history data such as, but not limited to, client history data, client contacts data, historical customer satisfaction review data, customer relations management data, data representing specific employees of the employer business assigned to work on both current and historical cases, the modules, skills and experience associated with both current and historical cases, and/or any other historic case data as discussed or illustrated herein, and/or as known in the art at the time of filing, and/or as made known/available after the time of filing.

In one embodiment, case intake and management system 301 further includes new case data 307. In one embodiment, new case data 307 includes, but is not limited to, data representing: the name of the task, project, or case; the name of the client for which the task, project, or case is to be performed; the priority of the task, project, or case; the priority of the client associated with the task, project, or case; the job equipment type or product line associated with the task, project, or case; any subcomponents included with the job equipment type or product line associated with the task, project, or case; the type of task, project, or case; the complexity of the task, project, or case; whether the client associated with the task, project, or case is an escalated or strategic client; the average of any survey or review data associated with the client and/or task, project, or case; the geographic location of the client and/or where the task, project, or case is to be performed; the time zone associated with the location of the client and/or where the task, project, or case is to be performed; and/or any other new case data as discussed or illustrated herein, and/or as known in the art at the time of filing, and/or as made available after the time of filing.

In one embodiment, case intake and management system 301 further includes client data 308. In one embodiment, client data 308 is aggregated client data and can include, but is not limited to, data representing: the priority of the client; the type of equipment or product lines associated with the client; any contractual obligations and/or requirements associated with the client and/or task, project, or case performed on behalf of the client; whether the client is an escalated or strategic client; the average of any survey or review data associated with the client; the geographic location of the client; the time zone associated with the location of the client; and/or any other client data as discussed or illustrated herein, and/or as known in the art at the time of filing, and/or as made available or known after the time of filing.

In one embodiment, all, or part of, case intake and management data 303, including but not limited to, all, or part of, historic case data 305, new case data 307, and client data 308 is provided to enterprise ML database 320 and stored in enterprise ML database 320 for access and use by the other components of multi-dimensional human resource allocation advisor system 300.

As seen in FIG. 3, in one embodiment, autonomous machine learning platform 106 includes employer business database 331. In one embodiment, employer business database 331 includes data associated with the employer business and the employees of the employer business.

In one embodiment, employer business database 331 includes employee Human Resources (HR) data 333. In one embodiment, employee HR data 333 can include, but is not limited to: the geographic location of the employees of the employer business; the time zone associated with the employees of the employer business; the working time zone associated with the employees of the employer business; human languages the employees of the employer business understand, speak or write; machine and programming languages the employees of the employer business have proficiency with; certifications and/or education data associated with the employees of the employer business; employee type, such as full-time, part time, contractor, etc. associated with the employees of the employer business; review and client customer satisfaction data associated with the employees of the employer business; planned Paid Time Off (PTO) associated with the employees of the employer business; and/or any other HR data, as discussed or illustrated herein, and/or as known in the art at the time of filing, and/or as becomes known/available after the time of filing.

In one embodiment, employer business database 331 includes initial employee skill set data 335. In one embodiment, initial employee skill set data 335 can include, but is not limited to: employee skill set/experience data obtained from the employees themselves; employee skill set/experience data obtained from the employees' employment records; employee skill set/experience data obtained from the employees' HR records; employee skill set/experience data obtained from public records of certifications and schooling; employee accounts with professional social media sites; employee skill set/experience data obtained from general social media sites; employee skill set/experience data obtained from previous employers of the employee; and/or any other source of initial, self-reported/declared, and/or relatively static initial employee skill set data, as discussed or illustrated herein, and/or as known in the art at the time of filing, and/or as developed after the time of filing.

FIG. 4A is a specific illustrative example of initial employee skill set data where the employees are engineers and the initial employee skill set data is presented in an initial employee/engineer skill profile 400.

As seen in FIG. 4A, in the specific illustrative example of FIG. 4A, initial employee/engineer skill profile 400 includes: employee identification data 401, in this specific example, employee e-mail data; product line data 403 indicating the product line in question; product module data 405 indicating the product skill, or module, under consideration; release or version data 407, indicating the release or version of the product module under consideration; years of experience data 409 indicating the employee's experience with the product and module under consideration, i.e., the skill; last use data 411 indicating the most recent experience the employee has with the product line and module under consideration; and ratings data 413 indicating the employee's customer service rating with respect to the product and module under consideration.

Those of ordinary skill in the art will readily recognize that 4A is but one specific illustrative example of the type and arrangement of initial employee skill set data and that numerous other types and arrangement of initial employee skill set data are possible and contemplated by the inventors. Consequently, the specific illustrative example of the type and arrangement of initial employee skill set data of FIG. 4A should not be read to limit the invention as set forth in the claims.

As discussed in more detail below, the initial employee skill set data included in the illustrative initial employee/engineer skill profile of FIG. 4A is used to generate part of normalized employee skill set vector data discussed below, in accordance with one embodiment.

Returning to FIG. 3, in one embodiment, employer business database 331 includes dynamic employee skill set data 337. In one embodiment, dynamic employee skill set data 337 is derived from historic case data 305 and the skills and experience obtained/acquired by each employee "on the job."

In one embodiment, dynamic employee skill set data 337 is obtained at the product line, product, and release or version level, based on one or more of: dynamically updated task, project, or case closure data associated with the employees, including total number of closed tasks, projects, or cases; dynamically updated average time to close for tasks, projects, or cases; dynamically updated average client survey or ranking data per customer/product/employee; dynamically updated experience and team participation data; dynamically updated team leadership experience data; dynamically updated case priority experience; dynamically updated milestones per time period for determining the current loading of the employee; and/or any other source of dynamic employee skill set data as discussed or illustrated herein, as known in the art at the time of filing, and/or as developed after the time of filing.

FIGS. 4B through 4F illustrate specific illustrative examples of dynamic employee skill data for the specific illustrative example where the employees are software engineers.

FIG. 4B is a specific illustrative example of employee/engineer profile data 420 included in dynamic employee/engineer skill set data of the aggregated employee skill set data and used to generate part of the normalized employee skill set vector data, in accordance with one embodiment.

As seen in FIG. 4B, employee/engineer profile data 420 includes: department/product data 421A, indicating the department and/or the product line under consideration; employee/engineer contact data 421B, in this example, e-mail addresses; employee/engineer identification data 421C, in this case employee first and last name data; employee/engineer status data 421D; employee/engineer assign case work data 421E; employee/engineer hours data 421F; employee/engineer type data 421G, e.g., part-time, full-time, or contractor; employee/engineer time zone data 421H indicating the time zone in which the employee works; max case threshold data 421I indicating the maximum number of open cases and/or milestones per time period for the employee under consideration; employee/engineer can assign P1 data 421J indicating whether the employee in question can take on priority one cases; employee/engineer can assign P2 data 421K, indicating whether the employee in question can take on priority two cases; employee/engineer availability data 421L indicating the employee/engineer's Paid Time Off (PTO) status; and employee/engineer action icons 421M.

Those of ordinary skill in the art will readily recognize that FIG. 4B is but one specific illustrative example of the type and arrangement of employee profile data 420 and that numerous other types and arrangement of employee profile data 420 are possible and contemplated by the inventors. Consequently, the specific illustrative example of the type and arrangement of employee profile data 420 of FIG. 4B should not be read to limit the invention as set forth in the claims.

FIG. 4C is a specific illustrative example of employee/engineer product-module skills data 430 included in dynamic employee/engineer skill set data of the aggregated employee skill set data and used to generate normalized employee skill set vector data, in accordance with one embodiment.

As seen in FIG. 4C, employee/engineer product-module skills data 430 includes product line data 431 indicating the product line under consideration and employee/engineer entries 432, 433, 435, 437, and 439. As seen in FIG. 4C, under each identified employee of the employee/engineer entries 432, 433, 435, 437, and 439, a list of module skills that employee has attained/acquired is listed, along with data representing: the number of cases including the product module the employee has worked on and closed 434 for the product and release; and the average time to close for the product and release 436; for the product and release.

Those of ordinary skill in the art will readily recognize that FIG. 4C is but one specific illustrative example of the type and arrangement of employee/engineer product-module skills data 430 and that numerous other types and arrangement of employee/engineer product-module skills data 430 are possible and contemplated by the inventors. Consequently, the specific illustrative example of the type and arrangement of employee/engineer product-module skills data 430 of 4C should not be read to limit the invention as set forth in the claims.

FIG. 4D is a specific illustrative example of employee/engineer case type skills data 440 included in dynamic employee/engineer skill set data of the aggregated employee skill set data and used to generate part of the normalized employee skill set vector data, in accordance with one embodiment.

As seen in FIG. 4D, employee/engineer case type skills data 440 includes product line data 441 and 443, indicating the product line under consideration and employee/engineer entries, such as 442, under each product line data entry such as 441 and 443. As seen in FIG. 4D, for each product line and employee entry, the number of cases associated with the product line closed by the employee is listed in case closed data 445 and the average days to close the cases is indicated by average days to close data 447.

Those of ordinary skill in the art will readily recognize that FIG. 4D is but one specific illustrative example of the type and arrangement of employee/engineer case type skills data 440 and that numerous other types and arrangement of employee/engineer case type skills data 440 are possible and contemplated by the inventors. Consequently, the specific illustrative example of the type and arrangement of employee/engineer case type skills data 440 of FIG. 4D should not be read to limit the invention as set forth in the claims.

FIG. 4E is a specific illustrative example of employee/engineer complexity attained skills data 450 included in dynamic employee/engineer skill set data of the aggregated employee skill set data and used to generate part of the normalized employee skill set vector data, in accordance with one embodiment.

As seen in FIG. 4E, employee/engineer complexity attained skills data 450 includes product line data 451, indicating the product line under consideration and employee/engineer entries such as 452 under the product line data entry. As seen in FIG. 4E, for each product line and employee entry, modules and/or skills associated with the product line acquired by the employee are listed under the employee entry.

Those of ordinary skill in the art will readily recognize that FIG. 4E is but one specific illustrative example of the type and arrangement of employee/engineer complexity attained skills data 450 and that numerous other types and arrangement of employee/engineer complexity attained skills data 450 are possible and contemplated by the inventors. Consequently, the specific illustrative example of the type and arrangement of employee/engineer complexity attained skills data 450 of FIG. 4E should not be read to limit the invention as set forth in the claims.

FIG. 4F is a specific illustrative example of employee/engineer survey averages data 460 included in dynamic employee/engineer skill set data of the aggregated employee skill set data and used to generate part of the normalized employee skill set vector data, in accordance with one embodiment.

As seen in FIG. 4F, employee/engineer survey averages data 460 includes: product line data 463, indicating the product line under consideration; employee identification data 461, in this case employee name data; survey average data 465, in this case indicating the average customer review data ratings with respect to the product line under consideration for the employee over the last 3 months; and survey average data 467, in this case indicating the average customer review data ratings with respect to the product line under consideration for the employee over the last 6 months.

Those of ordinary skill in the art will readily recognize that FIG. 4F is but one specific illustrative example of the type and arrangement of employee/engineer survey averages data 460 and that numerous other types and arrangement of employee/engineer survey averages data 460 are possible and contemplated by the inventors. Consequently, the specific illustrative example of the type and arrangement of employee/engineer survey averages data 460 should not be read to limit the invention as set forth in the claims.

As discussed in more detail below, in one embodiment, the specific illustrative examples of dynamic employee skill data for the specific illustrative example where the employees are software engineers of FIGS. 4B through 4F are used to generate part of the normalized employee skill set vector data, in accordance with one embodiment.

Returning to FIG. 3, as discussed in more detail below, in one embodiment, employee skill set consolidation/aggregation is performed at pre-processing module 351 of ML engine 350 to generate aggregated employee skill set data 323 for each employee of the employer business using the employee initial employee skill set data 335, the employee dynamic skill set data 337, and the employee HR data 333. In one embodiment, all, or part of, aggregated employee skill set data 323 is then provided to enterprise ML database 320 and stored in enterprise ML database 320 for access and use by the other components of multi-dimensional human resource allocation advisor system 300.

In one embodiment, employer business database 331 includes employee case loading data 339. In one embodiment, employee case loading data 339 can include, but is not limited to, data representing: the number of open tasks, projects, or cases assigned to an employee; the priority of the open tasks, projects, or cases assigned to an employee; the number and frequency of milestones and deadlines assigned to an employee; and/or any other workload related data for employees, as discussed or illustrated herein, and/or as known in the art at the time of filing, and/or as becomes available/known in the art after the time of filing.

In one embodiment, all, or part of, employee case loading data 339 is provided to enterprise ML database 320 and stored in enterprise ML database 320 for access and use by the other components of multi-dimensional human resource allocation advisor system 300.

As seen in FIG. 3, in one embodiment, autonomous machine learning platform 106 includes Machine Learning (ML) engine 350. In one embodiment, ML engine 350 performs the pre-processing, skill matching, normalization, ranking, filtering, and load balancing processing function for autonomous machine learning platform 106.

To this end, in one embodiment, ML engine 350 includes pre-processing module 351, skill matching, normalization, and ranking module 353, filtering module 355; and load balancing module 357.

In one embodiment, pre-processing module 351 performs the functions of obtaining, transferring, processing, aggregating, rectifying, storing, and updating various data from multiple data sources for, and into, enterprise ML database 320 and obtaining, transferring, processing, aggregating, rectifying, storing, and updating various data from multiple data sources for, and into, rules and constraints database 345.

Figure 5:
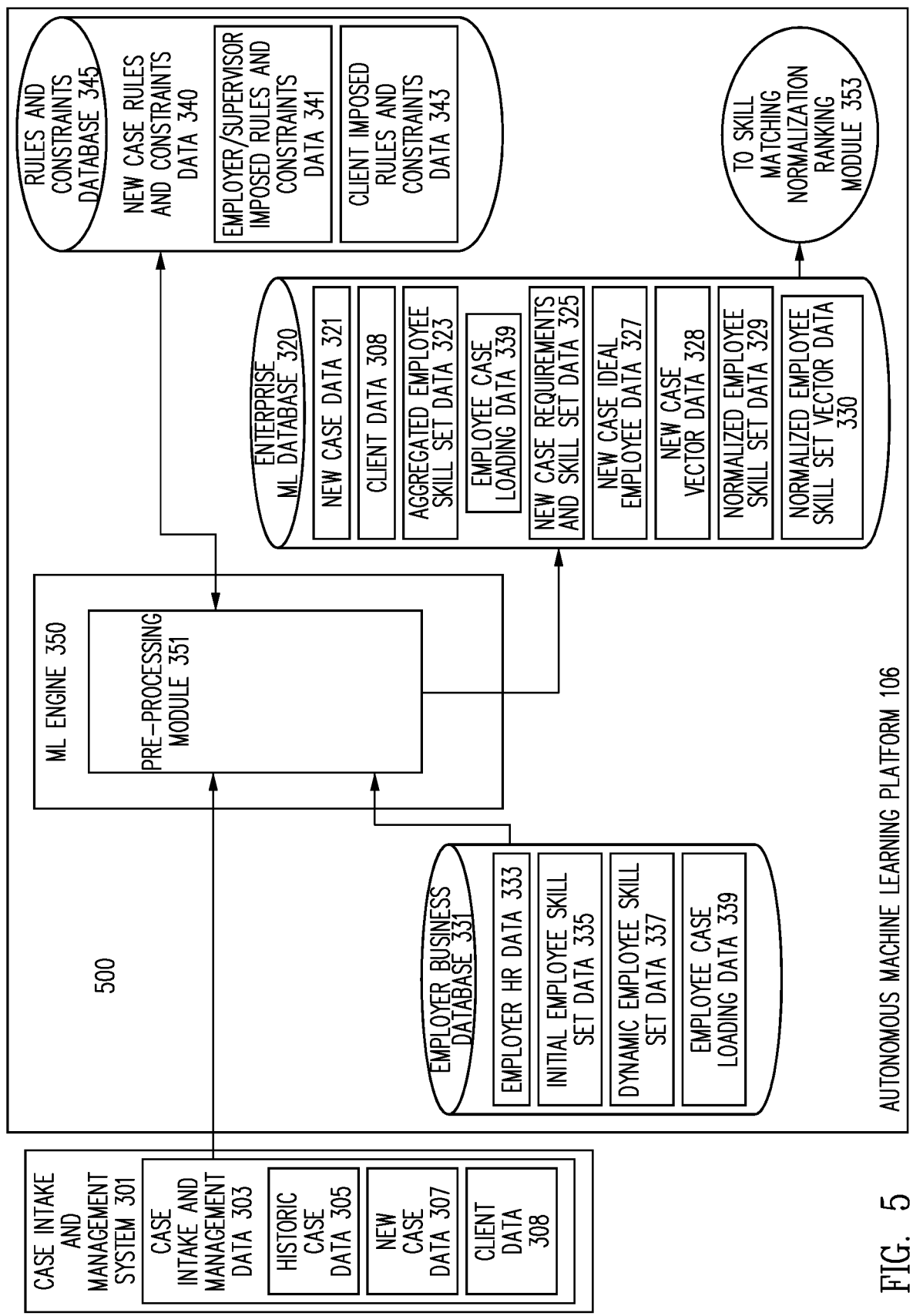
FIG. 5 is a component diagram showing the interaction of various components of a pre-processing sub-system of a system for providing a multi-dimensional human resource allocation advisor, in accordance with one embodiment.

FIG. 5 is a component diagram showing the interaction of various components of a pre-processing sub-system 500 of the system for providing a multi-dimensional human resource allocation advisor 300 of FIG. 3, in accordance with one embodiment.

Referring to FIGS. 3 and 5, in one embodiment, pre-processing module 351 utilizes one or more employer/supervisor-imposed rules and constraints set forth in employer/supervisor-imposed rules and constraints data 341 for the pre-processing of various data. In one embodiment, employer/supervisor-imposed rules and constraints are first defined and then employer/supervisor-imposed rules and constraints data 341 is generated.

In various embodiments, specific examples of employer/supervisor-imposed rules and constraints defined and generated as part of employer/supervisor-imposed rules and constraints data 341 can include, but are not limited to: rules and constraints limiting the number of active tasks, projects, or cases that can be assigned to any, or particular, employees; rules and constraints limiting the number of active deadlines or benchmarks per defined time frame that can be assigned to any, or particular, employees; rules and constraints limiting the maximum number of active tasks, projects, or cases of a particular priority or urgency that can be assigned to any, or particular, employees; rules and constraints regarding the use of particular types of employees, such as full-time employees, before assigning other types of employees, such as contract employees and/or part-time employees; rules and constraints regarding employee experience required for various roles with different priority tasks, projects, or cases and clients, and/or any other employer/supervisor-imposed rules and constraints as discussed or illustrated herein, and/or as known in the art at the time of filing, and/or as developed or made available after the time of filing.

In one embodiment, specific examples of employer/supervisor-imposed rules and constraints include also, but are not limited to: rules and constraints pertaining to the region an employee works in, and the teams, supervisors, and organization for that region, to allow for the selection of employees that can service a product line and/or support a team for clients and cases throughout the globe in a "follow the sun" model where cases can be passed between teams, regions, and offices globally to reduce delays and increase responsiveness to clients.

In one embodiment, the employer/supervisor-imposed rules and constraints of employer/supervisor-imposed rules and constraints data 341 can be activated and/or modified and adjusted at any time by any employer or supervisor with access rights and for any supported product or module. Consequently, the disclosed embodiments are extremely flexible in that thresholds and rule sets can be defined for each of the employee skills with respect to any product line, product team, service, client, or task/project/case, at any time, and by anyone having access/allocation rights.

As seen in FIG. 5, and as discussed above, in one embodiment, pre-processing module 351 obtains and processes all, or part of, the initial employee skill set data 335, the employee dynamic skill set data 337, and the employee HR data 333 from employer database 331, to generate aggregated employee skill set data 323 for each employee of the employer business.

In one embodiment, pre-processing module 351 obtains and processes all, or part of, the initial employee skill set data 335, the employee dynamic skill set data 337, and the employee HR data 333 employee skill set based on a multi-dimensional analysis of the aggregated initial employee skill set data 335, the employee dynamic skill set data 337, and the employee HR data 333 to generate aggregated employee skill set data 323 for each employee of the employer business and dynamically update the aggregated employee skill set data 323 on a periodic basis, and/or as new data becomes available.

In one embodiment, all, or part of, aggregated employee skill set data 323 is then provided to enterprise ML database 320 by pre-processing module 351 and stored in enterprise ML database 320 for access and use by the other components of multi-dimensional human resource allocation advisor system 300, and the aggregated employee skill set data 323 in enterprise ML database 320 is dynamically updated by pre-processing module 351 on a periodic basis, and/or as new data becomes available.

The aggregated employee skill set data 323 provides employee skill set dimensions that bring unique and different perspectives of employee skills that are important for a unified view of the employee skills, and, as discussed in more detail below, allow for the generation and normalization of employee skill set data which, in turn, is used in one embodiment, to generate the disclosed normalized employee skill set vector data used for making conclusions and decisions for case assignments in accordance with one embodiment.

As seen in FIG. 5, pre-processing module 351 further obtains all, or part of, historic case data 305, new case data 307, and client data 308 including, but not limited to: new case requirements and restrictions, such as client imposed rules and constraints data, derived from new case data 307 and client data 308; client contact customer review data for defined periods of time; and employee customer review data for defined periods of time to identify new case requirements and/or contractual obligations associated with the new case and the skill set that will be required of the employees assigned to the new case in order to meet the needs of the task, project, or case and/or client.

In one embodiment, pre-processing module 351 then processes this data to generate new case requirements and skill set data 325 representing the identified new case requirements and/or contractual obligations associated with the new case and new case skill set.

In one embodiment, new case requirements and skill set data 325 is generated by pre-processing module 351 in view of one or more employer/supervisor-imposed rules and constraints set forth in employer/supervisor-imposed rules and constraints data 341.

As a specific illustrative example, new case requirements and skill set data 325 is generated by pre-processing module 351 under the employer/supervisor-imposed rule and constraint that if the customer review data for the client contact associated with a task, project, or case averages less than a threshold score, such as 3 out of 5, the client contact data must be labeled as an escalated, or higher priority, client contact requiring special attention.

In one embodiment, new case requirements and skill set data 325 is then provided to enterprise ML database 320 by pre-processing module 351 and stored in enterprise ML database 320 for access and use by the other components of multi-dimensional human resource allocation advisor system 300.

In one embodiment, pre-processing module 351 further accesses new case data 307 and client data 308 to identify and generate client-imposed rules and constraints data 343. In various embodiments, the client-imposed rules and constraints data 343 includes, but is not limited to: rules and constraints indicating required citizenship for employees working for the client and/or assigned to the new case; rules and constraints indicating required languages spoken by employees working for the client and/or assigned to the new case; rules and constraints regarding availability of employees working for the client and/or assigned to the new case; and/or any other client-imposed rules and constraints, as discussed or illustrated herein, and/or as known in the art at the time of filing, and/or as developed or made available after the time of filing.

In one embodiment pre-processing module 351 then aggregates and rectifies the employer/supervisor-imposed rules and constraints data 341 and the client-imposed rules and constraints data 343 to generate new case rules and constraints data 340 which is then transferred and stored in rules and constraints database 345 for access and use by the other components of multi-dimensional human resource allocation advisor system 300.

FIGS. 6A, 6B, and 6C, show specific illustrative examples of rules and constraints data representing selectable and editable rules and constraints and user interface screens for the setting, adjusting, and editing of rules and constraints, in accordance with one embodiment.

FIG. 6A shows a specific illustrative example of rules and constraints data 610 included in a case assignment model showing selectable and editable rules and constraints in accordance with one embodiment.

As seen in FIG. 6A, rules and constraints data 610 includes: rule category data 611 indicating the category for the rule under consideration; rule name data 612 indicating the name of the rule under consideration; rule condition data 613 indicating the conditions necessary to apply the rule under consideration; rule action data 614 indicating the action taken using the rule under consideration; rule activated data 615 indicating whether the rule has been activated or not; default value data 616 indicating the default value setting for the rule if the supervisor does not enter any data, if the rule has associated selectable values; rule product line value update links 617 through which a supervisor can set values for the rule for designated product lines; and rule action icons 618 which activate various related interface screens allowing a supervisor to view, edit, or delete rules.

As mentioned above, in one embodiment, the rules and constraints of FIG. 6A can be activated and/or modified and adjusted at any time by any employer or supervisor with access rights and for any supported product or module. Consequently, the disclosed embodiments are extremely flexible in that thresholds and rule and constraint sets can be defined for each of the employee skills with respect to any product line, product team, service, client, or task/project/case, at any time, and by anyone having access/allocation rights.

As a specific illustrative example, FIG. 6B shows a specific illustrative example of a rules and constraints product line modification interface 630 for setting and editing rule and constraint values for a product line in accordance with one embodiment. In the illustrative example of FIG. 6B, user interface screen 630 is generated and displayed in response to a user activating the product line value update link 617 of FIG. 6A.

As seen in FIG. 6B, rules and constraints product line adjustment interface 630 includes a listing of product lines in column 631 and values fields 632 through which a supervisor can set a specific value for a specific product line for a specific rule.

FIG. 6C shows a specific illustrative example of a rules and constraints modification interface 650 for activating rules and constraints and editing the rule and constraint values for a case assignment model.

Referring to FIGS. 6A and 6C, in FIG. 6C, rules and constraints modification interface 650 includes: ML module name field 651 for entering/selecting the machine learning model to be modified; rule category field 652 for entering/selecting or modifying rule category data 611 of FIG. 6A; rule name field 653 for entering/selecting or modifying rule name data 612 of FIG. 6A; rule condition field 654 for entering/selecting or modifying rule condition data 613 of FIG. 6A; rule action field 655 for entering/selecting or modifying rule action data 614 of FIG. 6A; default value field 656 for entering/selecting or modifying default value data 616 of FIG. 6A; rule activated field 657 for entering/selecting or modifying rule activated data 615 of FIG. 6A; rule attach to field 658 for entering/selecting or modifying the module or filter to which the rule is attached; solution for 661 for linking to notes/comments regarding what problem or issue the rule addresses; implementation note 663 linking to notes/comments regarding the implementation of the rule; and change history link 665.

Those of ordinary skill in the art will readily recognize that FIGS. 6A, 6B, and 6C represent but one illustrative example of rules and constraints and the modification of rules and constraints and that numerous other examples of rules and constraints and the modification of rules and constraints are possible and are contemplated by the inventors. Consequently, the specific illustrative examples of FIGS. 6A, 6B, and 6C should not be interpreted as limiting the invention set forth in the claims below.

Returning to FIG. 5. as seen in FIG. 5, once enterprise ML database 320 has been provided various pre-processed data, including, but not limited to, aggregated employee skill set data 323, and new case requirements and skill set data 325, and rules and constraints database 345 has been provided various pre-processed data, including, but not limited to, client-imposed rules and constraints data 343 and new case rules and constraints data 340, this data is updated periodically and made available for access and use by the other components of multi-dimensional human resource allocation advisor system 300, including skill matching, normalization, and ranking module 353.

FIG. 7 is a component diagram showing the interaction of various components of a skill matching, normalization, and ranking sub-system 700 of the system for providing a multi-dimensional human resource allocation advisor 300, in accordance with one embodiment.

As seen in FIG. 7, enterprise ML database 320 and skill matching, normalization, and ranking module 353 exchange and update data to generate raw ranked skill matched employee recommendation data 563. In one embodiment, at skill matching, normalization, and ranking module 353 machine learning algorithms are used to identify, normalize, and rank the aggregated employee skill set data 323 with respect to skill sets identified as being needed for a given task, project, or case and job specific requirements associated with the given project, task, or case of the new case requirements and skill set data 325.

To this end, in one embodiment, skill matching, normalization, and ranking module 353 processes the new case requirements and skill set data 325 and the new case rules and constraints data 340 of rules and constraints database 345 to generate new case ideal employee data 327 and, in one embodiment, new case vector data 328.

In one embodiment, the new case ideal employee data 327 includes two or more new case ideal employee elements, such as required skills, experience levels and new case employee rules and constraints. In one embodiment, this data is then used to generate the new case vector data 328.

In one embodiment, the new case vector data 328 is derived from the new case ideal employee data 327 and includes two or more new case ideal employee vector 328 elements corresponding to the new case ideal employee data 327 elements and/or the new case requirements and skill set data 325 elements.

In one embodiment, the new case vector data 328 is generated by one or more machine learning services and/or modules of skill matching, normalization, and ranking module 353 using the new case ideal employee data 327, and/or new case requirements and skill set data 325, and/or the new case rules and constraints data 340 as input data. In various embodiments, the set of one or more of the machine learning services or modules includes, but is not limited to, one or more of: a supervised machine learning service or model; an unsupervised machine learning service or model; a semi-supervised machine learning service or model; or any other machine learning service or model capable of generating new case vector data 328 based on the new case ideal employee data 327, and/or new case requirements and skill set data 325, and/or the new case rules and constraints data 340 as input data, as discussed or illustrated herein, and/or as known in the art at the time of filing, and/or as developed or made available after the time of filing.

In one embodiment, once generated by skill matching, normalization, and ranking module 353, new case ideal employee data 327, and new case requirements and skill set data 325 are provided to enterprise ML database 320 and stored in enterprise ML database 320 for access and use by the other components of multi-dimensional human resource allocation advisor system 300.

FIG. 8 is a graphic illustration of a specific illustrative example of new case vector elements 800 where the employees are software engineers used to provide input data to a skill matching, normalization, and ranking sub-system 700 of a system for providing a multi-dimensional human resource allocation advisor 300, in accordance with one embodiment.

As seen in FIG. 8, in the specific illustrative example of FIG. 8, new case vector elements 800 include: name element 801 for data representing the name of the new case and/or client; case priority element 802 for data representing the priority of the new case; customer priority element 803 for data representing the priority of the customer/client associated with the new case; product line element 804 for data representing the product line associated with the new case; product module element 805 for data representing the product module(s) associated with the new case; type element 806 for data representing the type of case; complexity element 807 for data representing the complexity of the case; client escalation element 808 for data representing the presence or absence of client escalation being required for the new case; strategic client value element 809 for data representing if a client is a strategic client requiring special handling/treatment; client average survey element 810 for data representing the average survey score from the client associated with the new case for a defined number of last surveys; client contact average survey element 811 for data representing the average survey score from the client contact associated with the new case for a defined number of last surveys; and geo-location/time zone element 813 for data representing the geolocation and/or time zone associated with the new case.

Those of ordinary skill in the art will readily recognize that FIG. 8 is but one specific illustrative example of the type and arrangement of new case vector elements 800 and that numerous other types and arrangement of new case vector elements 800 are possible and contemplated by the inventors. Consequently, the specific illustrative example of the type and arrangement of new case vector elements 800 of FIG. 8 should not be read to limit the invention as set forth in the claims.

Returning to FIG. 7, in one embodiment, skill matching, normalization, and ranking module 353 generates normalized employee skill set data 329 and normalized employee skill set vector data 330.

To this end, in one embodiment, the aggregated employee skill set data 323 for each employee and the new case requirements and skill set data 325 are skill matched, i.e., processed using skill finding routines, by skill matching, normalization, and ranking module 353 to identify initial skill set matched employee data representing employees that appear to have associated skill set data that matches, or most closely matches, the skill set indicated in the new case requirements and skill set data 325 along with their associated aggregated employee skill set data 323.

In one embodiment, the aggregated employee skill set data 323 for each employee and the new case requirements and skill set data 325 are skill matched by skill matching, normalization, and ranking module 353 using one or more machine learning algorithms such as, but not limited to, K nearest Neighbor (KNN) classification and weighted or non-weighted Euclidian Distance methods, or any other classification algorithms/methods, as discussed or illustrated herein, and/or as known in the art at the time of filing, and/or as developed after the time of filing.

In one embodiment, employees are initially determined to match, or most closely match, the skill set indicated in the new case requirements and skill set data 325 by skill matching, normalization, and ranking module 353 based on identified common skills present in both the new case requirements and skill set data 325 and the aggregated employee skill set data 323, also called matched skills or matched skill features.

In one embodiment, skill matching, normalization, and ranking module 353 then uses machine learning algorithms to identify, normalize, and rank the aggregated employee skill set data with respect to skill sets identified as being needed for a given task, project, or case and job specific requirements associated with the given project, task, or case.

As noted above, in one embodiment, the matched skills included in the skill set data for each initial skill set matched employee are normalized by skill matching, normalization, and ranking module 353 to generate normalized employee skill set data 329 for each employee. In one embodiment, the normalization process is based on the aggregated dynamic "on-the-job" acquired skill set data for the employee associated with the matched skills of dynamic employee skill set data 337.

As noted above, in various embodiments, the dynamic employee skill set data 337 of employer database 331 for the employee associated with the matched skill set features can include, but is not limited to, data representing one or more of: total cases closed by the employee related to the matched skill set feature; the average time to close for cases worked on by the employee related to the matched skill set feature; average customer satisfaction review scores for the employee matched skill set feature; total cases owned and/or closed by the employee that are related to the matched skill set feature; total cases led and closed by the employee that are related to the matched skill set feature; total cases contributed to by the employee that are related to the matched skill set feature; average resolution time associated with total cases owned, and/or closed, and/or participated in by the employee that are related to the matched skill set feature; average reviews and customer satisfaction input/ratings for the employee or team associated with the matched skill set feature; and/or any other dynamic skill set data associated with an employee and a matched skill set feature, as discussed or illustrated herein, and/or as known in the art at the time of filing, and/or as becomes available after the time of filing.

FIG. 9A is a high-level graphic illustration of a specific illustrative example of the skill finding, skill normalizing, and skill ranking performed by a skill matching, normalization, and ranking sub-system 700 in accordance with one embodiment.

As seen in FIG. 9A, skill finding is accomplished at block 901, in one embodiment, using K nearest Neighbor (KNN) classification and weighted or non-weighted Euclidian Distance methods, or any other classification algorithms/methods, as discussed or illustrated herein, and/or as known in the art at the time of filing, and/or as developed after the time of filing.

As also seen in FIG. 9A, skill normalizing is accomplished at block 903, in one embodiment using Min-Max Normalization or any other normalization algorithms/methods, as discussed or illustrated herein, and/or as known in the art at the time of filing, and/or as developed after the time of filing.

As also seen in FIG. 9A, skill ranking is accomplished at block 905, in one embodiment, using weighted or non-weighted Euclidian Distance methods, or any other ranking algorithms/methods, as discussed or illustrated herein, and/or as known in the art at the time of filing, and/or as developed after the time of filing.

FIG. 9B is a more detailed illustration of the numerical results from the specific illustrative example of the skill finding, skill normalizing, and skill ranking of FIG. 9A performed by the skill matching, normalization, and ranking sub-system 700 in accordance with one embodiment.

As seen in FIG. 9B, the skill finding accomplished at block 901, in one embodiment, using K nearest Neighbor (KNN) classification and weighted or non-weighted Euclidian Distance methods, or any other classification algorithms/methods, as discussed or illustrated herein, and/or as known in the art at the time of filing, and/or as developed after the time of filing, results in skill finding data including: feature name data 921 indicating the name of the feature under consideration; number of cases owned and closed data 923, indicating the total number of cases owned and closed by the employee for the feature under consideration; cases lead and closed data 925 indicating the total number of cases lead and closed by the employee for the feature under consideration; cases as a team member data 927 indicating the total number of cases in which the employee was a team member for the feature under consideration; and average resolution time data 929 indicating the average resolution time for all cases on which the employee worked for the feature under consideration.

As also seen in FIG. 9B, the skill normalizing accomplished at block 903, in one embodiment using Min-Max Normalization or any other normalization algorithms/methods, as discussed or illustrated herein, and/or as known in the art at the time of filing, and/or as developed after the time of filing, results in normalized skill data including: employee name data 931 indicating the name of the employee under consideration; normalized cases owned and closed data 933 indicating the normalization factor/score for the total number of cases owned and closed by the employee for the feature under consideration; normalized cases lead and closed data 935 indicating the normalization factor/score for the total number of cases lead and closed by the employee for the feature under consideration; normalized cases as a team member data 937 indicating the normalization factor/score for the total number of cases in which the employee was a team member for the feature under consideration; and normalized average resolution time data 939 indicating the normalization factor/score for the average resolution time for all cases on which the employee worked for the feature under consideration.

As also seen in FIG. 9B, the skill ranking accomplished at block 905, in one embodiment, using weighted or non-weighted Euclidian Distance methods, or any other ranking algorithms/methods, as discussed or illustrated herein, and/or as known in the art at the time of filing, and/or as developed after the time of filing, results in skill ranking data including: employee name data 941 indicating the name of the employee under consideration; cases owned and closed ranking data 943 indicating the ranking for the employee under consideration for the total number of cases owned and closed by the employee for the feature under consideration; cases lead and closed ranking data 945 indicating the ranking for the employee under consideration for the total number of cases lead and closed by the employee for the feature under consideration; cases as a team member ranking data 947 indicating the ranking for the employee under consideration for the total number of cases in which the employee was a team member for the feature under consideration; and average resolution time ranking data 949 indicating the ranking for the employee under consideration for the average resolution time for all cases on which the employee worked for the feature under consideration.

Those of ordinary skill in the art will readily recognize that FIG. 9B is but one specific illustrative example of the type and arrangement of the skill finding, skill normalizing, and skill ranking data and that numerous other types and arrangement of skill finding, skill normalizing, and skill ranking data are possible and contemplated by the inventors. Consequently, the specific illustrative example of the type and arrangement of skill finding, skill normalizing, and skill ranking data of FIG. 9B should not be read to limit the invention as set forth in the claims.

In one embodiment, the normalized employee skill set data 329 data for each employee is generated by skill matching, normalization, and ranking module 353 using the dynamic employee skill set data 337 for the employee associated with the matched skills and one or more machine learning algorithms such as, but not limited to, Min-Max Normalization or any other normalization algorithms/methods, as discussed or illustrated herein, and/or as known in the art at the time of filing, and/or as developed after the time of filing.

FIG. 9C is a specific illustrative example of normalization data and processing attributes associated with one illustrative example of a normalization process performed by the skill matching, normalization, and ranking sub-system 700 of FIG. 7, in accordance with one embodiment.

FIG. 9C includes normalization data table 960. Shown in the specific illustrative example of FIG. 9C is the normalization data for a specific skill set matched employee 961, Employee 1, and for case 153665, involving a software product line, i.e., Product Line 1, and the product "Financials—Accounts Receivable (AR)," having 12 major releases/versions.

In accordance with the one illustrative example of one embodiment of FIG. 9C, normalization data table 960 shows the normalization calculation of matched skill vector elements/vectors: Total Case Closure Count—Product 963; Total Case Closure Count—Release 965; Customer Satisfaction Review (CSR) Average Score—Product 967; and CSR Average Score—Release 969 associated with Employee 1 (961) for evaluation in new case 153665.

FIG. 9D illustrates some of the steps of a specific illustrative example of the skill matching process performed by the skill matching, normalization, and ranking sub-system 700 of FIG. 7, in accordance with one embodiment.

Referring to FIGS. 9C and 9D, the general approach to normalization in this specific illustrative example of one embodiment, is to acquire the aggregated, summarized, analyzed values for each skill matched vector element for each employee, e.g., Employee 1; step 1 in FIG. 9D and values 963A, 965A, 967A, and 969A, in FIG. 9C. As also seen in FIG. 9C, for each skill matched vector element, i.e., Total Case Closure Count—Product 963, Total Case Closure Count—Release 965, CSR Average Score—Product 967, and CSR Average Score—Release 969, the aggregated, summarized, analyzed values for each skill matched vector element for Employee 1, 963A, 965A, 967A, and 969A, respectively, are labeled "v" for that skill matched vector element.

In this specific illustrative example, the minimum value for each skill matched vector element is determined; step 2 in FIG. 9D and values 963B, 965B, 967B, and 969B, in FIG. 9C. As also seen in FIG. 9C, for each skill matched vector element, i.e., Total Case Closure Count—Product 963, Total Case Closure Count—Release 965, CSR Average Score—Product 967, and CSR Average Score—Release 969, the corresponding minimum value 963B, 965B, 967B, and 969B, respectively, is labeled "Min" for that skill matched vector element.

In this specific illustrative example, the maximum value for each skill matched vector element is determined; step 2 in FIG. 9D and values 963C, 965C, 967C, and 969C, in FIG. 9C. As also seen in FIG. 9C, for each skill matched vector element, i.e., Total Case Closure Count—Product 963, Total Case Closure Count—Release 965, CSR Average Score—Product 967, and CSR Average Score—Release 969, the corresponding maximum value 963C, 965C, 967C, and 969C, respectively, is labeled "Max" for that skill matched vector element.

In this specific illustrative example, the maximum normalized value for each skill matched vector element is 1 as seen in FIG. 9C as 963E, 965E, 967E, and 969E. As also seen in FIG. 9C, for each skill matched vector element, i.e., Total Case Closure Count—Product 963, Total Case Closure Count—Release 965, CSR Average Score—Product 967, and CSR Average Score—Release 969, the maximum normalized values 963E, 965E, 967E, and 969E, are labeled x1, x2, x3, and x4, respectively.

In this specific illustrative example, each skill matched vector element for each employee is normalized; step 3 in FIG. 9D and normalized values 963D, 965D, 967D, and 969D, in FIG. 9C.

In accordance with the specific illustrative example of FIG. 9C, each of matched skill vector elements 963, 965, 967, and 969 is normalized using Min-Max normalization as discussed directly below.

Referring to FIG. 9C, for this specific illustrative example, the normalized value of 963D for Total Case Closure Count—Product 963 is calculated using the specific illustrative example of a Min-Max Normalization algorithm 971, i.e., (v−Min)/Max−Min) to yield normalized value 963D.

Referring to FIG. 9C, for this specific illustrative example, the normalized value of 965D of Total Case Closure Count—Release 965 is calculated using the specific illustrative example of a Min-Max Normalization algorithm 971, i.e., (v−Min)/Max−Min) to yield normalized value 965D.

Referring to FIG. 9C, for this specific illustrative example, the normalized value of 967D of CSR Average Score—Product 967 is calculated using the specific illustrative example of a Min-Max Normalization algorithm 971, i.e., (v−Min)/Max−Min) to yield normalized value 967D.

Referring to FIG. 9C, for this specific illustrative example, the normalized value of 969D of CSR Average Score—Release 969 is calculated using the specific illustrative example of a Min-Max Normalization algorithm 971, i.e., (v−Min)/Max−Min) to yield normalized value 969D.

As seen in FIG. 9C, in this specific illustrative example, for each skill matched vector element, i.e., Total Case Closure Count—Product 963, Total Case Closure Count—Release 965, CSR Average Score—Product 967, and CSR Average Score—Release 969, the normalized values 963D, 965D, 967D, and 969D, are labeled y1, y2, y3, and y4, respectively.

Euclidian parameters y1, x1, y2, x2, y3, x3, y4, and x4 are assigned, in this specific example as discussed above. In addition, Min, Max, and v are also defined as discussed above, for each of Total Case Closure Count—Product 963, Total Case Closure Count—Release 965, CSR Average Score—Product 967, and CSR Average Score—Release 969.

In this specific illustrative example, the Euclidian parameters, or other designated parameters, are provided to a matching algorithm, in this specific illustrative example, a Euclidian Distance Algorithm; step 5 in FIG. 9D and algorithm 980 in FIG. 9C.

As seen in FIG. 9C, the output of algorithm 980 is the Euclidian distance value 981. Then, if each of Total Case Closure Count—Product 963, Total Case Closure Count—Release 965, CSR Average Score—Product 967, and CSR Average Score—Release 969 are equally weighted, i.e., the output of algorithm 980 is simply divided by 4 (the number of vector elements in this specific illustrative example) the result is Mean Euclidian Distance 983. In one embodiment, Mean Euclidian Distance 983 is rounded to generate Skill Match Closeness Factor 985.

In other embodiments, Total Case Closure Count—Product 963, Total Case Closure Count—Release 965, CSR Average Score—Product 967, and CSR Average Score—Release 969 are not equally weighted, and an appropriate weight is applied to calculate a weighted Euclidean distance.

In this specific illustrative example, the employees are then ranked based on the output value of the Euclidian Distance Algorithm 980; step 6 in FIG. 9D.

Then, as discussed in more detail below, the ranked employees are filtered based on one or more rules and constraints; step 7 in FIG. 9D.

Consequently, the disclosed embodiments provide for "normalizing" the skills of one employee with respect to the skills of another employee so that the skill sets of multiple employees can be compared objectively with respect to the needs of a given task, project, or case. This is accomplished by taking into consideration, and integrating, the effect of historical and current aggregated "on the job" employee performance and dynamic work experience parameters of the employees with respect to their reported/known skills and the potential tasks, projects, or cases and/or clients. As a result, using the disclosed embodiments, the comparisons and analysis of the skill set data of multiple employees reflects "real world" and aggregated "on the job" performance considerations regarding the reported/known skills of the employees and the identified needs of a given job or client. Consequently, the disclosed normalization process integrates dynamic employee skills obtained "on the job" to uniformly evaluate an employee's skill set data.

Those of ordinary skill in the art will recognize that FIGS. 9C and 9D are but one example of numerous normalization methods contemplated by the inventors. Consequently, the specific illustrative example of a normalization process illustrated in FIGS. 9 C and 9D is not limiting to the invention as set forth in the claims below.

Returning to FIG. 7, in one embodiment, once generated by skill matching, normalization, and ranking module 353, the normalized employee skill set data 329 for each employee is provided to enterprise ML database 320 and stored in enterprise ML database 320 for access and use by the other components of multi-dimensional human resource allocation advisor system 300.

In one embodiment, skill matching, normalization, and ranking module 353 then processes the normalized employee skill set data 329 to generate normalized employee skill set vector data 330 for each employee represented in the initial skill set matched employee data. In one embodiment, the normalized employee skill set vector data 330 includes normalized employee skill set vector data 330 elements that correlate to each of the normalized employee skill set data 329 features associated with each initially matched employee.

In one embodiment, normalized employee skill set vector data 330 for each initially matched employee is generated by the skill matching, normalization, and ranking module 353 using one or more machine learning services and/or models and the matched normalized employee matched skill set data 329 features and the new case rules and constraints data 340 as input data.

In various embodiments, one or more of the machine learning services or modules includes but is not limited to, one or more of: a supervised machine learning service or model; an unsupervised machine learning service or model; a semi-supervised machine learning service or model; or any other machine learning service or model capable of generating normalized employee skill set vector data 330 based on using the normalized employee skill set data 329 features and the new case rules and constraints data 340 as input data, as discussed or illustrated herein, and/or as known in the art at the time of filing, and/or as developed or made available after the time of filing.

FIG. 10 is a graphic illustration of a specific illustrative example of normalized employee skill set vector elements 1000 provided as input data to a skill matching, normalization, and ranking sub-system 700 of a system for providing a multi-dimensional human resource allocation advisor 300, in accordance with one embodiment.

As seen in FIG. 10, in the specific illustrative example of FIG. 10, normalized employee skill set vector elements 1000 include: product line element 1001 for data representing the product lines associated with the employee; product skills element 1002 for data representing the product skills associated with the employee; module skills element 1003 for data representing the product module(s) associated with the employee; skill type element 1004 for data representing the skill type associated with the employee; complexity attained element 1005 for data representing the complexity attained by the employee; can handle P1/P2 element 1006 for data representing if the employee can take on priority one and/or priority two cases; engineer survey average element 1007 for data representing the average survey score for the employee for a defined number of last surveys; geo-location/time zone/PTO element 1008 for data representing the geolocation and/or time zone associated with the employee and the paid time off status of the employee; and engineer current load element 1009 for data representing the current workload of the employee.

Those of ordinary skill in the art will readily recognize that FIG. 10 is but one specific illustrative example of the type and arrangement of normalized employee skill set vector elements 1000 and that numerous other types and arrangement of normalized employee skill set vector elements 1000 are possible and contemplated by the inventors. Consequently, the specific illustrative example of the type and arrangement of normalized employee skill set vector elements 1000 should not be read to limit the invention as set forth in the claims.

Returning to FIG. 7, in one embodiment, once generated by skill matching, normalization, and ranking module 353, the normalized employee skill set vector data 330 for each employee is provided to enterprise ML database 320 and stored in enterprise ML database 320 for access and use by the other components of multi-dimensional human resource allocation advisor system 300.

As seen in FIG. 7, in one embodiment, raw ranked skill matched employee recommendation data 563 is generated by skill matching, normalization, and ranking module 353. In one embodiment, raw ranked skill matched employee recommendation data 563 is generated by skill matching, normalization, and ranking module 353 using the new case vector data 328 and the normalized employee skill set vector data 330 and one or more machine learning algorithms.

In one embodiment, skill matching, normalization, and ranking module 353 uses new case vector data 328 and the normalized employee skill set vector data 330 as input to one or more previously trained machine learning models.

In one embodiment, the previously trained machine learning model is trained in an offline environment (not shown) using total cases closed by the employee, average resolution time for cases closed by the employee, average customer satisfaction review score data for the employee, historic case data 305, historic client data, historic initial employee skill set data, historic dynamic employee skill set data, historic employee HR data, and historic rules and constraints data, as well as historic task, project, or case completion data, historic customer review/ratings data, and other historic case and employee data as training data. In one embodiment, using this training data, the machine learning model is trained to match and rank the normalized employee skill set vector data 330 for initially matched employees with the new case vector data 328 using the new case rules and constraints data 340 as matching constraints/filters.

In various embodiments, the machine learning model is any one or more of: a supervised machine learning service or model; an unsupervised machine learning service or model; a semi-supervised machine learning service or model; or any other machine learning service or model capable of being trained to match and rank the normalized employee skill set data 329 for initially matched employees with the new case vector data 328 using the new case rules and constraints data 340 as matching constraints/filters.

As a specific illustrative example, in one embodiment, the machine learning model utilizes weighted or non-weighted Euclidian Distance methods, or any other ranking algorithms/methods, as discussed or illustrated herein, and/or as known in the art at the time of filing, and/or as developed after the time of filing.

As seen in FIG. 7, in one embodiment, the output of the machine learning model, and skill matching, normalization, and ranking module 353, is raw ranked skill matched employee recommendation data 563. In one embodiment, the raw ranked skill matched employee recommendation data 563 includes data representing the employees matched, or most closely matched, to the new case along with their aggregated employee skill set data 323.

FIG. 11 is a graphic illustration of a specific illustrative example of the interaction and relationship of the new case data 307 of FIG. 3 and new case vector elements 800 of FIG. 8, the aggregated employee skill set data 323 of FIG. 3 and normalized employee skill set vector elements 1000 of FIG. 10, the skill matching, normalization, and ranking sub-system of FIG. 7, and raw ranked skill matched employee recommendation data 563, in accordance with one embodiment.

Figure 12:
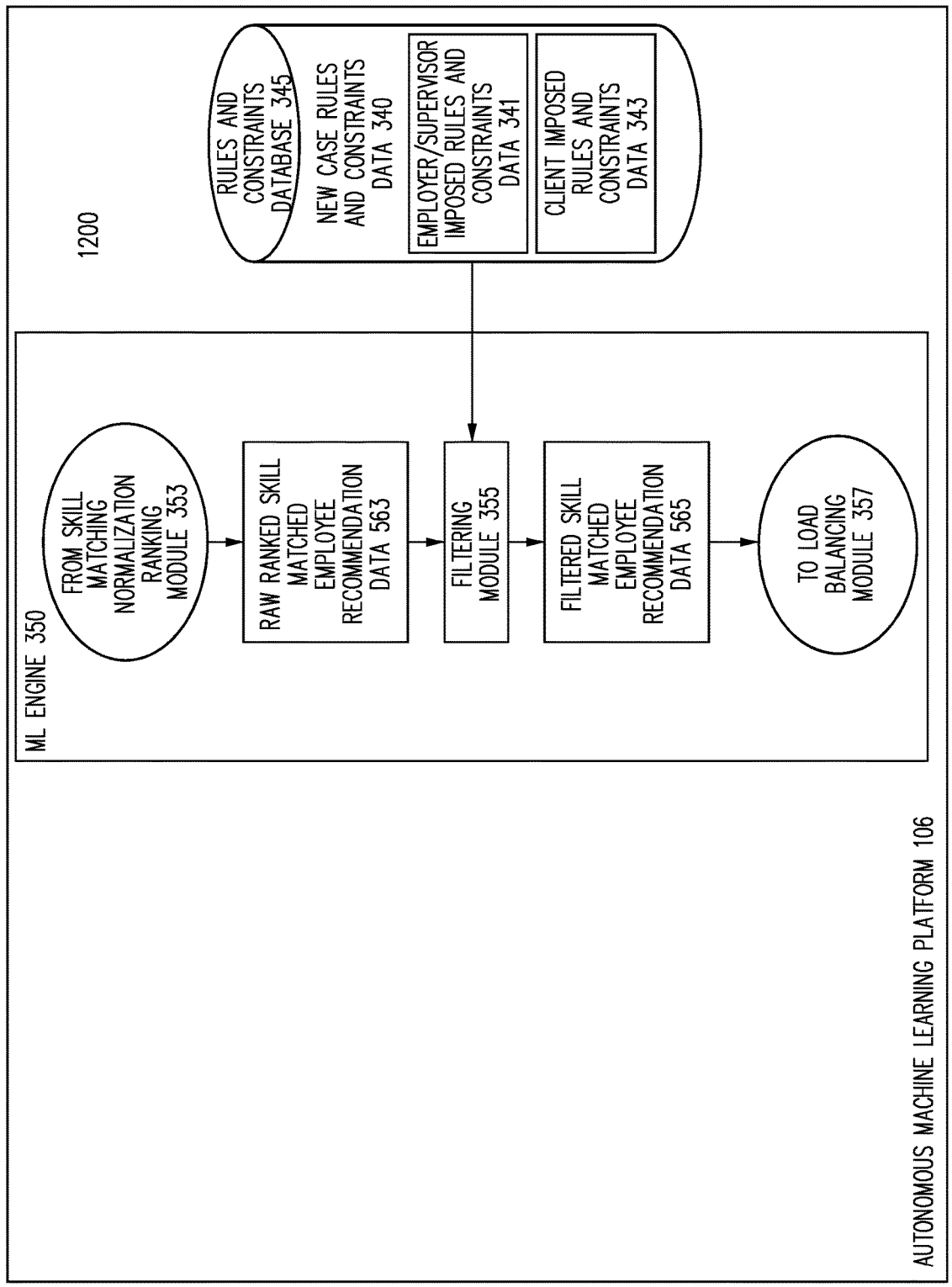
FIG. 12 is a component diagram showing the interaction of various components of a filtering sub-system of a system for providing a multi-dimensional human resource allocation advisor, in accordance with one embodiment.

Returning to FIG. 7, as seen in FIG. 7 the raw ranked skill matched employee recommendation data 563 from skill matching, normalization, and ranking module 353 is then provided to filtering module 355 of FIG. 3 and FIG. 12.

FIG. 12 is a component diagram showing the interaction of various components of a filtering sub-system 1200 of the system for providing a multi-dimensional human resource allocation advisor 300 of FIG. 3, in accordance with one embodiment.

As seen in FIG. 12, filtering module 355 of filtering sub-system 1200 receives the raw ranked skill matched employee recommendation data 563 from skill matching, normalization, and ranking module 353. In addition, filtering module 355 of filtering sub-system 1200 is in operative communication with rules and constraints database 345 and therefore has access to new case rules and constraints data 340.

In one embodiment, filtering module 355 processes the raw ranked skill matched employee recommendation data 563 based on one or more of the rules and constraints represented in new case rules and constraints data 340 to generate filtered skill matched employee recommendation data 565. In one embodiment, filtered skill matched employee recommendation data 565 therefore represents data representing the employees matched, or most closely matched, to the new case that also comply with the rules and constraints of the new case rules and constraints data 340.

FIG. 13 is a graphic illustration of the operation of a specific illustrative example of the filtering sub-system in accordance with one embodiment. As seen in FIG. 13, raw ranked skill matched employee recommendation data 563 is received by filtering module 355 from skill matching, normalization, and ranking module 353.

In specific illustrative example of FIG. 13, rule 1301 directed to Paid Time Off (PTO) constraints, rule 1303 directed to Time Zone constraints, rule 1305 directed to citizenship/residency constraints, and rule 1307 directed to priority case work constraints, are provided by rules and constraints database 345 and applied to raw ranked skill matched employee recommendation data 563 at filter module 355.

In one embodiment, the result is filtered skill matched employee recommendation data 565 which is then provided to load balancing module 357.

Figure 14:
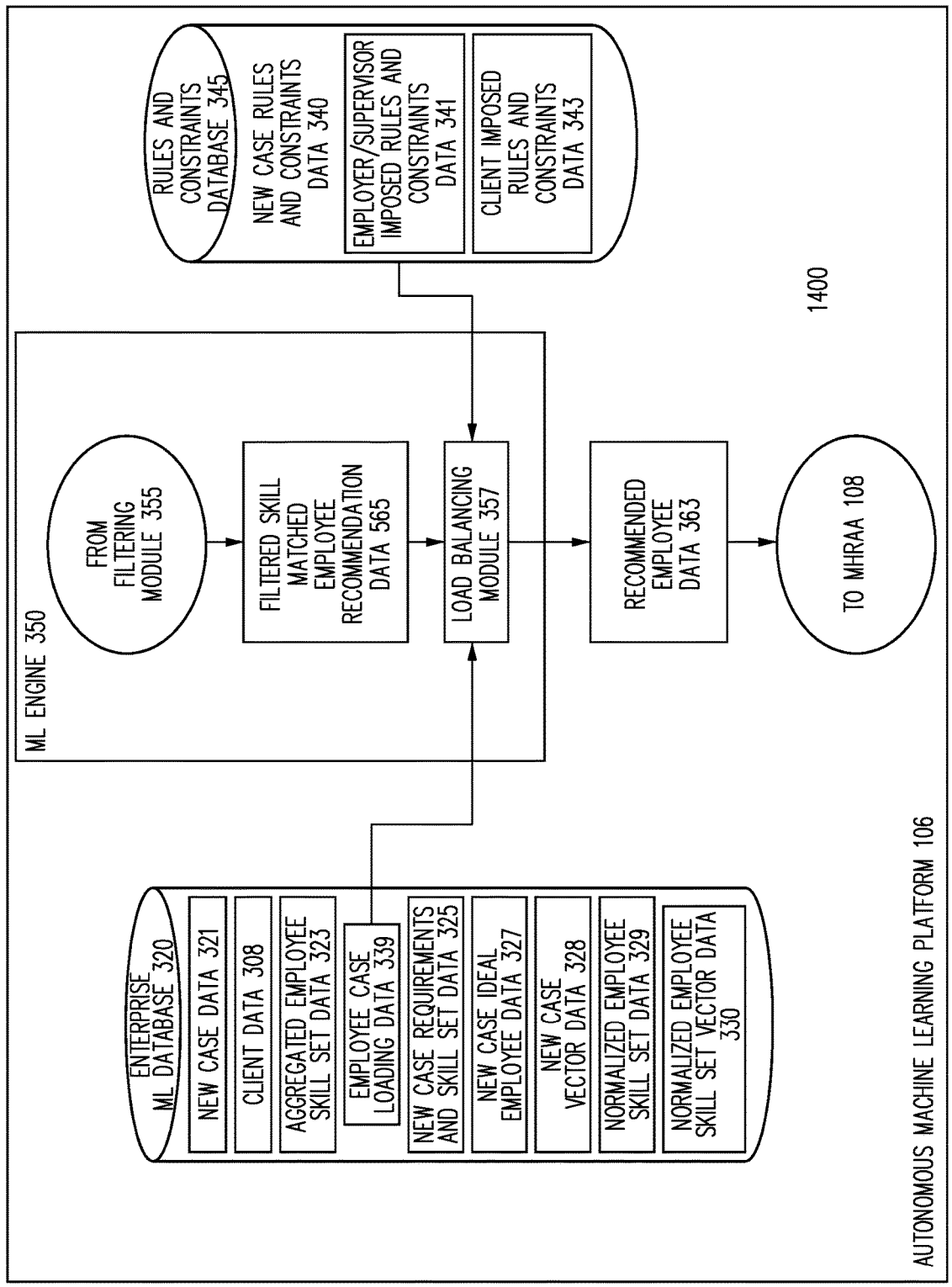
FIG. 14 is a component diagram showing the interaction of various components of a load balancing sub-system and of a system for providing a multi-dimensional human resource allocation advisor, in accordance with one embodiment.
Figure 16:
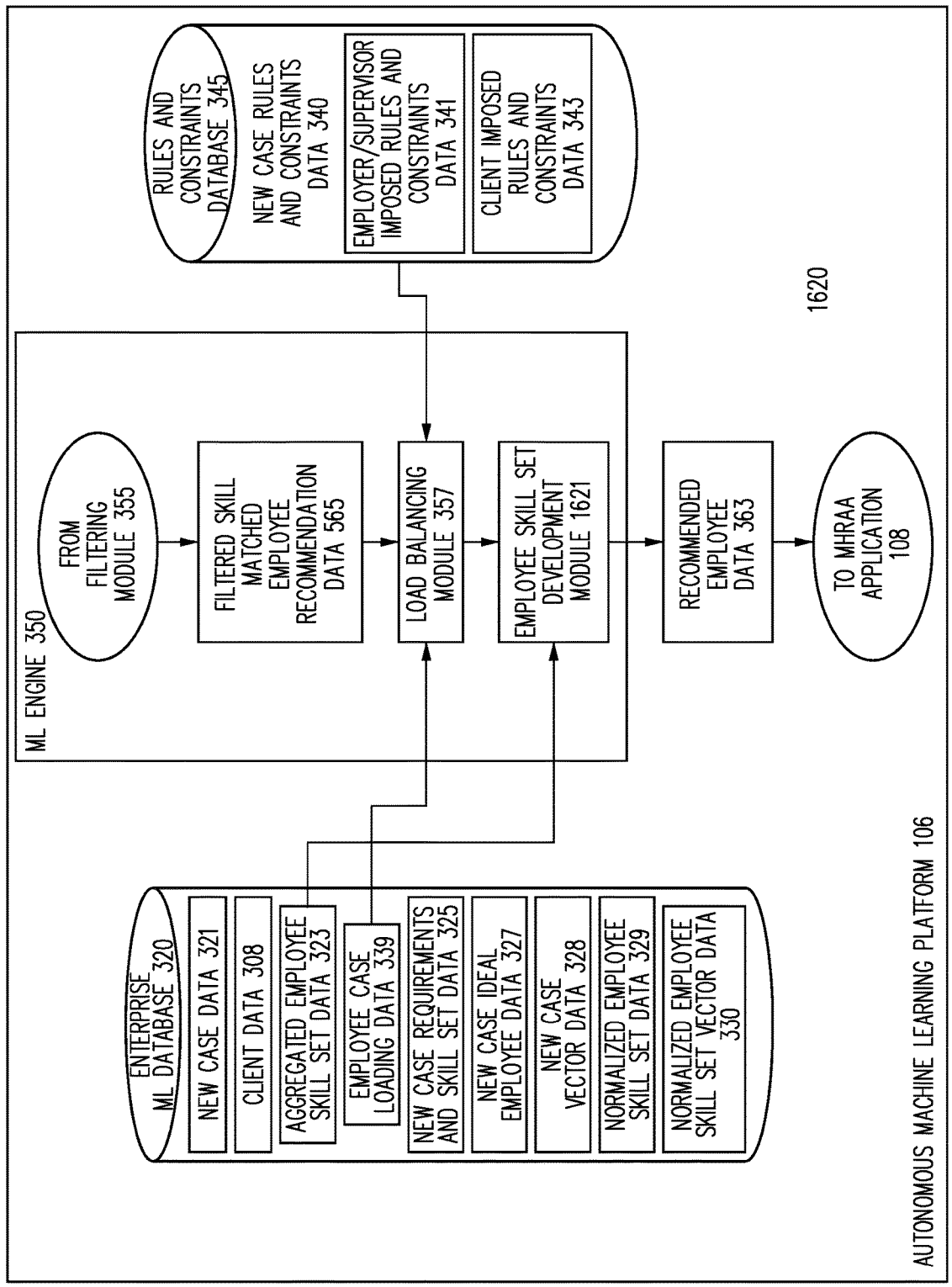
FIG. 16 is a component diagram showing the interaction of various components of a load balancing and employee skill development sub-system of a system for providing a multi-dimensional human resource allocation advisor, in accordance with one embodiment.

Returning to FIG. 12, in one embodiment, once generated by filtering module 355, filtered skill matched employee recommendation data 565 is provided to the load balancing module 357 of FIG. 3, 14, or 16.

FIG. 14 is a component diagram showing the interaction of various components of a load balancing sub-system 1400 of the system for providing a multi-dimensional human resource allocation advisor 300 of FIG. 3, in accordance with one embodiment.

As seen in FIG. 14, load balancing module 357 receives filtered skill matched employee recommendation data 565 from filtering module 355. In addition, load balancing module 357 is in operative communication with enterprise ML database 320 and therefore has access to employee case loading data 339. In addition, load balancing module 357 is in operative communication with rules and constraints database 345 and therefore has access to new case rules and constraints data 340.

In one embodiment, load balancing module 357 further processes and/or filters filtered skill matched employee recommendation data 565 to generate recommended employee data 363 for the new case based on employee job load balancing considerations as indicated in employee case loading data 339 and one or more rules and constraints as indicated in new case rules and constraints data of rules and constraints database 345.

As a specific illustrative example, let it be stipulated that one of the rules/constraints indicated in rules and constraints database 345 is an employer/supervisor set "rule A" that for any employee reporting to a specific supervisor, or working on a particular portion of a task, project, or case, the employee can have no more than 5 total assigned tasks, projects, or cases open at a time and not more than 10 deadlines/milestones to meet in a given week.

Further stipulate that three employees are listed as matched employees in filtered skill matched employee recommendation data 565 for the particular portion of a task, project, or case supervised by the specific supervisor; Employee 1, employee 2, and employee 3. Further stipulate that the portion of the task, project, or case includes 5 deadlines/milestones per week.

Further stipulate that it is determined by load balancing module 357, based on data from employee case loading data 339, that: Employee 1 has 5 open tasks, projects, or cases already and 3 deadlines/milestones per week; employee 2 has 3 open tasks, projects, or cases and 7 deadlines/milestones per week; and employee 3 has 2 open tasks, projects, or cases and 4 deadlines/milestones per week.

Under these stipulated circumstances, load balancing module 357 would filter out Employee 1 from filtered skill matched employee recommendation data 565 because Employee 1 already has 5 open tasks, projects, or cases and the addition of the new job would violate the rule A constraint of no more than 5 open tasks, projects, or cases at a time.

In addition, employee 2 from filtered skill matched employee recommendation data 565 is filtered out because employee 2 already has 7 deadlines/milestones per week and the addition of the 5 new deadlines/milestones per week would violate the rule A constraint of no more than 10 deadlines/milestones per week.

Finally, only employee 3 would not be filtered out by load balancing module 357 because employee 3 can take on both a new job, and only have 3 open tasks, projects, or cases, and the 5 new deadlines/milestones per week and still only have 9 deadlines/milestones per week, so employee 3 alone would be compatible with the employer/supervisor set rule A that for any employee reporting to that specific supervisor, or working on a particular portion of a task, project, or case, the employee can have no more than 5 total assigned tasks, projects, or cases open at a time and not more than 10 deadlines or milestones to meet in a given week.

Consequently, while in this example, filtered skill matched employee recommendation data 565 from filtering module 355 included 3 employees, recommended employee data 363 from load balancing module 357 would only include the single employee 3.

FIG. 15 is a high-level graphic illustration of the cumulative effect of the application of the filtering sub-system of FIG. 12 and the load balancing sub-system of FIG. 14 on an initial pool of employees having skill set data matching, or most closely matching, the identified required skills associated with a specific case, in accordance with one embodiment.

FIG. 16 is a component diagram showing the interaction of various components of a load balancing and employee skill development sub-system 1620 of a system for providing a multi-dimensional human resource allocation advisor 300 of FIG. 3, in accordance with one embodiment.

As seen in FIG. 16, in addition to load balancing module 357, load balancing and employee skill development sub-system 1620 includes employee skill set development module 1621. In one embodiment, employee skill set development module 1621 receives filtered skill matched employee recommendation data 565 from filtering module 355, or load balancing module 357. In addition, employee skill set development module 1621 is in operative communication with enterprise ML database 320 and therefore has access to aggregated employee skill set data 323. In addition, employee skill set development module 1621 is in operative communication with rules and constraints database 345 and therefore has access to new case rules and constraints data 340.

In one embodiment, the purpose of employee skill set development module 1621 is to develop the skill sets of the employees of the employer business while, at the same time meeting the needs of the new case and client. To this end, employer/supervisor employee development rules governing the assignment of employees to job and cases where they can develop new, and defined, skills determined to be needed by the employer business and/or the clients of the business, are generated and stored in rules and constraints database 345.

In one embodiment, the aggregated employee skill set data for employees listed in the filtered skill matched employee recommendation data 565 from filtering module 355, or not listed in the filtered skill matched employee recommendation data 565 from filtering module 355, is examined in light of these additional employer/supervisor employee development rules and the list of employees included in the recommended employee data 363 is adjusted accordingly to provide for employee skill set development.

As shown in each of FIGS. 14 and 16, in one embodiment, the output of load balancing sub-system 1400 of FIG. 14, or load balancing and employee skill development sub-system 1620 of FIG. 16, is recommended employee data 363 for the new case.

In one embodiment, the recommended employee data 363 for the new case includes data representing the employee, or employees, having aggregated employee skill set data 323 most closely matching the new case requirements and skill set data 325, that are in compliance with the new case rules and constraints data 340, and that meet the experience and/or workload balancing requirements discussed above.

As shown in FIG. 3, the recommended employee data 363 for the new case is then provided to user layer 107 and, in this discussion, to case intake and management system 301 through MHRAA application 108. In one embodiment, the recommended employee data 363, and/or the reasons and ranking for the recommended employees, is provided to a decision maker for approval, editing, and final employee assignment/allocation. In various embodiments, the decision maker receiving the recommended employee data for the new case can be, but is not limited to, one or more of: a human decision maker, such as a supervisor or other employee having access/decision maker permissions for approval, editing, and final employee assignment/allocation; one or more applications used for approval, editing, and final employee assignment/allocation, and/or for further processing of the recommended employee data for the new case; and/or any other entity, such as a corporation, responsible for approval, editing, and final employee assignment/allocation.

FIGS. 17A, 17B, 17C, 17D, 17E, 17F, and 17G are specific illustrative examples of user interface screens in accordance with one embodiment that are indicative of the operation and user experience associated with one illustrative embodiment of a system and method for providing a multi-dimensional human resource allocation advisor. are discussed in more detail below.

Figure 17A:
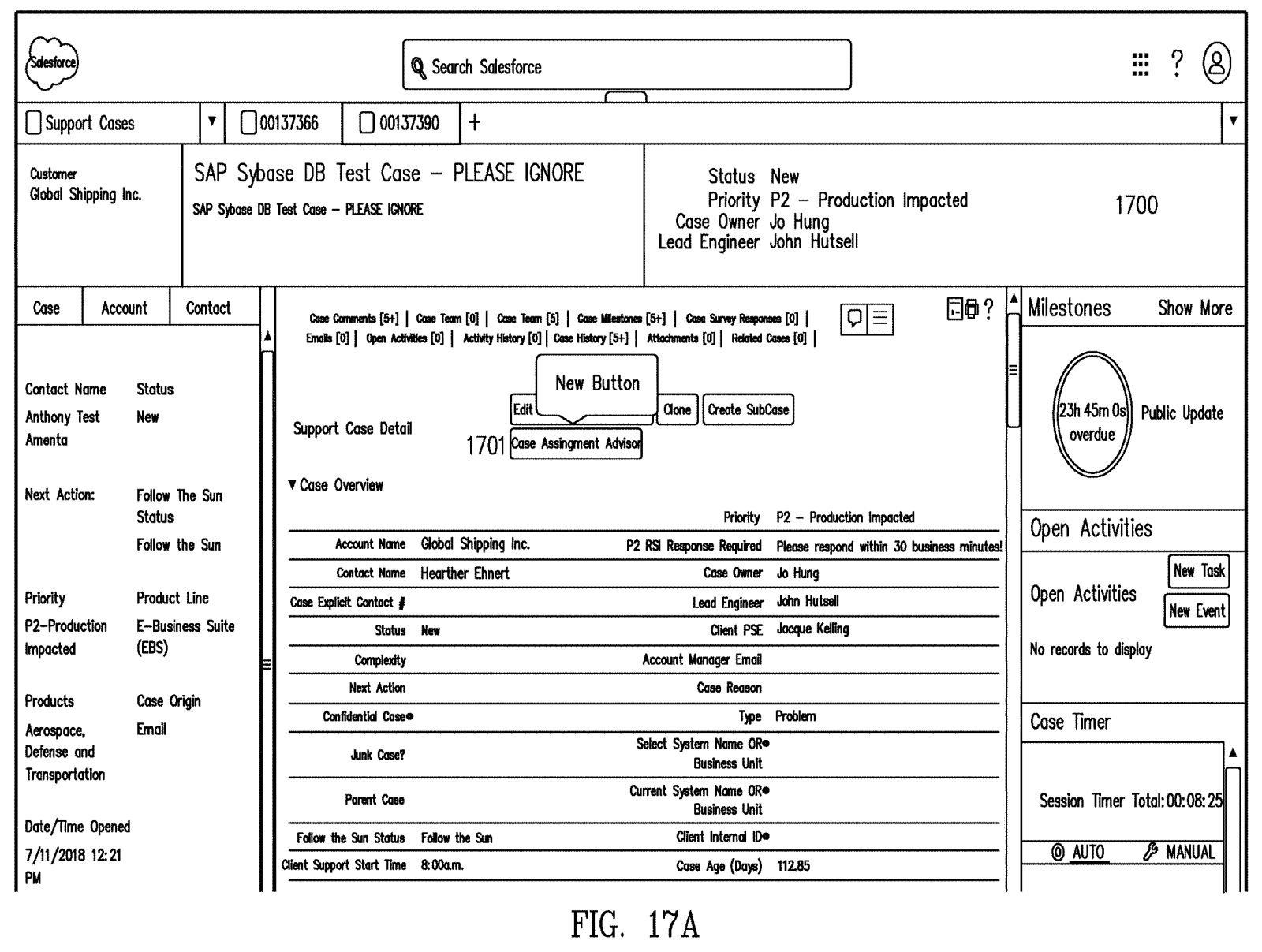
Figure 17B:
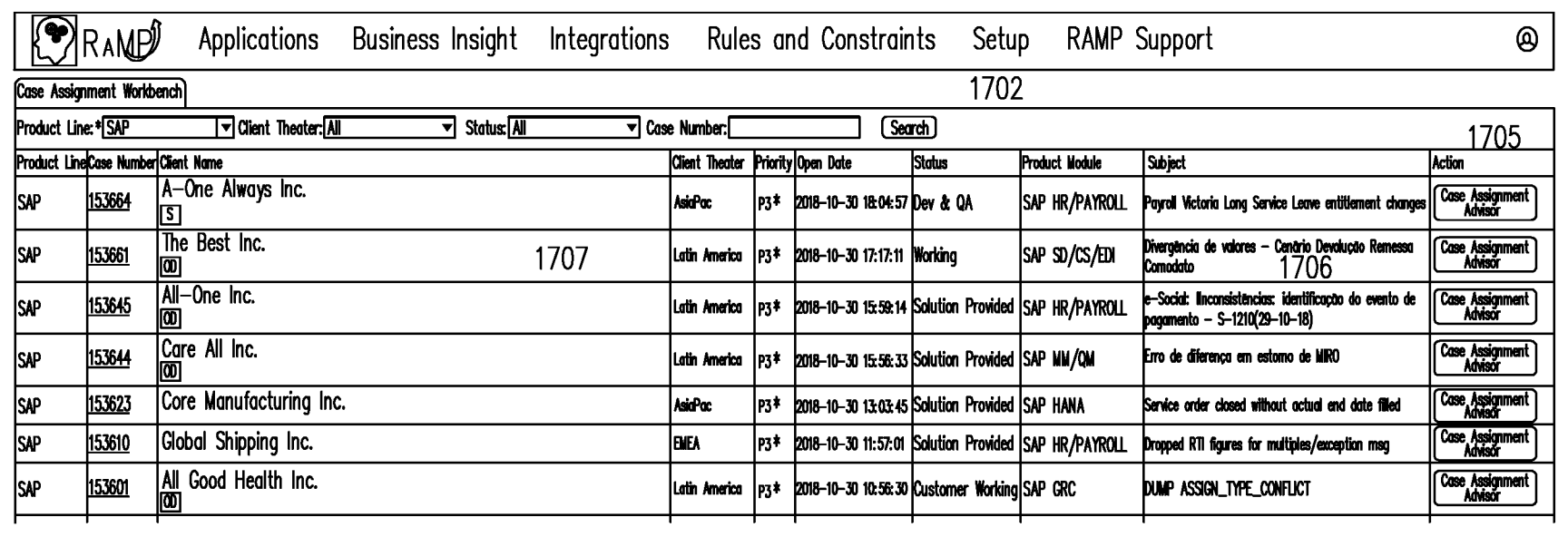
Figure 17C:

Referring now to FIG. 3, FIG. 11, and FIGS. 17A through 17G, FIG. 17A includes a user interface display 1700 through which a user, such as a supervisor or any employee of the business with access credentials, can access recommended employee data 363 for the new case through MHRAA application 108. As seen in FIG. 17A, access to recommended employee data 363 for the new case is begun by activating "new case advisor" icon 1701 of user interface display 1700.

Activation of "new case advisor" icon 1701 of user interface display 1700 of FIG. 17A causes the interface display of FIG. 17B to be generated. FIG. 17B includes a user interface display 1702 that is utilized by a supervisor of employees, or other employer business employee with access credentials, to access recommended employee data 363 for the new case through MHRAA application 108.

As seen in FIG. 17B, in this specific illustrative example, user interface display 1702 includes a listing of active cases including product line data for each case, a case number of each case, priority data for each case, open date data for each case, status priority data for each case, product-module data for each case, subject data for each case, and action field 1705 for each case.

In one embodiment, the action field 1705 for each case includes case assignment advisor icons for each case. In this specific illustrative example, it is stipulated that the supervisor/user activates case assignment advisor icon 1706 for case 1707, i.e., case number 00153661. Of note is that case 1707 is a priority three (P3) case. In this illustrative example, activation of case assignment advisor icon 1706 causes "my recommendations" screen 1710 of FIG. 17C to be generated.

As seen in FIG. 17C, "my recommendation" screen 1710 displays recommended employee data 363. As seen in FIG. 17C, in this specific example, my recommendation screen 1710 includes a listing of recommended employees of recommended employee data 363 including employees 1711, 1713, 1715, 1717, 1719, 1721, 1723, and 1725 and top recommended employees 1711 and 1713.

As seen in FIG. 17C, in this specific example, employees 1711 and 1713 are listed first and are labeled as "top for this assignment," i.e., are the top recommended employees. In this illustrative example, this is due to the fact employees 1711 and 1713 have the lowest skill matched closeness scores, i.e., their normalized skill matched vectors have the least weighted or non-weighted Euclidian Distance from the ideal employee vector for this case.

As also seen in FIG. 17C, while employees 1715, 1717, 1719, and 1723 are recommended for this illustrative case as "good for assignment" they are not top recommended employees for this case, again based on their skill matched closeness scores which are higher than those of employees 1711 and 1713, indicating their normalized skill matched vectors are further from the ideal employee vector for this case.

As also seen in FIG. 17C, Employee 1721 is not recommended for this case based on "LD" or case loading showing Employee 1721 already has 17 open cases.

As seen in FIG. 17C, my recommendation screen 1710 also includes: employee time zone data for each listed employee; current load data for each employee, listing the current workload of the employees in terms of open cases and deadlines/milestones; assign as fields through which the supervisor/user can designate the role of any employee assigned to the case; engineer insight column including "review" links 1726 for each employee; and model reasoning links for each employee in column 1727.

As also seen in FIG. 17C, my recommendation screen 1710 also includes review client insight link 1729A for generating a client insight display 1750, such as shown in FIG. 17E, and discussed below, and theater recommendations link 1729B for generating a theater, or regional, recommendation display, such as shown in FIG. 17G, and discussed below.

As noted above, screen 1710 includes model reasoning column 1727 and "explain me" links for each listed employee. In this specific illustrative example, it is stipulated that the supervisor/user activates the "explain me" link 1728 for Employee 1711 which causes "explain model reasoning" interface screen 1730 of FIG. 17D to be generated.

As seen in FIG. 17D, in this specific illustrative example, explain model reasoning interface screen 1730 includes a subset of the matched normalized employee skill set vector elements 1000 and new case vector elements 800 from the employee aggregated skill set data 323 for Employee 1711 and the data/scores associated with these matched skills for Employee 1711. Also, of note, in FIG. 17D, explain model reasoning interface screen 1730 includes a listing of the applied/passed rules and constraints 1731.

Returning to FIG. 17C, my recommendation screen 1710 also includes "review client insight" link 1729A.

In this specific illustrative example, it is stipulated that the supervisor/user activates the "review client insight" link 1729A which causes review client insight interface screen 1750 of FIG. 17E to be generated.

As seen in FIG. 17E, review client insight interface screen 1750 includes Customer Satisfaction Review (CSR) insight data, case flow insight data, and case closure insight data for the customer/client associated with case 1701, i.e., case number 00153661.

Returning to FIG. 17C, as noted above and seen in FIG. 17C, my recommendation screen 1710 also includes engineer insight column and engineer insight review links for each employee/engineer, including engineer insight review link 1726 for Employee 1711.

In this specific illustrative example, it is stipulated that the supervisor/user activates the engineer insight review link 1726 for Employee 1711 which causes review engineer insight interface screen 1760 of FIG. 17F to be generated.

As seen in FIG. 17F, review engineer insight interface screen 1760 includes Customer Satisfaction Review (CSR) insight data, and case closure insight data for Employee 1711 associated with Employee 1711.

Returning to FIG. 17C, my recommendation screen 1710 also includes "theater recommendation" link 1729B.

In this specific illustrative example, it is stipulated that the supervisor/user activates the "theater recommendation" link 1729B which causes "theater recommendation filtered my recommendations" interface screen 1770 of FIG. 17G to be generated.

As seen in FIG. 17G, "theater recommendation filtered my recommendations" interface screen 1770 displays recommended employee data 363. As seen in FIG. 17G, in this specific example, "theater recommendation filtered my recommendations" interface screen 1770 includes a listing of recommended employees of recommended employee data 363 including employees 1771, 1773, 1775, 1777, 1779, 1781, and 1783, with top recommended employees 1771 and 1773.

The recommendations shown in "theater recommendation filtered my recommendations" interface screen 1770 differ from those shown in FIG. 17C in that the recommendations of "theater recommendation filtered my recommendations" interface screen 1770 are based/filtered on rules and constraints pertaining to the region the employee works in, and the teams, supervisors, and organization for that region, to allow for the selection of employees that can service a product line and/or support a team for clients and cases throughout the globe in a "follow the sun" model where cases can be passed between teams, regions, and offices globally to reduce delays and increase responsiveness to clients.

Embodiments of the present disclosure use normalized multi-dimensional employee skill set data obtained from multiple sources along with machine learning algorithms, rules and constraints filtering, regional considerations, and workload balancing, to identify and recommend employees who: have the skills required to perform the tasks associated with a new project or case, are available and have the experience to perform the tasks associated with the project or case, and are eligible to be assigned to the new project, task, or case based on client and business requirements, regional requirements, and workload balancing considerations. Therefore, embodiments of the present disclosure provide one or more technical solutions to the long-standing technical problem of effectively, efficiently, and objectively assigning the most qualified employees to specific projects and tasks.

Term Definitions

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed or illustrated herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed or illustrated herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed or illustrated herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer and/or Transport Layer Security communications channels and various other secure communications channels, and/or distributed computing system networks, such as, but not limited to: a public cloud; a private cloud;

a multi-tenant cloud architecture; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed or illustrated herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the terms "database" and "storage container" are used interchangeably and include, but are not limited to, any physical or virtual data source or storage device. For instance, in various embodiments, a storage container can be, but is not limited to, a non-transitory computer readable medium for carrying out instructions using a processor to execute a process, one or more of a hard disk drive, a solid-state drive, an EEPROM, PROM, volatile or non-volatile memory, an optical disk, a server, a memory array, a database, a virtual database, a virtual memory, a virtual data directory, or other physical or virtual data sources.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the terms "business" and "employer business" are used interchangeably and include any organization, person, or entity that employs or contracts "employees" for the purpose of performing "jobs," "tasks," or servicing "cases," or "projects" for "clients" of the "business."

As used herein, the term "employee" includes any organization, person, or entity that is utilized by a "business" for the purpose of performing "jobs," "tasks," or servicing "cases," or "projects" for "clients" of the "business." As specific examples, an "employee" can be a full-time employee, a part-time employee, a contract employee or entity, or a sub-contracted employee or entity.

As used herein, the terms "project," "job," "case," and "task," are used interactively and interchangeably where: the term "task" includes any item, function, or responsibility assigned to an "employer business" or "employee" to performed on behalf of a "client" of the "employer business;" the terms "project" and "job" includes any "task," or set of "tasks," assigned to an "employer business" or "employee" to performed on behalf of a "client" of the "employer business;" and the term "case" includes any "task," "project," or "job," assigned to an "employer business" or "employee" to performed on behalf of a "client" of the "employer business" that has been accepted by an employer business and is being, has been, or will be, entered into the employer business' system.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of ordinary skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of ordinary skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of ordinary skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by Those of ordinary skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a system selectively activated or configured/reconfigured by a computer program stored on a non-transitory computer readable medium for carrying out instructions using a processor to execute a process, as discussed or illustrated herein that can be accessed by a computing system or other device.

Those of ordinary skill in the art will readily recognize that the algorithms and operations presented herein are not inherently related to any particular computing system, computer architecture, computer or industry standard, or any other specific apparatus. Various systems may also be used with programs in accordance with the teaching herein, or it may prove more convenient/efficient to construct more specialized apparatuses to perform the required operations described herein. The required structure for a variety of these systems will be apparent to Those of ordinary skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the invention as contemplated by the inventors at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed or illustrated herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing multi-dimensional human resource allocation recommendations, the method comprising:
   obtaining, by one or more computing processors, access to one or more sources of employee skill set data and aggregating the employee skill set data to generate aggregated employee skill set data for each of the employees of a set of employees of a business;
   dynamically updating, by the one or more computing processors, the aggregated employee skill set data in nearly real-time to generate dynamic employee skill set data;
   generating rules and constraints data governing the assignment of employees of the business to tasks to be performed by the employees of the business for clients of the business;
   obtaining new case data representing a new task or project to be performed by employees of the business for a client of the business;
   processing the new case data to generate new case requirements and skill set data representing required employee skills and qualifications for employees of the business that are to be assigned to the task or project represented by the new case data;
   providing an autonomous machine learning platform;
   providing, by the one or more computing processors, the aggregated employee skill set data for each of the employees of the set of employees of the business and the new case requirements and skill set data as input data to one or more machine learning algorithms of the autonomous machine learning platform, wherein the one or more machine learning algorithms identify initial skill set matched employee data representing a set of skill set matched employees having one or more matched skills matched to the new case skills and requirements represented in the new case requirements and skill set data;

for each skill set matched employee, normalizing the matched skills for the skill set matched employee to generate normalized employee skill set data for that skill set matched employee, wherein normalizing the matched skills for the skill set matched employee includes providing the dynamic employee skill set data as input data to one or more machine learning algorithms of the autonomous machine learning platform;

providing the normalized employee skill set data for each skill set matched employee and the new case requirements and skill set data as input data to a trained machine learning model of the autonomous machine learning platform, wherein the trained machine learning model generates raw ranked skill matched employee recommendation data representing a set of raw ranked skill matched employees;

using, by the one or more computing processors, at least part of the raw ranked skill matched employee recommendation data as training data to train the machine learning model of the autonomous machine learning platform;

filtering the raw ranked skill matched employee recommendation data using the rules and constraints data to generate filtered and ranked skill matched employee recommendation data representing a set of filtered and ranked skill matched employees;

providing the filtered and ranked skill matched employee recommendation data to a decision maker for review and approval; and assigning one or more of the filtered and ranked skill matched employees represented by the filtered and ranked skill matched employee recommendation data to the new task or project represented by the new case data.

2. The computing system implemented method for providing multi-dimensional human resource allocation recommendations of claim 1 wherein the aggregated employee skill set data includes initial employee skill set data and dynamic employee skill set data.

3. The computing system implemented method for providing multi-dimensional human resource allocation recommendations of claim 1 wherein the aggregated employee skill set data includes data selected from the group of employee skill set data consisting of:

data representing the total cases closed by the employee;
data representing the average resolution time for cases closed by the employee;
data representing average customer satisfaction review scores for the employee;
data representing historic task, project, or case closures associated with the employees;
data representing experience and team participation associated with the employees;
data representing team leadership experience associated with the employees;
review data per clients associated with the employees;
review data per products associated with the employees;
data representing product module experience associated with the employees;
data representing case priority experience associated with the employees; data representing average resolution close time per product associated with the employees;
data representing average resolution/close time per client associated with the employees;
data representing total cases worked in each product line/module associated with the employees;
data representing certifications associated with the employees;
data representing programming languages experience associated with the employees;
data representing human languages the employees can speak, write, or read; data representing milestones per time period associated with the employees; and
data representing product release experience associated with the employees.

4. The computing system implemented method for providing multi-dimensional human resource allocation recommendations of Claim wherein the rules and constraints data includes one or more rules and constraints selected from the group rules and constraints consisting of:

rules and constraints limiting the number of active tasks, projects, or cases that can be assigned to any, or particular, employees;
rules and constraints limiting the number of active deadlines or benchmarks per defined time frame that can be assigned to any, or particular, employees;
rules and constraints limiting the maximum number of active tasks, projects, or cases of a particular priority or urgency that can be assigned to any, or particular, employees;
rules and constraints regarding the use of full-time employees before assigning part-time or contract employees;
rules and constraints regarding employee experience required for one or more employee roles with different priority tasks, projects, or cases and clients;
rules and constraints indicating required citizenship for employees working for the client or assigned to the new case;
rules and constraints indicating required languages spoken by employees working for the client or assigned to the new case;
rules and constraints indicating the required time zone for employees working for the client or assigned to the new case;
rules and constraints regarding customer satisfaction survey thresholds for employees assigned to a new case with an escalated client; and
rules and constraints regarding availability of employees working for the client or assigned to the new case.

5. The computing system implemented method for providing multi-dimensional human resource allocation recommendations of claim 1 wherein the rules and constraints are selectable by an employee of the business having access rights and include ranges and thresholds that can be adjusted by an employee of the business having access rights based on client or historic data in the case intake and management system.

6. The computing system implemented method for providing multi-dimensional human resource allocation recommendations of claim 1 wherein the new case data includes data selected from new case data consisting of:

data representing the name of the task or project of the new case;
data representing the name of the client for which the task or project of the new case is to be performed;

data representing the priority of the task or project of the new case;

data representing the priority of the client associated with the task or project of the new case;

data representing the equipment type or product line associated with the task or project of the new case;

data representing whether the client associated with the task or project of the new case is an escalated or strategic client;

data representing the contractual obligations or requirements associated with the client associated with the task or project of the new case or the task or project of the new case;

data representing the average score of survey data of the client associated with the task or project of the new case;

data representing subcomponents included with the equipment type or product line associated with the task or project of the new case;

data representing the type of the task or project of the new case;

data representing the complexity of the task or project of the new case;

data representing the geographic location of the client associated with the new case;

data representing the geographic location where the task or project of the new case is to be performed; and data representing the time zone where the task or project of the new case is to be performed.

7. The computing system implemented method for providing multi-dimensional human resource allocation recommendations of claim 1 wherein the one or more matched skills of the aggregated employee data matched to the new case skills and requirements represented in the new case requirements and skill set data include one or more employee matched skills data selected from the group of employee matched skill set data consisting of:

data representing total cases closed by the employee that are related to the matched skill;

data representing average resolution time for cases closed by the employee that are related to the matched skill;

data representing average customer satisfaction review scores for the employee that are related to the matched skill;

data representing cases owned and closed by the employee that are related to the matched skill;

data representing cases led and closed by the employee that are related to the matched skill;

data representing cases contributed to by the employee that are related to the matched skill;

data representing resolution time associated with cases owned and closed by the employee that are related to the matched skill;

data representing resolution time associated with cases participated in and closed by the employee that are related to the matched skill;

data representing resolution time associated with cases participated in by the employee that are related to the matched skill; and data representing reviews and customer satisfaction reviews for the employee or employee team associated with the matched skill.

8. The computing system implemented method for providing multi-dimensional human resource allocation recommendations of claim 7 wherein the matched skills for the skill set matched employees are normalized using Min-Max Normalization.

9. The computing system implemented method for providing multi-dimensional human resource allocation recommendations of claim 1 wherein the machine learning algorithm used to generate the raw ranked skill matched employee recommendation data is a weighted Least Euclidean Distance machine learning algorithm.

10. The computing system implemented method for providing multi-dimensional human resource allocation recommendations of claim 1 wherein the decision maker receiving the recommended employee data is an application.

11. The computing system implemented method for providing multi-dimensional human resource allocation recommendations of claim 1 further comprising:

generating employee development rules and constraints data representing employee development rules and constraints governing the assignment of employees to cases where the employees can develop defined skills determined to be needed by the business and the clients of the business;

processing the filtered skill matched employee recommendation data using the employee development rules and constraints data to generate recommended employee data for the new case representing one or more recommended employees for the new case; and providing the recommended employee data to a decision maker for review and/or approval.

12. A computing system implemented method for providing multi-dimensional human resource allocation recommendations, the method comprising:

aggregating, by one or more computing processors, initial employee skill set data, and employee HR data to generate aggregated employee skill set data for each of the employees of a set of employees of a business;

dynamically updating, by the one or more computing processors, the aggregated employee skill set data in nearly real-time to generate dynamic employee skill set data;

defining employer/supervisor-imposed rules and constraints governing the assignment of employees of the business to tasks to be performed by the employees of the business for clients of the business;

generating employer/supervisor-imposed rules and constraints data representing the defined employer/supervisor-imposed rules and constraints;

obtaining new case data representing a new task or project to be performed by employees of the business for a client of the business;

obtaining client data for a client associated with the new case data;

processing the new case data and the client data to generate new case requirements and skill set data representing required employee skills and qualifications for employees of the business that are to be assigned to the task or project represented by the new case data;

processing the new case requirements and skill set data to generate client-imposed rules and constraints data governing the assignment of employees of the business to the task or project represented by the new case data;

aggregating the employer/supervisor-imposed rules and constraints data and the client-imposed rules and constraints data to generate new case rules and constraints data representing the employer/supervisor-imposed rules and constraints and client-imposed rules and constraints governing the assignment of employees of the business to the task or project represented by the new case data;

providing an autonomous machine learning platform;

providing, by the one or more computing processors, the new case requirements and skill set data and the new case rules and constraints data as input data to one or more machine learning modules of the autonomous machine learning platform, wherein the one or more machine learning modules generate new case vector data;

providing, by the one or more computing processors, the aggregated employee skill set data for each of the employees of the set of employees of the business and the new case requirements and skill set data as input data to one or more machine learning algorithms of the autonomous machine learning platform, wherein the one or more machine learning algorithms identify initial skill set matched employee data representing a set of skill set matched employees having one or more matched skills matched to the new case skills and requirements represented in the new case requirements and skill set data;

for each skill set matched employee, normalizing the matched skills for the skill set matched employee to generate normalized employee skill set data for that skill set matched employee, wherein normalizing the matched skills for the skill set matched employee includes providing the dynamic employee skill set data as input data to one or more machine learning algorithms of the autonomous machine learning platform;

for each skill set matched employee, generating normalized employee skill set vector data based on the normalized employee skill set data for that skill set matched employee;

providing the normalized employee skill set vector data for each skill set matched employee and the new case vector data as input data to a trained machine learning model of the autonomous machine learning platform, wherein the trained machine learning model generates raw ranked skill matched employee recommendation data representing a set of raw ranked skill matched employees;

using, by the one or more computing processors, at least part of the raw ranked skill matched employee recommendation data as training data to train the machine learning model of the autonomous machine learning platform;

filtering the raw ranked skill matched employee recommendation data using the new case rules and constraints data to generate filtered and ranked skill matched employee recommendation data representing a set of filtered and ranked skill matched employees;

processing the filtered and ranked skill matched employee recommendation data using load balancing rules and constraints to generate load-balanced employee recommendation data for the new case representing one or more recommended employees for the new case;

providing the load-balanced employee recommendation data to a decision maker for review and/or approval; and assigning one or more of the recommended employees represented by the load-balanced employee recommendation data to the new task or project represented by the new case data.

13. The computing system implemented method for providing multi-dimensional human resource allocation recommendations of claim 12 wherein initial employee skill set data for the employees of the business includes data representing one or more initial employee skills obtained from the group of initial employee skill set data sources consisting of:
the employees themselves;
the employees' employment records;
the employees' HR records;
public records of certifications and schooling associated with the employees;
the employees' accounts with professional social media sites;
the employees' accounts with general social media sites; and
previous employers of the employees.

14. The computing system implemented method for providing multi-dimensional human resource allocation recommendations of claim 12 wherein the dynamic employee skill set data includes data selected from the group of dynamic employee skill set data consisting of:
data representing total cases closed by the employee;
data representing average resolution time for cases closed by the employee; data representing average customer satisfaction review scores for the employee;
data representing total task, project, or case closures associated with the employees;
data representing average time to dose for tasks, projects, or cases associated with the employees;
data representing average customer satisfaction review data per customer/product/employee;
data representing experience and team participation associated with the employees;
data representing team leadership experience associated with the employees; data representing product module experience associated with the employees;
data representing case priority experience associated with the employees;
data representing total cases worked in each product line/module associated with the employees;
data representing certifications associated with the employees;
data representing programming languages experience associated with the employees;
data representing human languages the employees can speak, write, or read;
data representing milestones per time period associated with the employees; and
data representing product release experience associated with the employees.

15. The computing system implemented method for providing multi-dimensional human resource allocation recommendations of claim 12 wherein the HR data for each employee of the business includes data selected from the group of HR data consisting of one or more of;
data representing the geographic location of the employees;
data representing the time zone associated with the employees;
data representing the employees' certifications and/or education data;
data representing the employees' employment type; and
data representing the employees' planned Paid Time Off (PTO) status.

16. The computing system implemented method for providing multi-dimensional human resource allocation recommendations of claim 12 wherein the employer/supervisor-imposed rules and constraints data includes one or more employer/supervisor-imposed rules and constraints selected from the group consisting of:

rules and constraints limiting the number of active tasks, projects, or cases that can be assigned to any, or particular, employees;

rues and constraints limiting the number of active deadlines or benchmarks per defined time frame that can be assigned to any, or particular, employees;

rules and constraints limiting the maximum number of active tasks, projects, or cases of a particular priority or urgency that can be assigned to any, or particular, employees;

rules and constraints regarding the use of full-time employees before assigning part-time or contract employees; and rules and constraints regarding employee experience required for one or more employee roles with different priority tasks, projects, or cases and clients.

17. The computing system implemented method for providing multi-dimensional human resource allocation recommendations of claim 12 wherein the employer/supervisor-imposed rules and constraints are selectable by an employee of the business including ranges and thresholds that can be adjusted by an employee of the business.

18. The computing system implemented method for providing multi-dimensional human resource allocation recommendations of claim 12 wherein the new case data includes data selected from new case data consisting of:

data representing the name of the task or project of the new case;

data representing the name of the client for which the task or project of the new case is to be performed;

data representing the priority of the task or project of the new case;

data representing the priority of the client associated with the task or project of the new case;

data representing the equipment type or product line associated with the task or project of the new case;

data representing subcomponents included with the equipment type or product line associated with the task or project of the new case;

data representing the type of the task or project of the new case;

data representing the complexity of the task or project of the new case;

data representing the geographic location of the client associated with the new case;

data representing the geographic location where the task or project of the new case is to be performed; and data representing the time zone where the task or project of the new case is to be performed.

19. The computing system implemented method for providing multi-dimensional human resource allocation recommendations of claim 12 wherein the client data for the client associated with the new case data includes data selected from client data consisting of:

data representing the priority of the client;

data representing the type of equipment or product lines associated with the client;

data representing the contractual obligations or requirements associated with the client or task, project, or case performed on behalf of the client;

data representing whether the client is an escalated or strategic client;

data representing the average of survey or review scores associated with the client;

data representing the geographic location of the client; and data representing the time zone associated with the location of the client.

20. The computing system implemented method for providing multi-dimensional human resource allocation recommendations of claim 12 wherein the client data for the client associated with the new case data is obtained from one or more of:

client and case records maintained by the business;

social media accounts associated with the client; and websites and advertising associated with the client.

21. The computing system implemented method for providing multi-dimensional human resource allocation recommendations of claim 12 wherein the client-imposed rules and constraints include client-imposed rules and constraints selected from the group of client-imposed rules and constraints consisting of;

rules and constraints indicating required citizenship for employees working for the client or assigned to the new case;

rules and constraints indicating required languages spoken by employees working for the client or assigned to the new case; and rules and constraints regarding availability of employees working for the client or assigned to the new case.

22. The computing system implemented method for providing multi-dimensional human resource allocation recommendations of claim 12 wherein the employee matched skills data of the aggregated employee skill set data matched to the new case skills and requirements represented in the new case requirements and skill set data include one or more employee matched skills data selected from the group of employee matched skills data consisting of:

data representing total cases closed by the employee related to the matched skill;

data representing average resolution time for cases dosed by the employee related to the matched skill;

data representing average customer satisfaction review scores for the employee related to the matched skill;

data representing cases owned by the employee that are related to the matched skill;

data representing cases dosed by the employee that are related to the matched skill;

data representing cases contributed to by the employee that are related to the matched skill;

data representing resolution time associated with cases owned and dosed by the employee that are related to the matched skill;

data representing resolution time associated with cases participated in and dosed by the employee that are related to the matched skill; and data representing customer satisfaction reviews for the employee or the employee as a team member associated with the matched skill.

23. The computing system implemented method for providing multi-dimensional human resource allocation recommendations of claim 12 wherein the matched skills for the skill set matched employees are normalized using Min-Max Normalization.

24. The computing system implemented method for providing multi-dimensional human resource allocation recommendations of claim 12 wherein the machine learning algorithm used to generate the raw ranked skill matched employee recommendation data is a weighted Least Euclidean Distance machine learning algorithm.

25. The computing system implemented method for providing multi-dimensional human resource avocation recommendations of claim 1 wherein the decision maker receiving the recommended employee data is an application.

26. The computing system implemented method for providing multi-dimensional human resource allocation recommendations of claim 12 further comprising:
  generating employee development rules and constraints data representing employee development rules and constraints governing the assignment of employees to cases where the employees can develop defined skills determined to be needed by the business and the clients of the business;
  processing the filtered skill matched employee recommendation data using the employee development rules and constraints data to generate recommended employee data for the new case representing one or more recommended employees for the new case; and
  providing the recommended employee data to a decision maker for review and/or approval.

27. A system for providing multi-dimensional human resource allocation recommendations comprising:
  one or more computing processors; and
  one or more memories coupled to the one or more computing processors, storing processor executable instructions, the system further comprising:
  a case intake and management system, and an autonomous machine learning platform;
  wherein the case intake and management system includes new case data representing new tasks or projects to be performed by the employees of a business for clients of the business;
  wherein the autonomous machine learning platform includes:
    an enterprise machine learning (ML) database, the enterprise ML database including:
      aggregated employee skill set data for each of the employees of a set of employees of the business, the aggregated employee skill set data being obtained from one or more sources of employee skill set data, further wherein the aggregated employee skill set data is dynamically updated in nearly real-time to generate dynamic employee skill set data; and
      new case data representing a new task or project to be performed by employees of the business for a client of the business, the new case data being received from the case intake and management system; a machine learning engine, the machine learning engine including:
      a pre-processing module;
      a skill matching, normalization, and ranking module;
    a filtering module; and
    a load balancing module;
    a rules and constraints database including rules and constraints data governing the assignment of employees of the business to tasks to be performed by the employees of the business for clients of the business; and
    a user interface of a multi-dimensional human resources advisor application, wherein the user interface of the multi-dimensional human resources advisor application allows employee recommendation data to be provided to a decision maker via the case intake and management system;
  wherein the processor executable instructions, when executed by the one or more computing processors, perform a process comprising:
    processing, with the pre-processing module of the machine learning engine, the new case data to generate new case requirements and skill set data representing required employee skills and qualifications for employees of the business that are to be assigned to the task or project represented by the new case data;
    storing the new case requirements and skill set data in the enterprise ML database;
    processing, with the skill matching, normalization, and ranking module of the machine learning engine, the aggregated employee skill set data for each of the employees of the set of employees of the business and the new case requirements and skill set data to identify initial skill set matched employee data representing a set of skill set matched employees having one or more matched skills matched to the new case skills and requirements represented in the new case requirements and skill set data;
    for each skill set matched employee, normalizing, with the skill matching, normalization, and ranking module of the machine learning engine, the matched skills for the skill set matched employee to generate normalized employee skill set data for that skill set matched employee;
    providing the normalized employee skill set data for each skill set matched employee and the new case requirements and skill set data to a trained machine learning model of the skill matching, normalization, and ranking module of the autonomous machine learning platform, wherein the trained machine learning model generates raw ranked skill matched employee recommendation data representing a set of raw ranked skill matched employees;
    using at least part of the raw ranked skill matched employee recommendation data as training data to train the machine learning model of the autonomous machine learning platform;
    filtering, with the filtering module of the machine learning engine, the raw ranked skill matched employee recommendation data using the rules and constraints data of the rules and constraints database to generate filtered and ranked skill matched employee recommendation data representing a set of filtered and ranked skill matched employees;
    providing the filtered and ranked skill matched employee recommendation data to a decision maker for review and/or approval through the multi-dimensional human resources advisor application via the case intake and management system; and
    assigning one or more of the filtered and ranked skill matched employees represented by the filtered and ranked skill matched employee recommendation data to the new task or project represented by the new case data.

28. The system for providing multi-dimensional human resource allocation recommendations of claim 27 wherein the aggregated employee skill set data includes initial employee skill set data for the employees of the business and dynamic employee skill set data sources for the employees of the business.

29. The system for providing multi-dimensional human resource allocation recommendations of claim 27 wherein the aggregated employee skill set data includes data selected from the group of employee skill set data consisting of:
  data representing total cases closed by the employee; data representing average resolution time for cases closed by the employee;

data representing average customer satisfaction review scores for the employee; data representing historic task, project, or case closures associated with the employees;

data representing experience and team participation associated with the employees;

data representing team leadership experience associated with the employees;

data representing review scores per clients associated with the employees;

data representing review scores per products associated with the employees;

data representing product module experience associated with the employees;

data representing case priority experience associated with the employees;

data representing average resolution/close time per product associated with the employees;

data representing average resolution/close time per client associated with the employees;

data representing total cases worked in each product line/module associated with the employees;

data representing certifications associated with the employees; data representing programming languages experience associated with the employees;

data representing human languages the employees can speak, write, or read;

data representing milestones per time period associated with the employees; and data representing product release experience associated with the employees.

30. The system for providing multi-dimensional human resource allocation recommendations of claim 27 wherein the rules and constraints include one or more rules and constraints selected from the group rules and constraints consisting of:

rules and constraints limiting the number of active tasks, projects, or cases that can be assigned to any, or particular, employees;

rules and constraints limiting the number of active deadlines or benchmarks per defined time frame that can be assigned to any, or particular, employees;

rules and constraints limiting the maximum number of active tasks, projects, or cases of a particular priority or urgency that can be assigned to any, or particular, employees;

rules and constraints regarding the use of full-time employees before assigning part-time or contract employees;

rules and constraints regarding employee experience required for one or more employee roles with different priority tasks, projects, or cases and clients;

rules and constraints indicating required citizenship for employees working for the client or assigned to the new case;

rules and constraints indicating required languages spoken by employees working for the client or assigned to the new case; and rules and constraints regarding availability of employees working for the client or assigned to the new case.

31. The system for providing multi-dimensional human resource allocation recommendations of claim 27 wherein the rules and constraints are selectable by an employee of the business including ranges and thresholds that can be adjusted by the employee.

32. The system for providing multi-dimensional human resource allocation recommendations of claim 27 wherein the new case data includes data selected from the new case data consisting of:

data representing the name of the task or project of the new case;

data representing the name of the client for which the task or project of the new case is to be performed;

data representing the priority of the task or project of the new case;

data representing the priority of the client associated with the task or project of the new case;

data representing the priority of the task or project of the new case;

data representing the equipment type or product line associated with the task or project of the new case;

data representing whether the client associated with the task or project of the new case is an escalated or strategic client;

data representing the contractual obligations or requirements associated with the client associated with the task or project of the new case or the task or project of the new case;

data representing the average scores of client surveys associated with the task or project of the new case;

data representing subcomponents included with the equipment type or product line associated with the task or project of the new case;

data representing the type of the task or project of the new case;

data representing the complexity of the task or project of the new case;

data representing the geographic location of the client associated with the new case;

data representing the geographic location where the task or project of the new case is to be performed; and data representing the time zone where the task or project of the new case is to be performed.

33. The system for providing multi-dimensional human resource allocation recommendations of claim 28 wherein the employee matched skills matched to the new case skills and requirements represented in the new case requirements and skill set data include one or more employee matched skills data selected from the group of employee matched skills data consisting of:

data representing total cases closed by the employee that are related to the matched skill;

data representing average resolution time for cases closed by the employee that are related to the matched skill;

data representing average customer satisfaction review scores for the employee that are related to the matched skill;

data representing cases owned by the employee that are related to the matched skill;

data representing cases led by the employee that are related to the matched skill; data representing cases contributed to by the employee that are related to the matched skill;

data representing resolution time associated with cases owned and closed by the employee that are related to the matched skill;

data representing resolution time associated with cases participated in and closed by the employee that are related to the matched skill; and data representing reviews and customer satisfaction reviews for the employee or team associated with the matched skill.

34. The system for providing multi-dimensional human resource allocation recommendations of claim 33 wherein the matched skills for the skill set matched employees are normalized by the skill matching, normalization, and ranking module of the machine learning engine using Min-Max Normalization.

35. The system for providing multi-dimensional human resource allocation recommendations of claim 27 wherein the machine learning algorithm used by the skill matching, normalization, and ranking module of the machine learning engine to generate the raw ranked skill matched employee recommendation data is a weighted Least Euclidean Distance machine learning algorithm.

\* \* \* \* \*

UNITED STATES PATENT AND TRADEMARK OFFICE
CERTIFICATE OF CORRECTION

PATENT NO. : 11,182,707 B2  
APPLICATION NO. : 16/195668  
DATED : November 23, 2021  
INVENTOR(S) : Praveen Sahni et al.

Page 1 of 1

It is certified that error appears in the above-identified patent and that said Letters Patent is hereby corrected as shown below:

In the Claims

In Column 60, Line 2, Claim 3, after "employees;" delete "data representing average resolution";  
In Column 60, Line 3, Claim 3, before "close" insert --data representing average resolution/--;  
In Column 60, Line 13, Claim 3, after "read;" delete "data representing milestones per";  
In Column 60, Line 14, Claim 3, before "time" insert --data representing milestones per--;  
In Column 60, Line 19, Claim 4, after "Claim" insert --1--;  
In Column 64, Line 20, Claim 14, after "employee'" delete "data representing average customer";  
In Column 64, Line 21, Claim 14, before "satisfaction" insert --data representing average customer--;  
In Column 64, Line 31, Claim 14, after "employees;" delete "data representing product module";  
In Column 64, Line 32, Claim 14, before "experience" insert --data representing product module--;  
In Column 64, Line 51, Claim 15, after "consisting of one or more of" replace ";" with --:--;  
In Column 66, Line 66, Claim 25, replace "avocation" with --allocation--;  
In Column 67, Line 1, Claim 25, replace "claim 1" with --claim 12--;  
In Column 67, Line 45, Claim 27, after "system;" delete "a";  
In Column 67, Line 46, Claim 27, before the first instance of "machine" insert --a--;  
In Column 68, Line 64, Claim 29, after "employee;" delete "data";  
In Column 68, Line 65, Claim 29, before "representing" insert --data--;  
In Column 69, Line 2, Claim 29, after "employees;" delete "data representing historic task,";  
In Column 69, Line 3, Claim 29, before "project," insert --data representing historic task,--;  
In Column 69, Line 23, Claim 29, after "employees;" delete "data representing programming languages";  
In Column 69, Line 24, Claim 29, before "experience" insert --data representing programming languages--;  
In Column 70, Line 40, Claim 33, replace "claim 28" with --claim 27--;  
In Column 70, Line 56, Claim 33, after "skill;" delete "data representing cases"; and  
In Column 70, Lines 57, Claim 33, before "contributed" insert --data representing cases--.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*